(12) United States Patent
Sodergren

(10) Patent No.: US 8,185,648 B2
(45) Date of Patent: May 22, 2012

(54) MULTI-PROTOCOL ADAPTER FOR IN-VEHICLE AND INDUSTRIAL COMMUNICATIONS NETWORKS

(75) Inventor: Jason Sodergren, Homer, AK (US)

(73) Assignee: Dearborn Group, Inc., Farmington Hills, MI (US)

( * ) Notice: Subject to any disclaimer, the term of this patent is extended or adjusted under 35 U.S.C. 154(b) by 0 days.

(21) Appl. No.: 12/930,379

(22) Filed: Jan. 5, 2011

(65) Prior Publication Data

US 2011/0258310 A1   Oct. 20, 2011

Related U.S. Application Data

(63) Continuation of application No. 09/785,123, filed on Feb. 16, 2001, now Pat. No. 7,895,342.

(60) Provisional application No. 60/186,533, filed on Mar. 2, 2000.

(51) Int. Cl.
G06F 15/16   (2006.01)

(52) U.S. Cl. .................................. 709/230; 709/217

(58) Field of Classification Search .................. 709/230, 709/217
See application file for complete search history.

(56) References Cited

U.S. PATENT DOCUMENTS

| | | | |
|---|---|---|---|
| 5,530,842 A * | 6/1996 | Abraham et al. ............. | 709/221 |
| 5,548,587 A | 8/1996 | Bailey et al. | |
| 5,590,313 A | 12/1996 | Reynolds et al. | |
| 5,751,827 A | 5/1998 | Takahashi | |
| 5,771,232 A | 6/1998 | Sinibaldi et al. | |
| 5,832,240 A * | 11/1998 | Larsen et al. ................. | 710/105 |
| 5,832,244 A | 11/1998 | Jolley et al. | |
| 5,905,885 A * | 5/1999 | Richter et al. .................... | 710/5 |
| 5,968,158 A | 10/1999 | Andrews et al. | |
| 6,003,097 A * | 12/1999 | Richman et al. ................. | 710/8 |
| 6,167,253 A | 12/2000 | Farris et al. | |
| 6,189,057 B1 | 2/2001 | Schwanz et al. | |
| 6,236,917 B1 | 5/2001 | Liebl et al. | |
| 6,298,370 B1 | 10/2001 | Tang et al. | |
| 6,321,091 B1 | 11/2001 | Holland | |
| 6,396,164 B1 | 5/2002 | Barnea et al. | |
| 6,400,996 B1 | 6/2002 | Hoffberg et al. | |
| 6,405,049 B2 | 6/2002 | Herrod et al. | |
| 6,418,324 B1 | 7/2002 | Doviak et al. | |
| 6,526,335 B1 | 2/2003 | Treyz et al. | |
| 6,526,340 B1 | 2/2003 | Reul et al. | |
| 6,539,027 B1 | 3/2003 | Cambron | |
| 6,549,945 B1 | 4/2003 | Sinibaldi et al. | |
| 6,691,183 B1 | 2/2004 | Ryan, Jr. | |
| 7,603,471 B2 | 10/2009 | Sodergren | |
| 7,895,342 B2 * | 2/2011 | Sodergren ..................... | 709/230 |
| 2005/0083965 A1 | 4/2005 | Sodergren | |

OTHER PUBLICATIONS

"Linux", http://en.wikipedia.org/wiki/Linux_operating_system; Wikipeida, the free encyclopedia; 9 pages; Nov. 30, 2006.
"LynxOS"; http://en.wikipedia.org/wiki/LynxOS; Wikipedia, the free encyclopedia; 2 pages; Nov. 30, 2006.

* cited by examiner

*Primary Examiner* — Kristie Shingles
(74) *Attorney, Agent, or Firm* — Warn Partners, P.C.

(57) ABSTRACT

An adapter device for providing the user a remote access point for supporting interaction between the device and one or more target devices supporting one or more of several communication protocols for automotive and industrial automation applications employing user-selectable protocols, such as multiplexed communication networks.

11 Claims, 55 Drawing Sheets

| Signal | Pin | Signal |
|---|---|---|
| KBDROW0 CASL2 | B19 | CASL2# |
| KBDROW1 CASL3 | D16 | CASL3# |
| KBDROW2 CASH2 | C17 | |
| KBDROW3 CASH3 | B18 | |
| KBDROW4 KAS2 | D15 | RAS2# |
| KBDRWO5 KAS3 | C16 | |
| KBDROW6 MA12 | B17 | MA12 |
| KBDROW7 PDACK1 | B3 | |
| KBDROW8 PDRQ1 | C3 | |
| KBDROW9 PIRQ2 | D3 | |
| KBDROW10_BALE | C2 | ALB |
| KBDROW11 SBHL | C1 | SBBL# |
| KBDROW12 MUSIG | E3 | MEMSIG# |
| KBDROW13 R3BF0E | A3 | |
| KBDROW14_SUSRDS | Y12 | CPUSUSP |
| LCDD0_VL-RST | B20 | VL-RST# |
| LCDD1_VL-ADS | C19 | VL-ADS# |
| LCDD2_VL-W/R | D18 | VL-W/R# |
| LCDD3_VL-M/IO | C20 | VL-M/IO# |
| LCDD4_VL-LRDY | D19 | VL-LRDY# |
| LCDD5_VL-D/C | F18 | VL-D/C# |
| LCDD6-VL-LDEV | F17 | VL-LDEV# |
| LCDD7&VL-BE33 | D20 | VL-BE3# |
| M_VLBE1 | F18 | VL-BE2# |
| LC_VLBE1 | F20 | VLBE1# |
| SOK_VL-BE0 | F19 | BL-BE0# |
| FRM_VL-LCLK | L19 | FRM_VL-LCLK |
| LVFI_VL-BRDY | A20 | VL-BRD4# |
| LVDD_VL-BLAST | A19 | VL-BLAS0T |
| CASL0 | D13 | |
| CASL0 | B15 | CASL0# |
| CASH1 | A17 | |
| CASL1 | C14 | CASL1# |
| RAS0 | C15 | BAS0# |
| RAS1 | D14 | |
| MWE | A15 | MWD# |

*FIG - 2E-8*

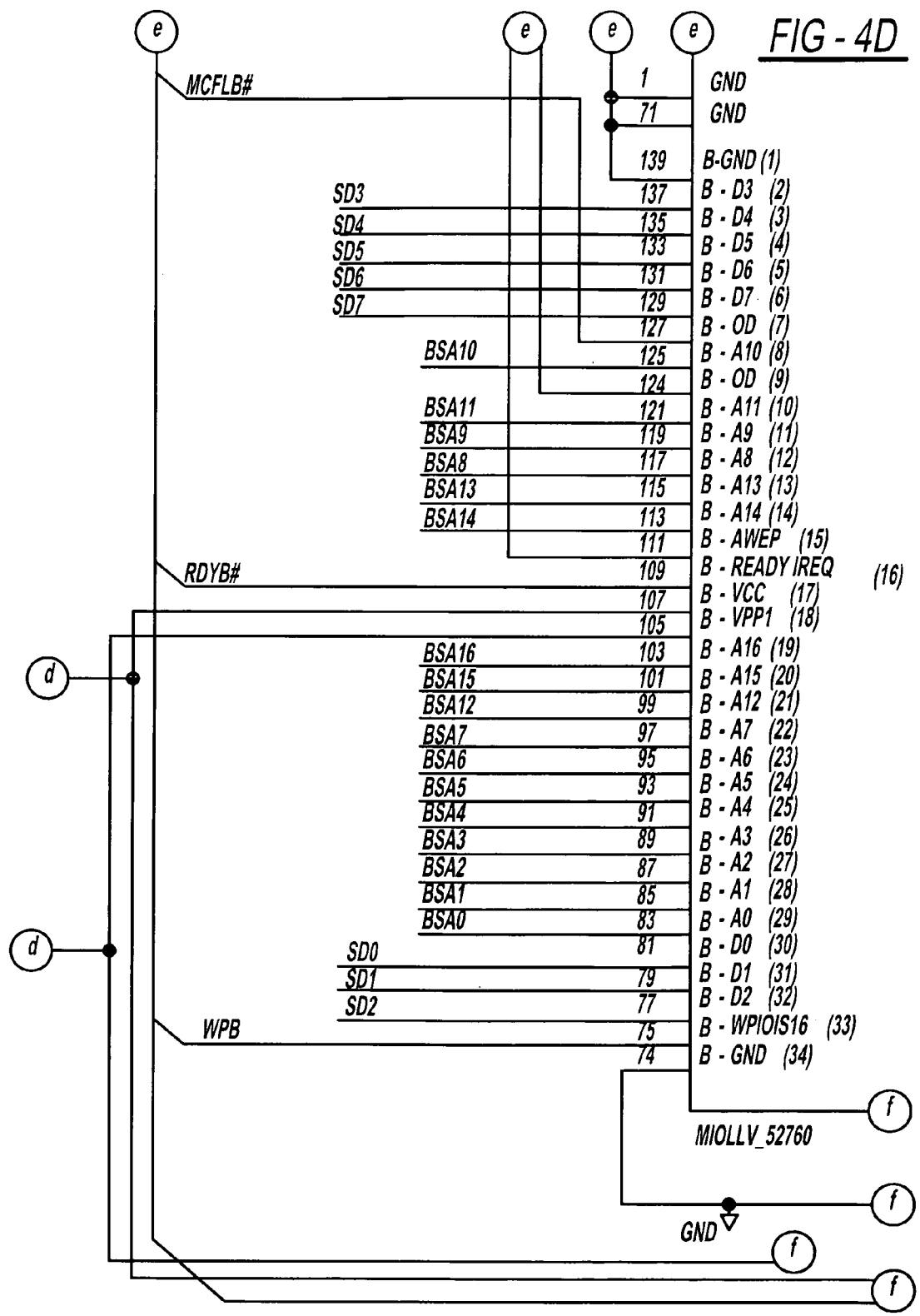

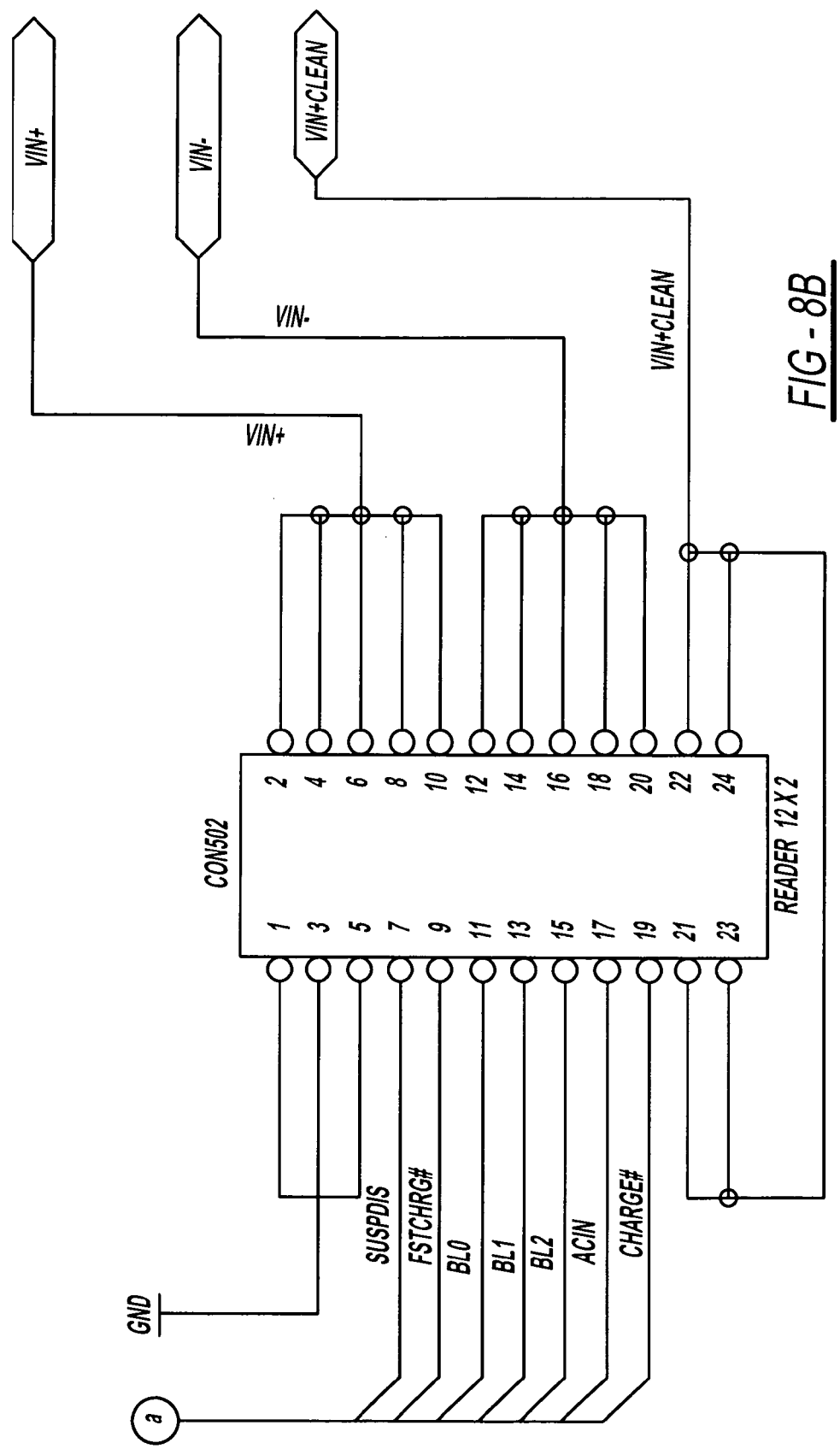

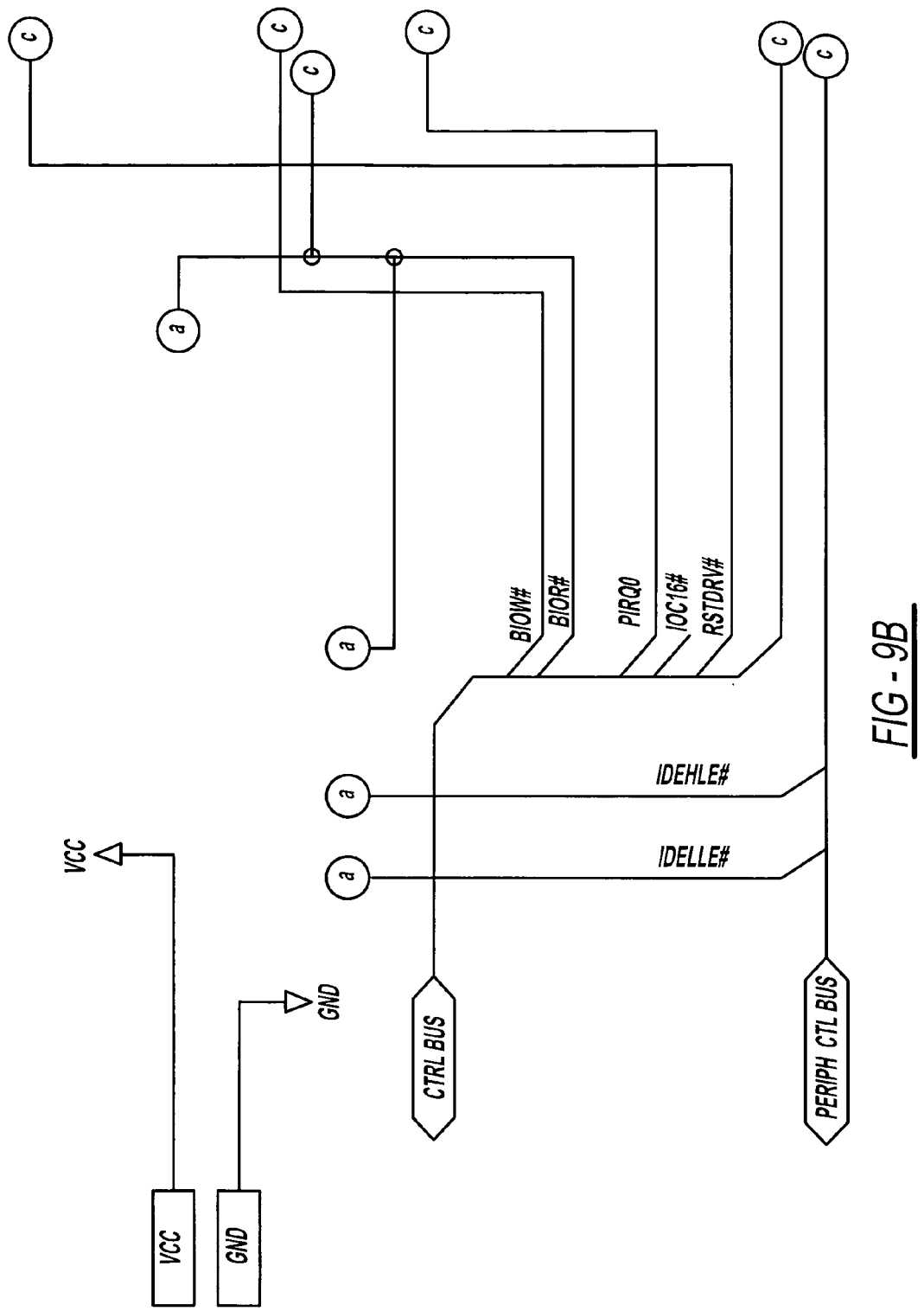

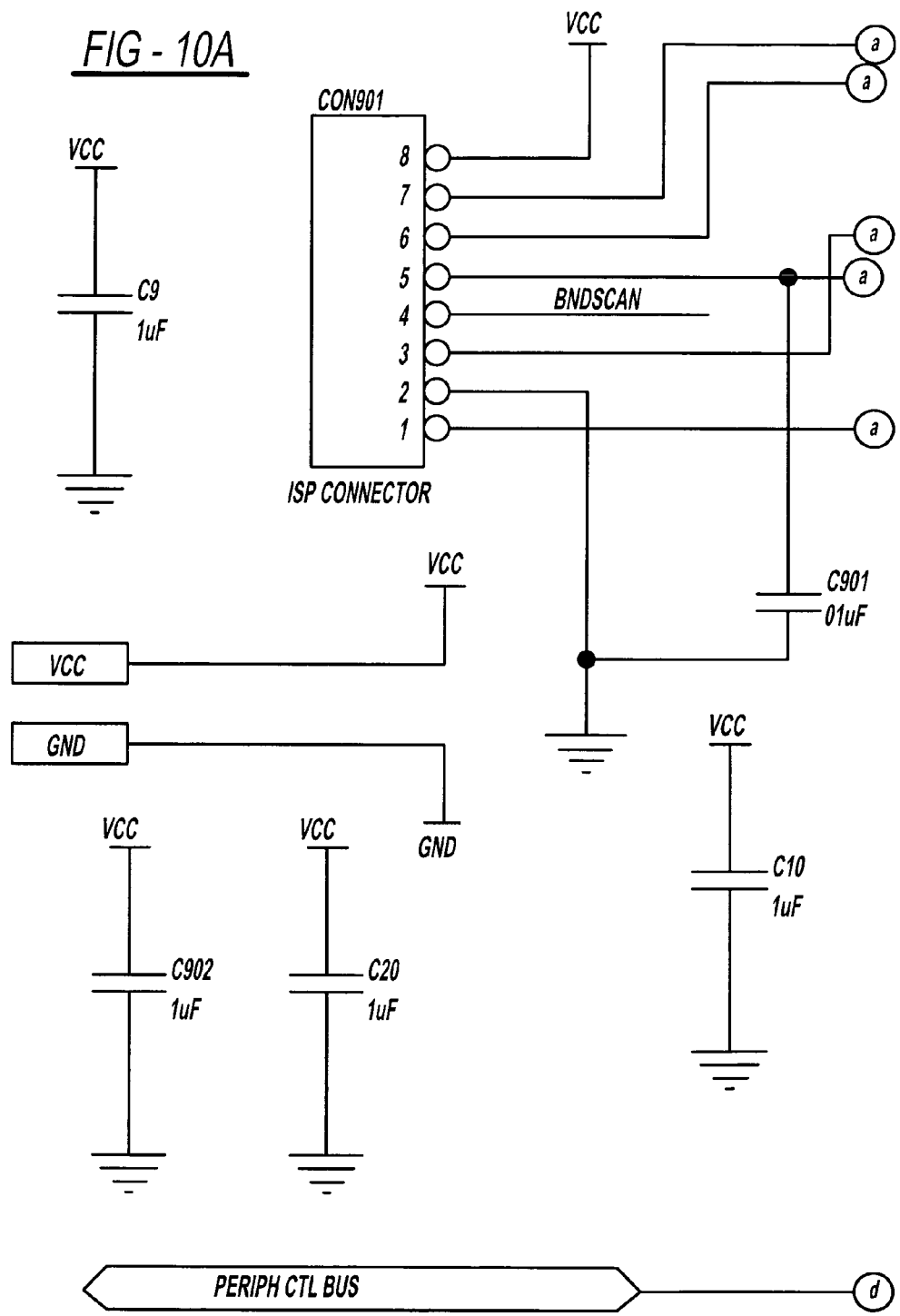

MULTI-PROTOCOL ADAPTER FOR IN-VEHICLE AND INDUSTRIAL COMMUNICATIONS NETWORKS

This application is a continuation application of U.S. patent application Ser. No. 09/785,123, filed Feb. 16, 2001, which is based on Provisional Patent Application Ser. No. 60/186,533 filed Mar. 2, 2000.

BACKGROUND OF THE INVENTION

The field of the invention pertains to in-vehicle and industrial communications networks for diagnostics, analysis and monitoring. Multiplex communication networks are used in automotive and industrial automation applications. However, the ability was needed to access, monitor, control and modify/update, any and all functions or capabilities of another device utilizing such communication networks.

SUMMARY OF THE INVENTION

The device is a hardware/software system that provides a programmable gateway between many types of automotive/industrial serial multiplex networks and Ethernet-connected computers and networking equipment. This hardware/software combination provides user applications with the ability to perform control, transmit and receive operations on such automotive and industrial multiplex networks.

User applications may reside either on the hardware device itself (in a stand-alone manner) or on remote computers with connectivity to one or more of the hardware units via the Ethernet and the TCP/IP protocol. Use of TCP/IP protocol and Ethernet ensure compatibility with a wide range of existing networks and computing equipment.

User applications include, but are not limited to, network monitors and analyzers, diagnostic programs, gateway/routers between one or more of the supported networks, multiplex network node and/or vehicle simulators, and general engineering tools.

The hardware/software supports multiple simultaneous client applications. Duplicate streams of the multiplex network data are sent to all interested client applications.

A predefined set of services are available via the default hardware/software configuration. These services include multiplex message scheduling functions, message filtering functions, simple message gatewaying and autoresponding functions, and client transmit/receive access to all data frames present on any of the supported multiplex network interfaces.

The invention is a device (or adapter or instrument) for providing the user a remote access point for interaction between the device and one or more target devices running one or more of several communication protocols supported by this device. As described above, automotive and industrial automation applications employ such protocols (also known as multiplexed communication networks).

The device of the invention advantageously provides the user with the ability to access, monitor, control and modify/update, any and all functions or capabilities of another device utilizing the same communication protocol that the user has selected. The user is able to control these functions as a result of a unique communication dialogue established between this device and the target device.

The device has the capability of simultaneous interaction with multiple devices utilizing multiple protocols. Interactive control capability established with the target device, includes (but is not limited to), the following functions: interrogating, monitoring, retrieving data, downloading data, recording data, revising/updating data, performing diagnostics and revising/updating the operating program of the target device.

Daughtercard interface modules are based on the ISA Interconnect Standard even though they utilize small, space-saving connectors (as opposed to the standard ISA board-edge interconnections). As a result, they occupy a much smaller and more compact area, than would otherwise be possible for a standard plug-in module utilizing the ISA format.

Daughtercard interface modules can be plug-in modules to provide support for the following protocols: SAE J1850 (GM, Ford and Chrysler versions), UBP (Ford), CCD (Chrysler), SCI (Chrysler), CAN, SAE J1587, J1939, J2284 (high speed CAN), J2411 (single wire CAN), ISO 11992, 9141-2 and KWP2000.

New communication protocols may be added to the device capabilities at any time by creating a new daughtercard module for supporting the new protocol.

System Attributes

Daughtercard interface modules provide the user with automatic detection capability for all of the designated communication protocols. This allows the user the flexibility of choosing a "mix or match" combination of the various protocols, i.e., three of the same, or three different protocols. More daughter cards can be added as necessary to support more channels.

The device is also capable of functioning as a "stand-alone" network interface, without the need for a keyboard, monitor, or host PC. Multi-protocol networks, such as IDB networks or those multi-protocol networks accessed via a universal gateway, may have unique access and/or diagnostic requirements.

The device's ability to simultaneously access and interact with multiple devices/protocols, automatically provides the device with the compatibility required for an access tool or diagnostic tool for multi-protocol networks. The device uses an Ethernet connection to provide the high-speed communications interface that is necessary for interaction with the newer, high-throughput protocols.

Another capability of the device is its ability to reliably monitor, sample, evaluate and manipulate the real-time data usually associated with these high-speed protocols.

The device maximizes flexibility by ensuring compatibility with hardware interfaces and other network tools commonly used in conjunction with these supported network protocols.

Communication Protocol

Communication between the device server, clients, plug-in applications and protocol stacks occurs by means of a communication protocol (hereafter referred to as the device communication protocol, or CP). CP provides a mechanism for the communication of serial multiplex network messages between software entities in such a way that knowledge of the specific format of the messages of a specific type of multiplex network is not required. The serial multiplex networks involved are automotive and/or industrial automation networks, including but not limited to CAN (ISO11898, GM Single-wire, and others), J1850 (GM, Ford and Chrysler variants), Keyword Protocol 2000, and various other UART-based protocols.

This generalized representation of the frames of such serial networks allows communication of frames from an arbitrary arrangement of similar or differing networks within a consistently formatted connection between a client and server. Consequently, this generalized representation of the frames of such serial networks also allows for use and interpretation of such multiplex network frames by a client that has no previous knowledge of the types or formats of the multiplex network frames that it will receive; all relevant format and decoding information is contained within the client/server communication. Moreover, this generalization of differing types of multiplex network traffic facilitates communication between software and a multi-protocol device such as the device hardware.

CP also incorporates mechanisms to allow control, status and event information communication between the client and server software entities. This inclusion allows for a uniform communication environment between software entities within the device system, regardless of whether these entities are servers, clients, or plug-in applications or protocol handlers.

CP is typically embedded within a TCP/IP connection between two software elements (the server, clients, etc.). CP is a frame based protocol. Each CP frame consists of the following elements:

A frame header that contains information about the required routing of the frame; the identity of the source entity and of the destination entity are specified. This header also contains an indication of the frame type, as well as the length of the entire frame. A frame-type specific header contains information specific to the frame type specified in the frame header. An optional payload for which the format or presence/absence of a payload depends on the frame type specified in the frame header.

Five frame types are herein defined, although more are easily envisioned. Some frame types are as follows.

Command frames contain commands that are sent by the source entity and received by the destination entity. These commands serve to control behavior or request information or actions of the destination target. The payload portion of the CP command frame is command-specific data. A number of generic system-wide commands are specified, but each software entity may have its own set of recognized and handled commands.

2. Response frames contain a destination entity's response to a previously-received command frame. This response frame is sent back to the entity that originally sourced the relevant command. The payload portion of the CP response frame is command-specific data.

3. Data frames contain encapsulated multiplex network frames. CP data frames contain an additional header that contains information about the encapsulated multiplex frame. This information includes:

A timestamp that applies to the transmit/receive time of the multiplex frame;

Indications of header/data/other field lengths within the encapsulated multiplex frame;

Indications of special modes or flags that may apply to the multiplex frame;

The remainder of the payload of a CP frame contains the actual multiplex network frame; and CP data frames provide the primary mechanism by which multiplex network frames are gatewayed between the multiplex networks and the device system's applications and remote clients.

4. Event frames contain information about system or software entity events. This data is not sent as a response to a request, but rather as independent event-driven notifications. The payload portion of a CP event frame contains event-specific data.

5. ASCII message frames contain zero-terminated human readable ASCII messages. There is no frame type specific header for this frame type; the entire remainder of the frame contains the payload, which is the ASCII message.

6. MISC frames user-defined data. No definitions are made for the format of the remainder of this frame type; it is open to user definition.

Software

The software components of the device hardware/software combination implement the device Communication Protocol and facilitate communication between multiplex networks, plug-in applications and protocols, and client applications. The general software architecture of the components of the device software system involved in the handling of the functionality is outlined in this description.

The software that resides on the device hardware platform consists of the following types of components:

The server program that implements the device Communication protocol. The server program handles communication between clients and other parts of the device software. The server acts primarily as a message router, routing GC Protocol frames between source entities and destination entities as specified by the routing information contained within each GC Protocol frame. The server communicates with device drivers by means of standard Unix character device interfaces.

Multiplex network hardware device drivers that are software modules to implement hardware access methods for each supported multiplex network hardware type. A separate loadable device driver module exists for each type of device daughtercard; each daughtercard may implement one or more multiplex network interfaces. These modules provide a uniform software interface method to non-uniform types of hardware interfaces. Interface to specific hardware is accomplished by means of memory or I/O space interfaces and system interrupts.

Plug-in applications and protocols programs are loadable software modules that provide additional functionality to the device hardware/software system. One or more of these modules may be configured to load at start-up time; they provide services such as message filtering, scheduling and autoresponding capabilities. Additional modules provide high-level protocol encoding and decoding (J1939, GM USDT and DeviceNet protocol modules are examples of supported plug-in protocol modules).

Hardware autodetection and configuration software programs detect the types of multiplex protocol daughtercards installed in the device hardware platform at runtime. These programs are responsible for loading of appropriate device driver modules for support of installed cards, as well as any configuration that is needed for each individual card. Detection of card identity is performed through the reading of serial eeproms located on each card by means of a dedicated serial interface. These eeproms contain card type and serial number as well as licensing and security information. All information gathered from installed cards in this manner is made available to the server program.

Plug-in software modules are described above include but are not limited to:

Message scheduler module provides a user-controllable multiplex network message scheduler. Lists of messages, sublists, iteration counts, and iteration periods are specified by client applications. The message scheduler tracks multiple schedules and notifies client programs via events when schedules complete. Message scheduling is performed by means of a real-time hardware clock and associated services provided by the operating system.

Message responder module provides user-definable message gatewaying functionality. It allows any arbitrary CP frame to be sent on receipt of any other arbitrary CP frame. Received frame matching is determined based on a userdefined filter definition that includes AND, OR, magnitude comparison, and bit mask/match operations.

Message filter module controls filtering of received multiplex network messages. The filter module allows individual client applications to choose the nature of the messages they receive based on a filter specification for each multiplex network channel that includes AND, OR, magnitude comparison, and bit mask/match operations.

Script loader module allows for the controlled download, management and activation of userdefined scripts. These scripts are typically generated by means of an external front-end editor/compiler software package.

Hardware

The device hardware platform consists of a motherboard and zero or more multiplex protocol daughtercards. The device motherboard implements a modified PC architecture. This architecture includes the following elements and peripheral devices:

Integrated CPU;
Daughtercard interconnect slots;
Alphanumeric LCD and keypad for user input/output;
10-base-T Ethernet interface for client interconnection;
EIA232 serial port for diagnostics and system maintenance;
Compact Flash socket for storage of system software and applications;
(2) PCMCIA slots for connection of industry standard peripherals;
72-pin SODIMM socket for connection of system RAM;
IDE interface for connection of mass-storage devices;
A coin-cell battery for clock and configuration memory backup;
IRDA infrared serial interface; and
Piezoelectric speaker.

The motherboard can include the following components.

CPU and associated buffering and memory. The board is based on the AMD Elan SC400 integrated CPU. Level shifting buffers provide translation between the 3.3 VDC and 5 VDC portions of the system. A 72-pin small-outline dual inline memory module socket provides interface to a standard memory module; this module is used as the system's RAM.

A flash-ROM provides non-volatile memory space for the system's BIOS and boot routines.

Daughtercard interface slots provide a subset of ISA architecture signals, as well as proprietary signals that provide a card ID interface and predefined slot memory and I/O space decodes.

PCMCIA sockets for attachment of industry-standard PCMCIA devices.

Serial interfaces. One EIA232 interface and one IRDA interface are provided.

LCD and keypad. An alphanumeric LCD interface and a 4-key keypad interface are provided for user input/output capabilities.

Ethernet interface. A standard 10-base-T Ethernet interface is implemented by means of a Crystal Semiconductor CS8900 device. This device provides the primary user communication interface.

Power supply interconnect. This interconnect forms an attachment point for a small DC-DC converter that provides system power supplies.

ATA interface provides an attachment point for mass storage devices. One Compact Flash and one 44-pin IDE interface is provided.

Programmable logic block (CPLD) provides programmable logic space. This logic provides support for the following: LCD/Keypad interface, daughtercard slot support, buffer control, and address decoding/interrupt routing for other system peripherals.

A power supply card provides three DC-DC converters that provide the device hardware platform's required supply voltages (3.3 VDC, 5 VDC and 12 VDC). The supported input voltage range is between 6 VDC and 35 VDC; the circuit provides protection against incorrect or reverse-polarity input voltages.

Daughtercards interface to the motherboard by means of card interface slots on the motherboard. Each slot implements a modified ISA interface. Up to three daughtercards may be installed at a time. The daughtercards include (but are not limited to) implementations of the following interfaces:

CAN (ISO11898)
CAN (ISO11992)
Single-wire CAN
GM J1850
Ford J1850
Chrysler J1850
Chrysler CCD
Ford UBP
Honda UART-based protocol
Keyword Protocol 2000
Optically isolated CAN
Optically isolated single-wire CAN
Optically isolated GM J1850
Optically isolated Keyword Protocol 2000

Each daughtercard includes a connector that mates with the motherboard daughtercard slot connector on one end and a multiplex network connector on the other. The daughtercards are physically mounted in such a way that the multiplex network connector protrudes through the back panel of the hardware unit. Each daughtercard also includes programmable logic that implements the ISA target interface and provides internal registers and other card resources. Each card includes a serial eeprom that contains the type, serial number, and security and licensing information for that card.

The optically isolated cards provide fiberoptic connections that carry relevant network signals; these optical signals are converted back to the desired multiplex network signals by means of small battery-operated satellite modules specific to the desired multiplex network.

The device protocol structure employs the standard Transmission Control Protocol/Internet Protocol (TCP/IP) services in such a manner to ensure the inter-operability of the device with existing PCs and standard network interfaces.

Another unique feature of the device allows the user to remotely reprogram or revise the device operating software via flash card. The operating software may be upgraded by replacing selected programs, or segments of the software, or replaced in its entirety.

The PC card (PCMCIA) slots provide for a backup by allowing the user to transfer data from the flash card to a "temporary" storage media, thus maintaining the original program integrity while making revisions to the device program.

Also, this same feature allows the user to update the device's resident data base, in the event that such a data base has been created for use as a reference or for some other purpose.

The device incorporates an on-board web server. This allows users to communicate with the device and perform functions via a web browser with HTML.

Other browser technologies that can be supported include XML and WML (for hand-held palm devices or WML enabled cell phones).

Another key feature is the ability to perform a remote flash memory update to the device.

These and other advantages and features of novelty which characterize the invention are pointed out For a more complete understanding of the present invention, reference is made to the following detailed description when read with in conjunction with the accompanying drawings wherein like reference characters refer to like elements throughout the several views, in which:

DESCRIPTION OF THE PREFERRED EMBODIMENTS

Now turning to the drawings, circuits of the protocol adapter are there shown in schematic in FIGS. 1 through 11.

Figure 1:
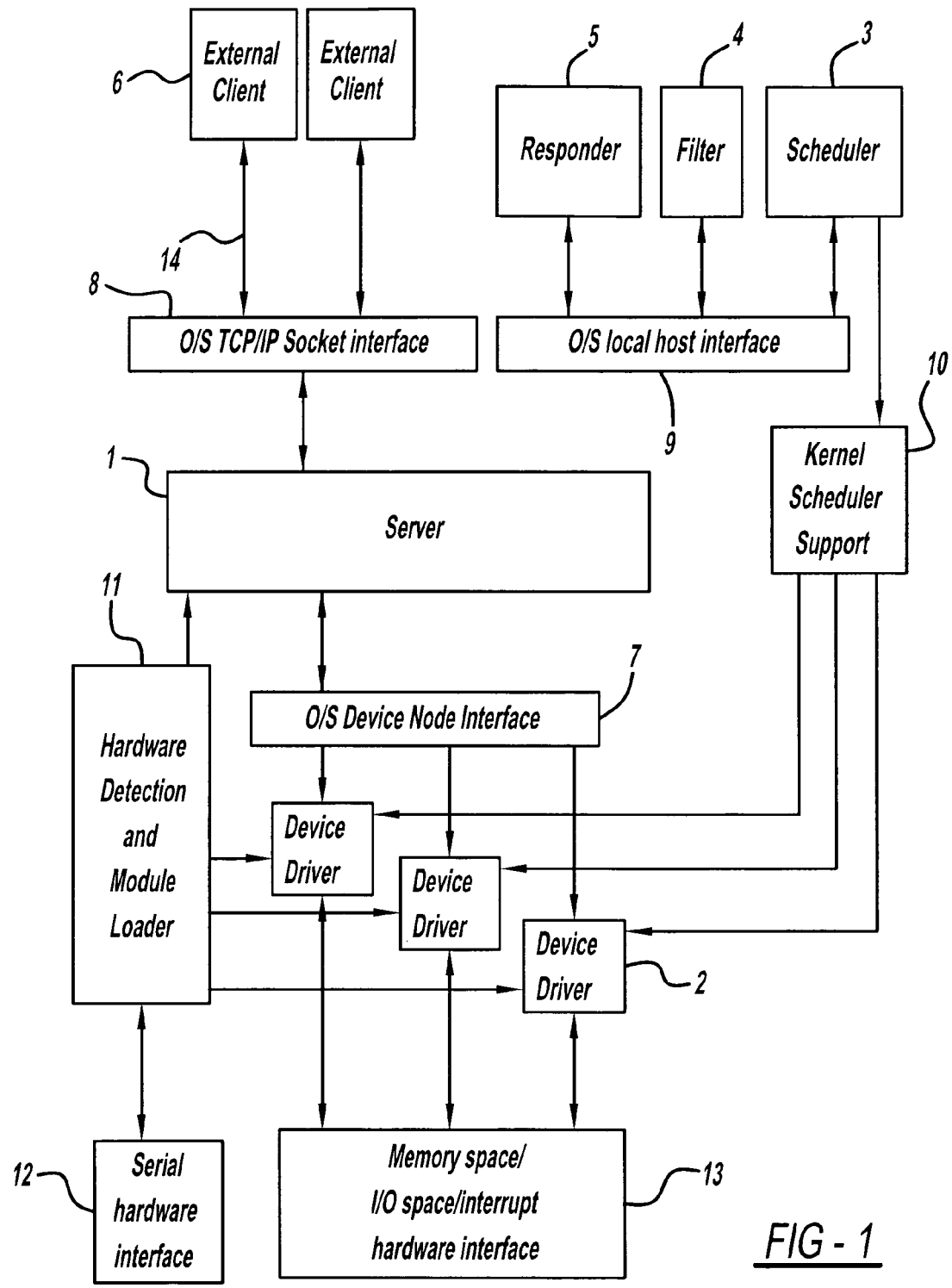
FIG. 1 illustrates device mainboard overview.

The operating software is depicted in a block diagram in FIG. 1 with FIG. 2 through FIG. 10 showing elements of the mainboard schematic. The general software architecture of the components of the device software system is provided by a server program 1 that handles communication between clients 6, 6 through an U/S TCP/IP interface 8 on lines 14 and other parts of the device software 3, 4, 5 through an O/S local host interface 9. Server program 1 acts primarily as a message router, routing GC Protocol frames between source entities and designation. Server program 1 communicates with device drivers 2, 2, etc. by means of standard Unix character device interfaces 7. The device drivers 2 also communicate with a memory/space I/O space/interrupt hardware interface 13.

Hardware autodetection and configuration software 11 detect the types of multiplex protocol daughtercards installed in the device hardware platform at runtime. Thereafter appropriate device driver modules 2, 2, etc. are loaded for support of installed cards, as well as any configuration that is needed for each individual card. Detection of card identity is performed through the reading of serial eeproms located on each card by means of a dedicated serial interface 12. The eeproms contain card type and serial number as well as licensing and security information. All information gathered from installed cards in this manner is made available to the server program 1.

Plug-in software module Message scheduler 3 provides a user-controllable multiplex network message scheduler. Lists of messages, sublists, iteration counts, and iteration periods are specified by client applications. The message scheduler tracks multiple schedules and notifies client programs via events when schedules complete. Message scheduling is performed by means of a real-time hardware clock and associated services 10 provided by the operating system.

Message responder 5 provides user-definable message gatewaying functionality. It allows any arbitrary CP frame to be sent on receipt of any other arbitrary CP frame. Received frame matching is determined based on a user-defined filter definition that includes AND, OR, magnitude comparison, and bit mask/match operations.

Message filter 4 controls filtering of received multiplex network messages. The filter module allows individual client applications to choose the nature of the messages they receive based on a filter specification for each multiplex network channel that includes AND, OR, magnitude comparison, and bit mask/match operations.

Script loader (not shown in FIG. 1) allows for the controlled download, management and activation of user-defined scripts. These scripts are typically generated by means of an external front-end editor/compiler software package.

Figure 2A:
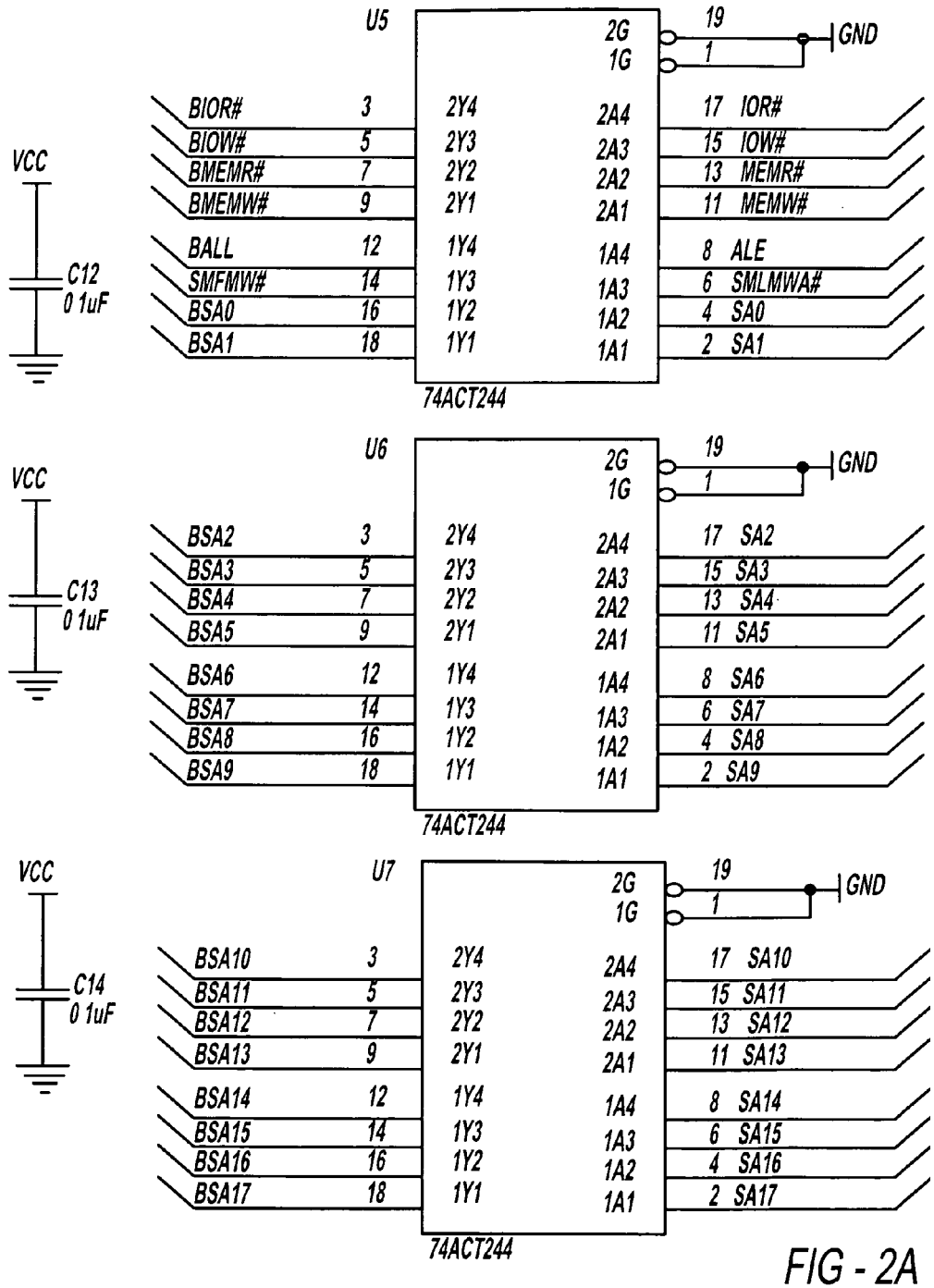
FIG. 2 illustrates device mainboard schematic: CPU, memory, buffers, Central Processor, RAM, flash-ROM (for BIOS)
Figure 2B:
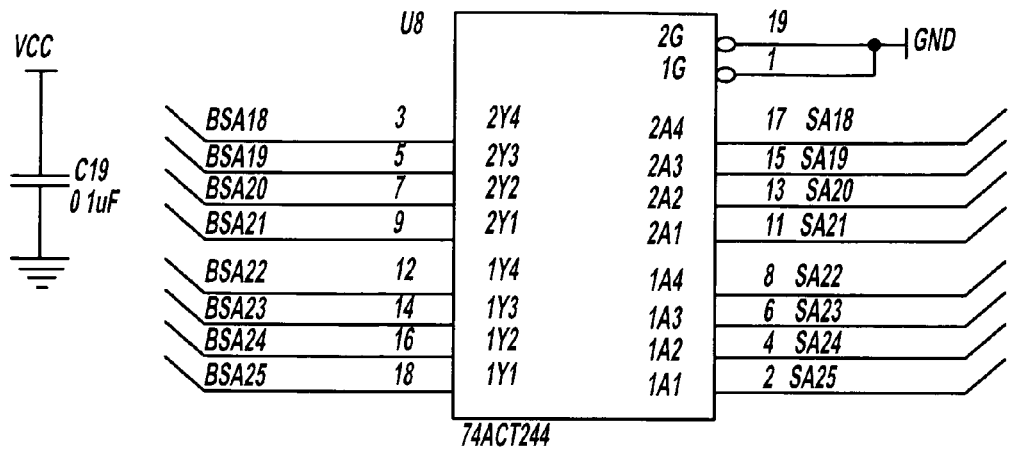
Figure 2B:
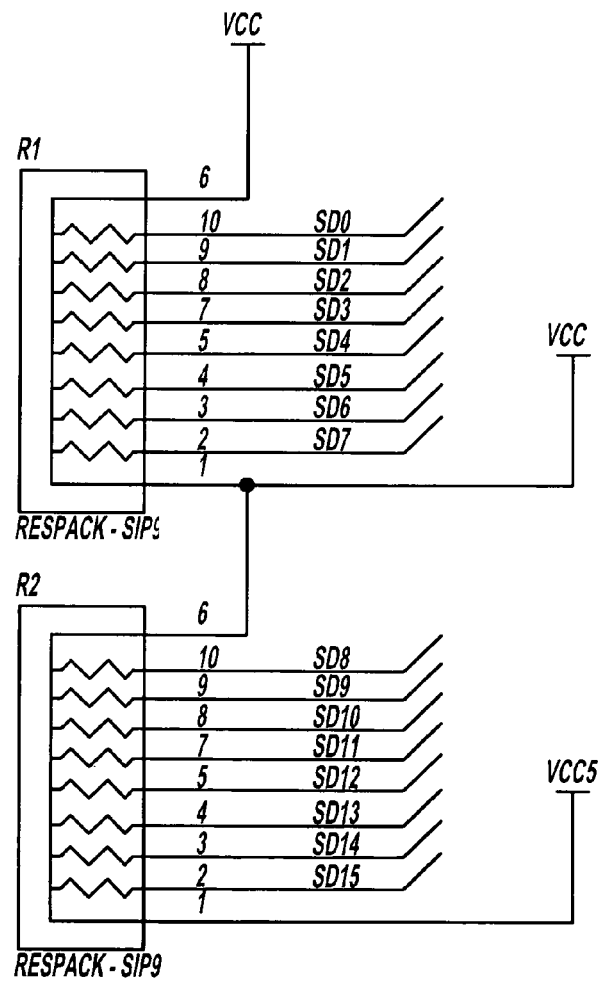
Figure 2C:
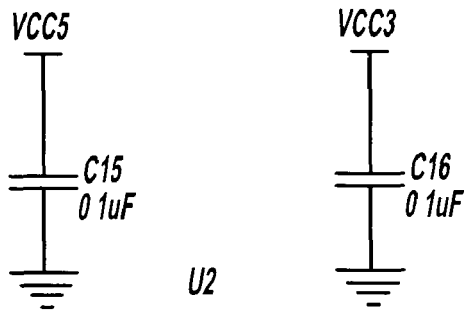
Figures 1, 2D:
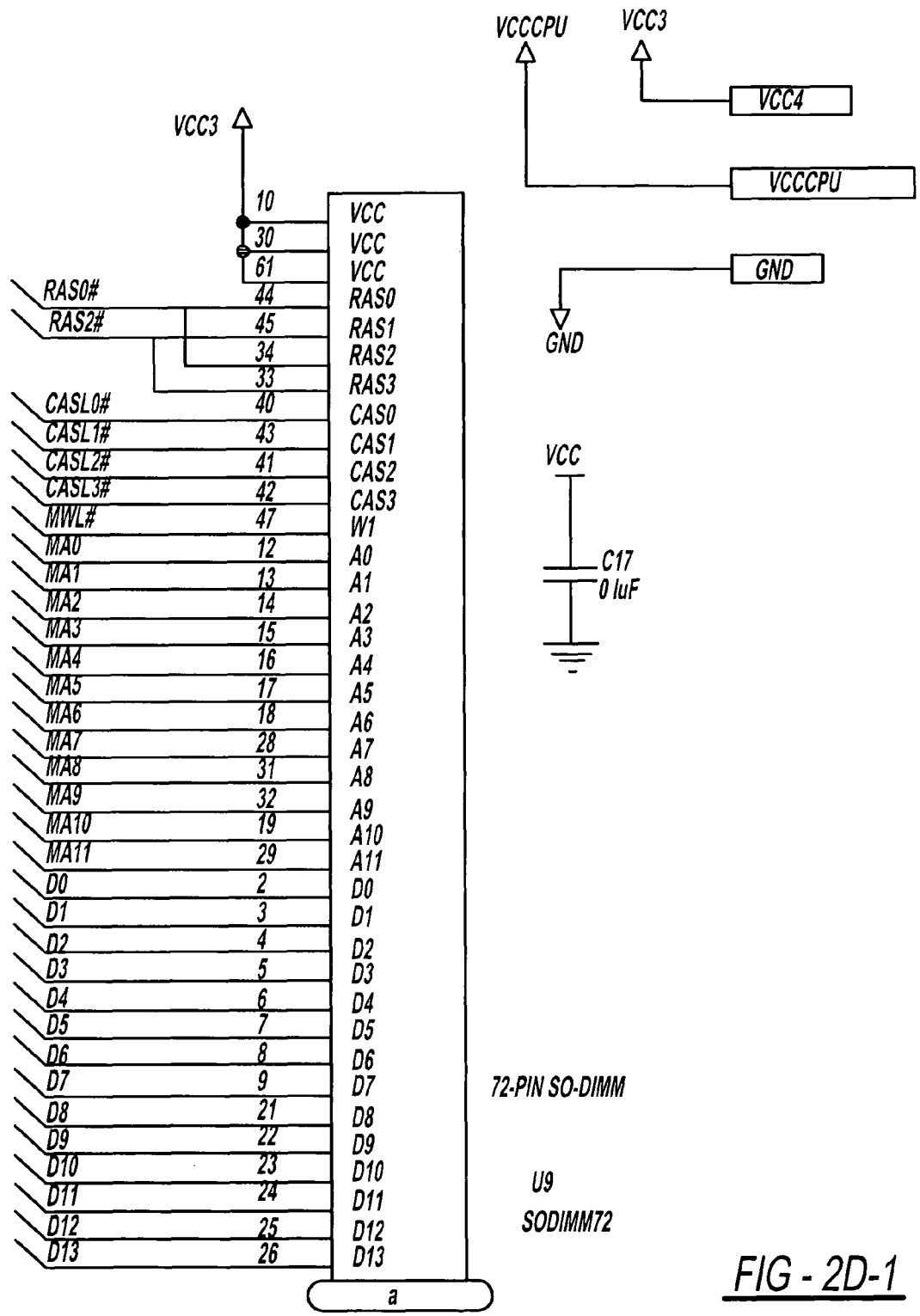
Figures 2, 2D:
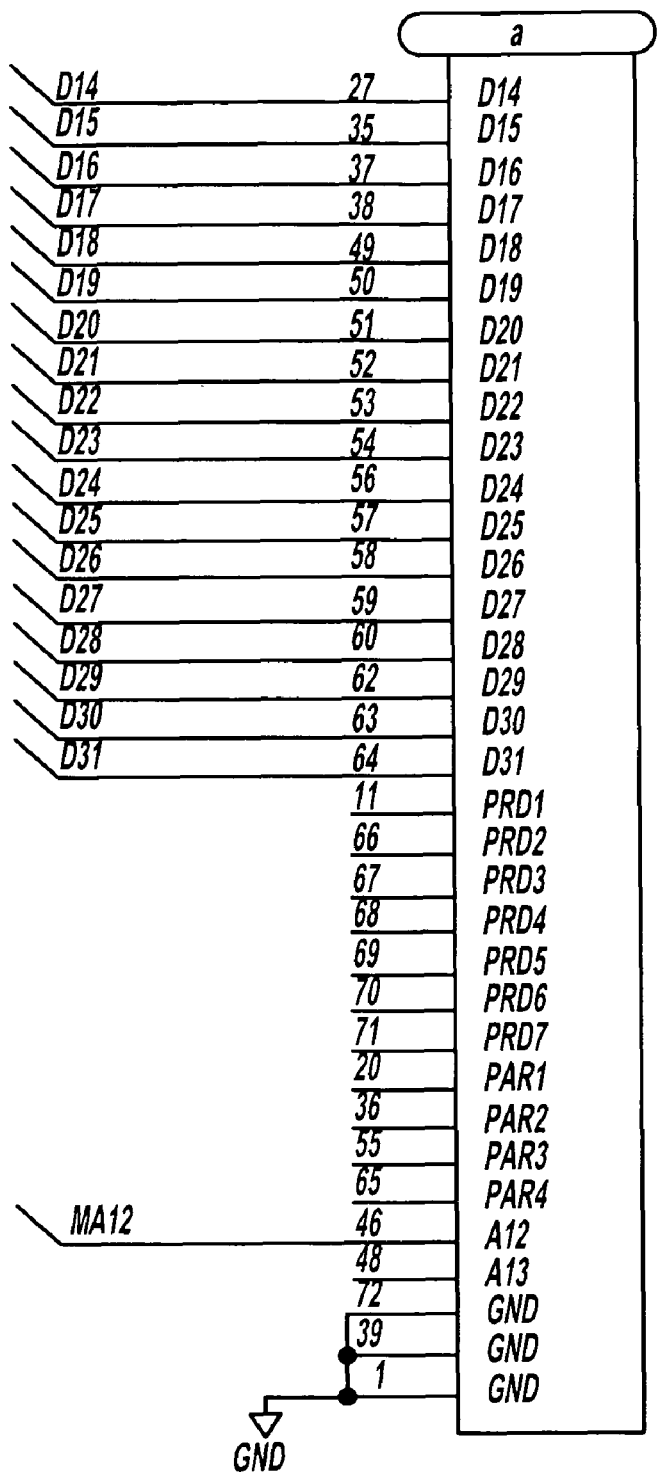
Figures 1, 2E:
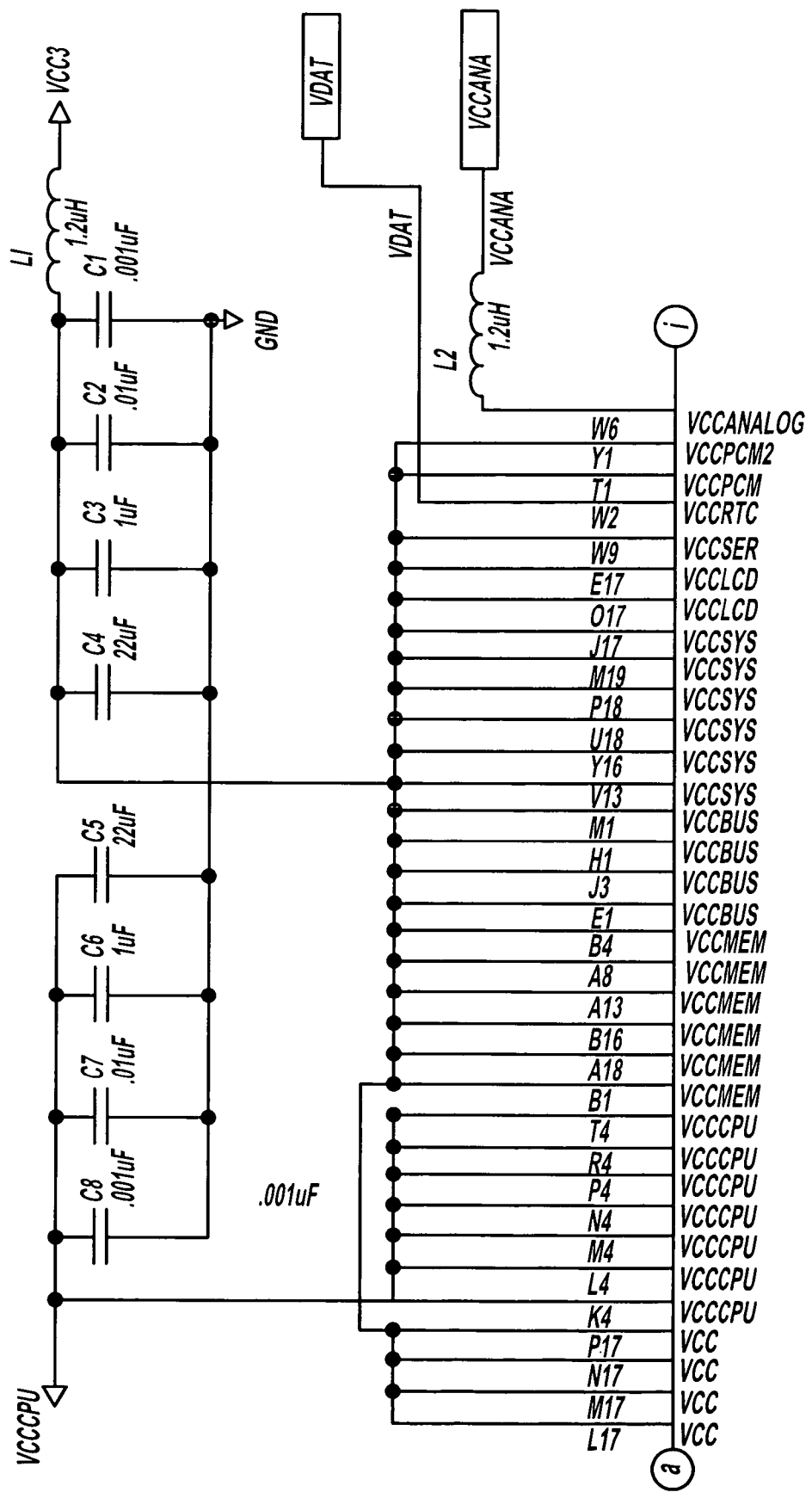
Figures 2, 2E:
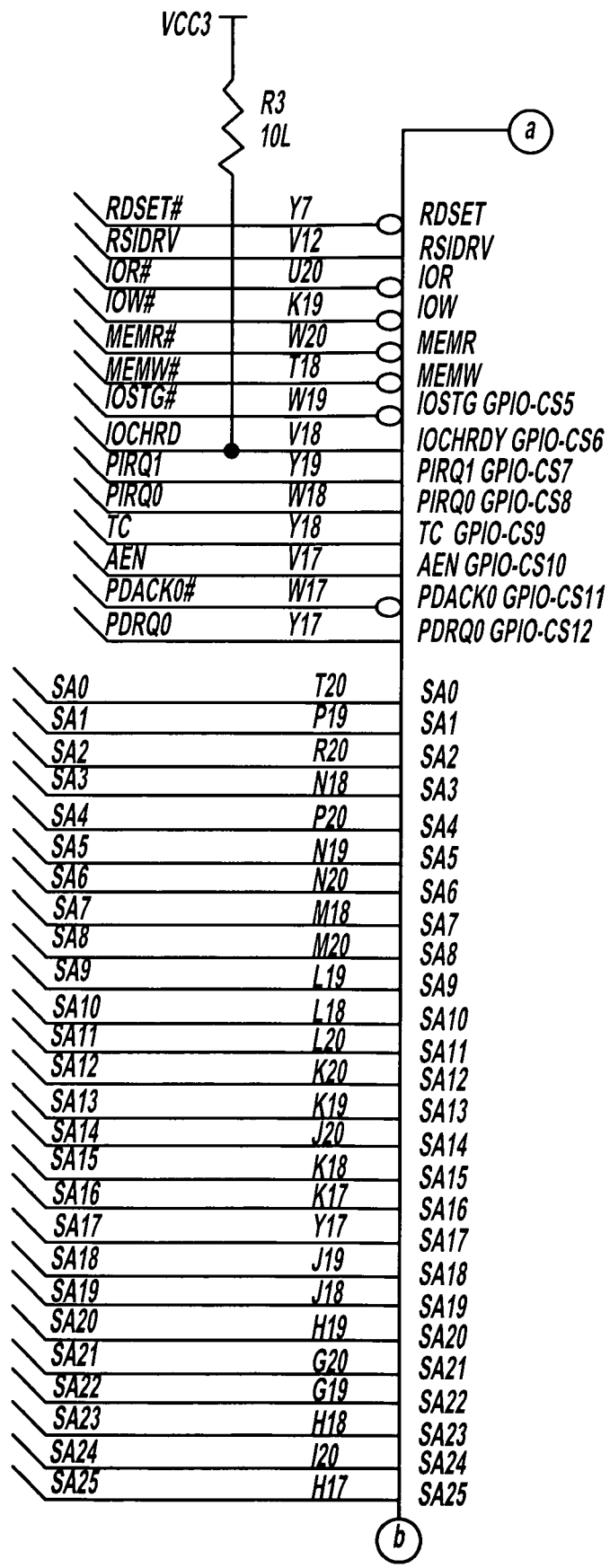
Figures 2, 2E, 3:
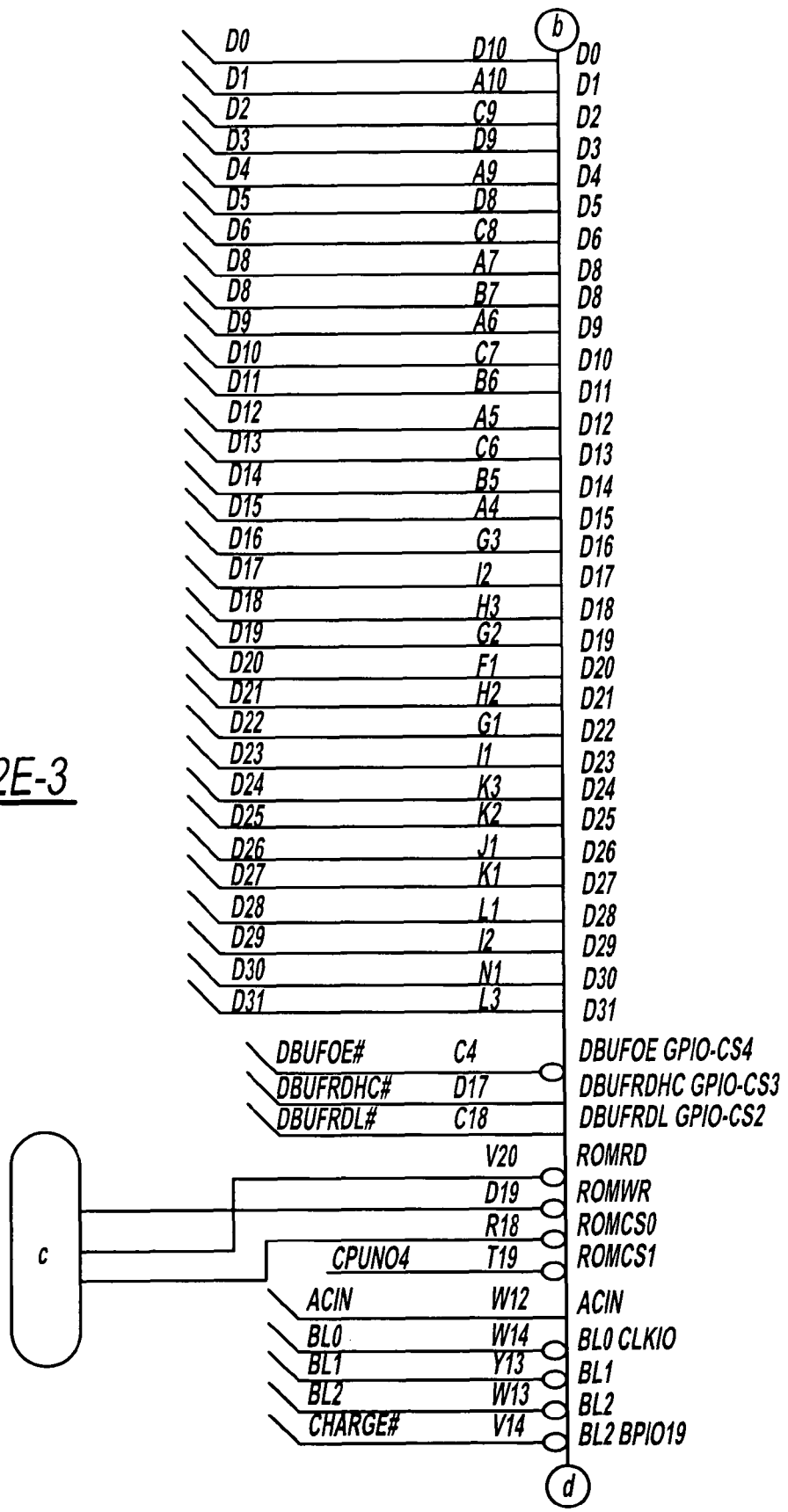
FIG. 3 illustrates device mainboard schematic: daughter-card interconnects modified ISA)

Now turning to FIG. 2, the device hardware platform is depicted as having a CPU and associated buffering and memory: The board is based on the AMD Elan SC400 integrated CPU. Level shifting buffers provide translation between the 3.3 VDC and 5 VDC portions of the system. A 72-pin small-outline dual inline memory module socket provides interface to a standard memory module; this module is used as the system's RAM. A flash-ROM provides non-volatile memory space for the system's BIOS and boot routines.

Daughtercard interface slots (FIG. 3) provide a subset of ISA architecture signals, as well as proprietary signals that provide a card ID interface and predefined slot memory and I/O space decodes.

Figures 2, 2E, 3, 4:
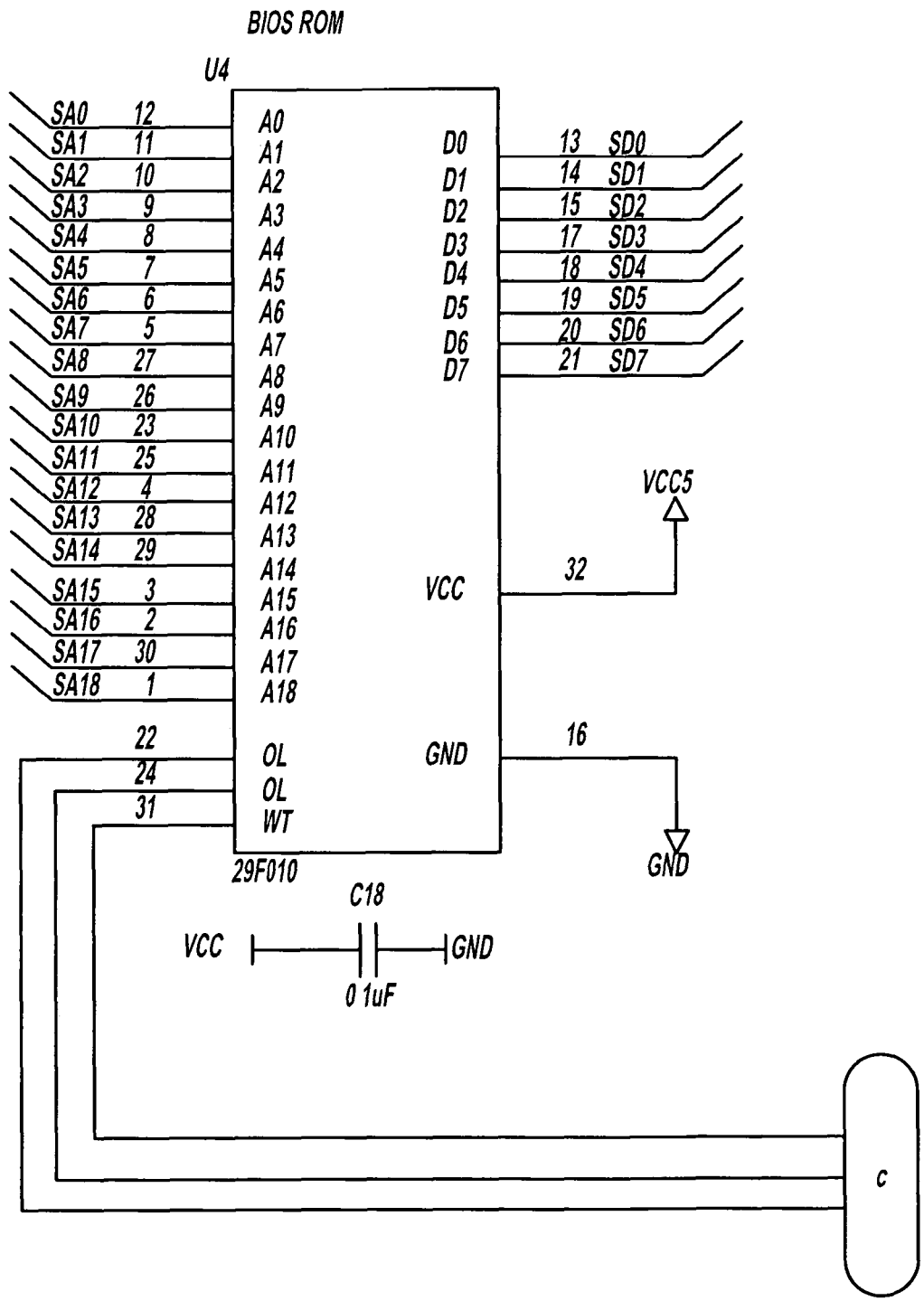
FIG. 4 illustrates device mainboard schematic.
Figures 2, 2E, 3, 4, 5:
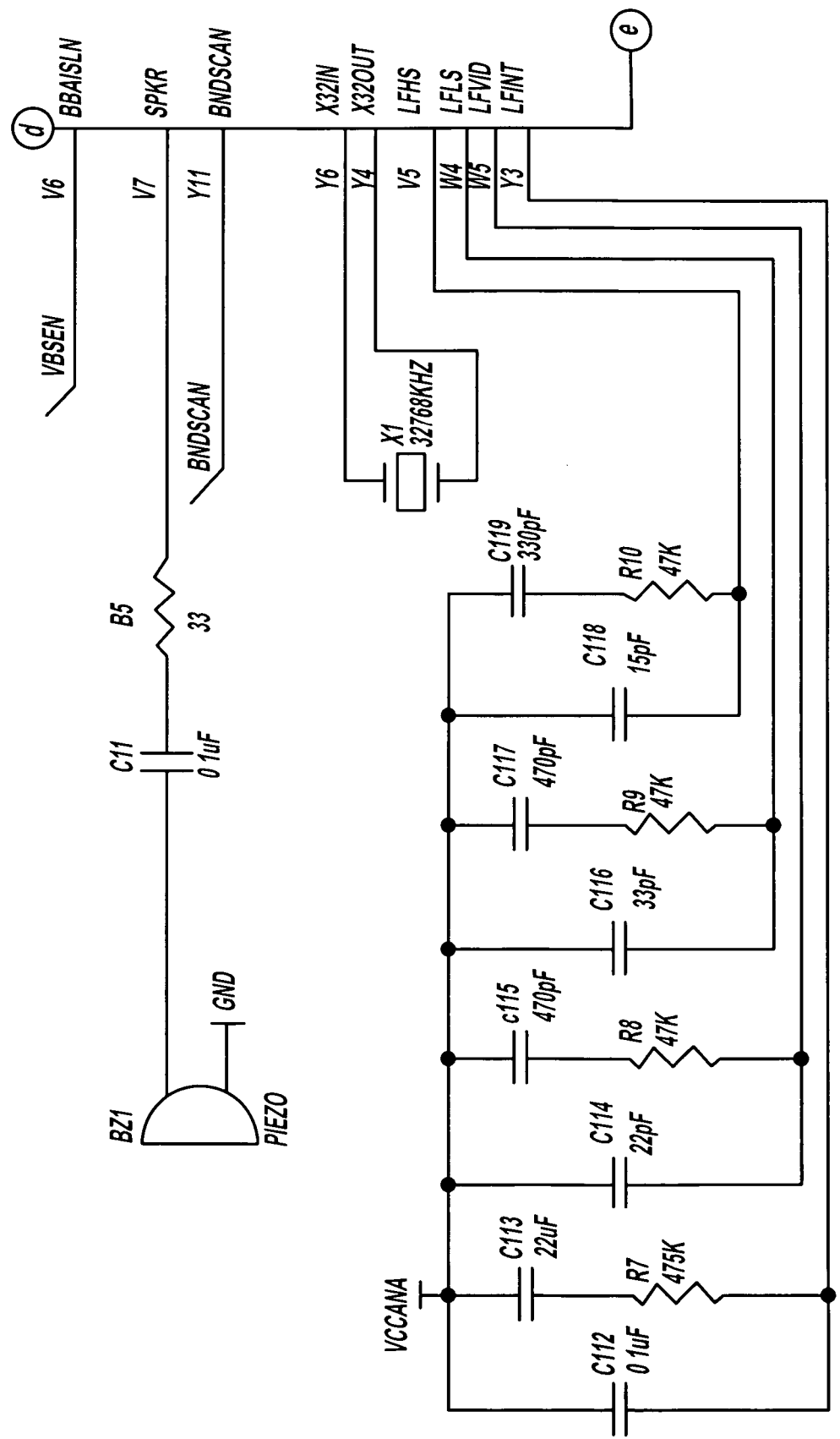
FIG. 5 illustrates device mainboard schematic: Serial devices (RS232 port, IRDA transceiver)
Figures 2, 2E, 3, 4, 5, 6:
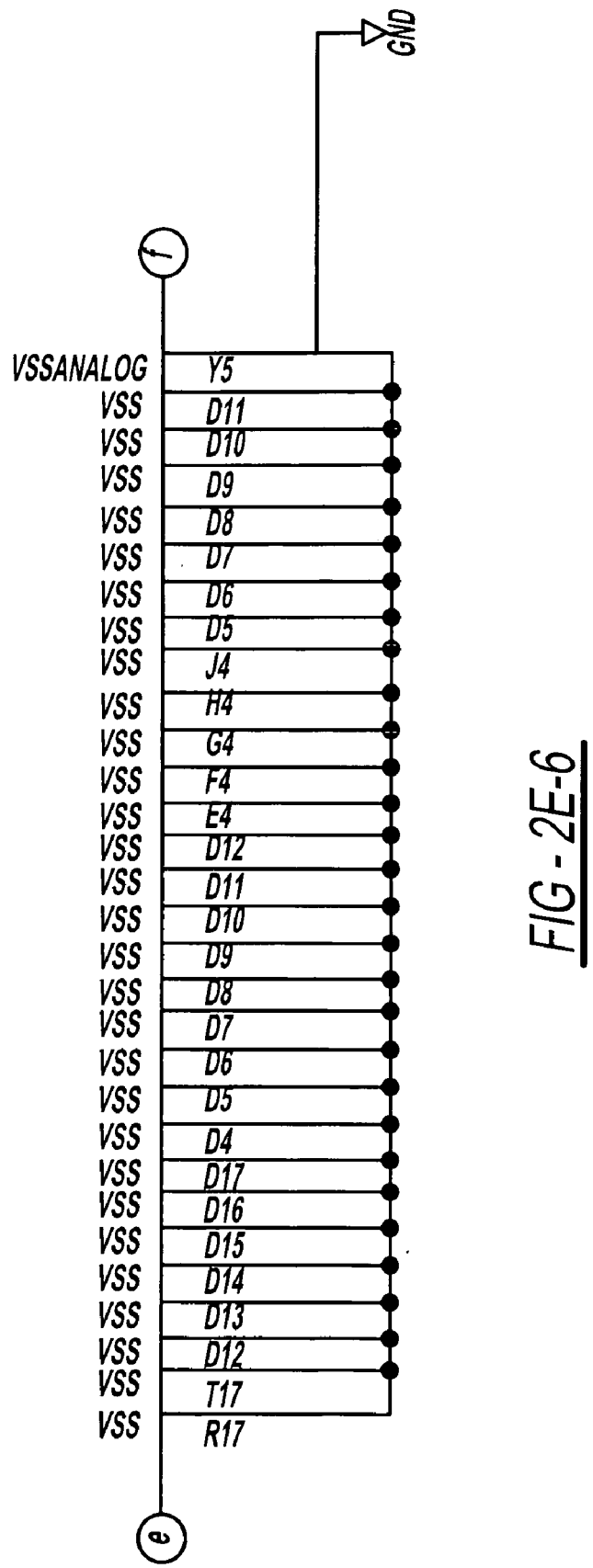
FIG. 6 illustrates device mainboard schematic: I/O devices (LCD, keypad connections.

Now turning to FIG. 4, PCMCIA sockets are provided for attachment of industry-standard PCMCIA devices. Serial interfaces are depicted in FIG. 5. LCD and keypad are shown in FIG. 6. An alphanumeric LCD interface and a 4-key keypad interface are provided for user input/output capabilities.

Figures 2, 2E, 3, 4, 5, 6, 7:
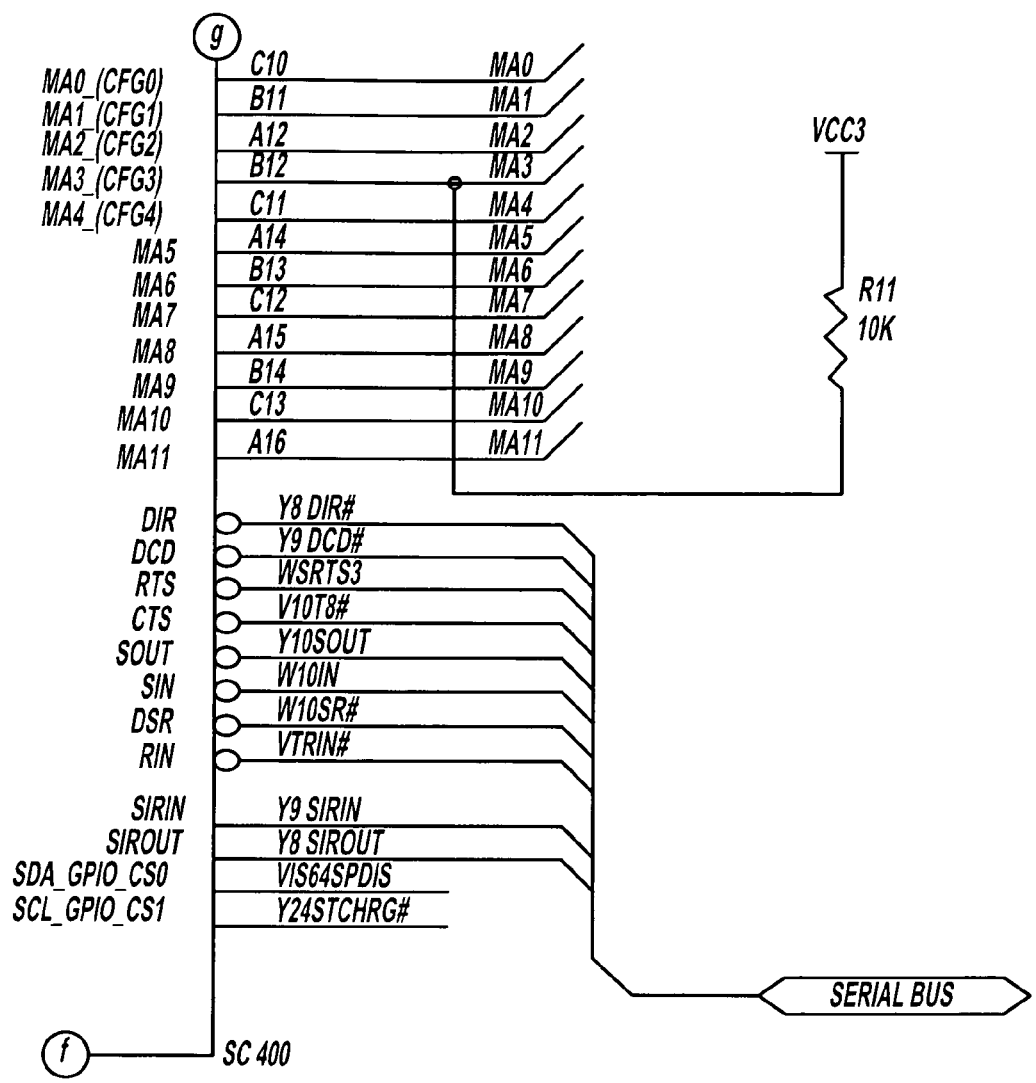
FIG. 7 illustrates device mainboard schematic: Ethernet controller.
Figures 2, 2E, 3, 4, 5, 6, 7, 8, 9:
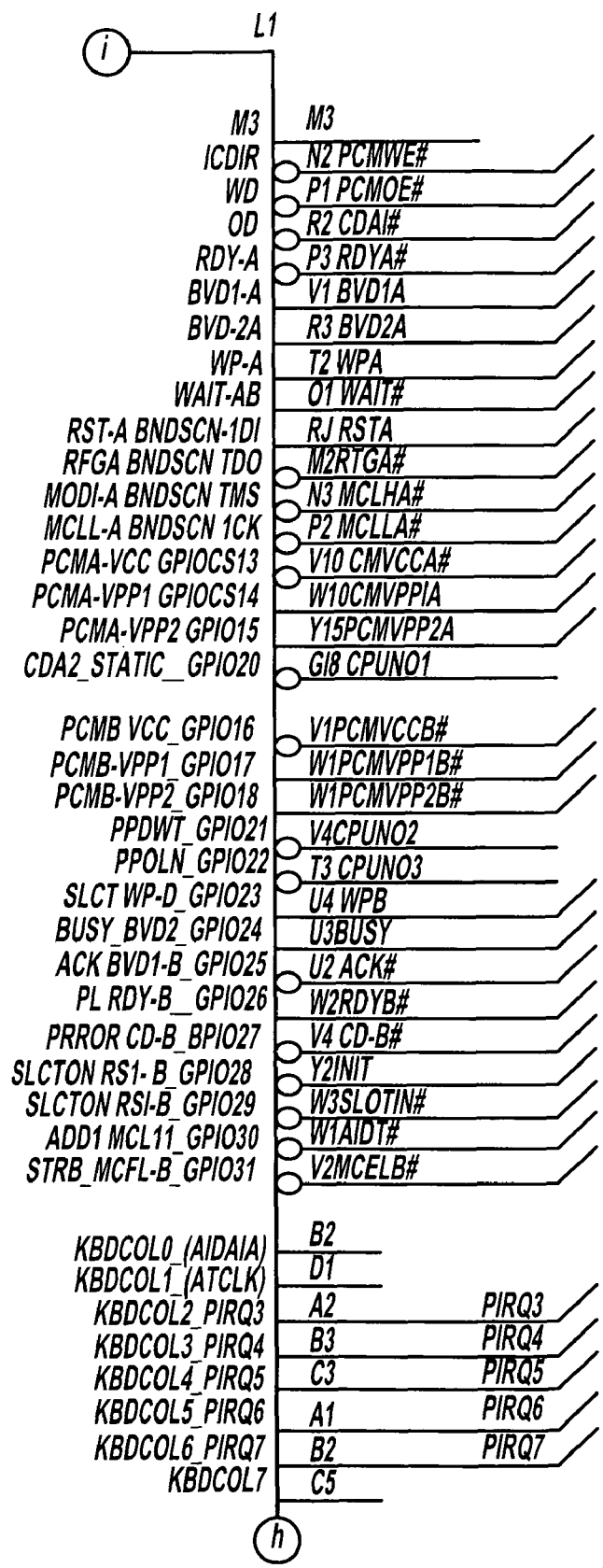
FIG. 8 illustrates device mainboard schematic: power supply interconnect.
FIG. 9 illustrates device mainboard schematic: IDE device interface.
Figure 3A:
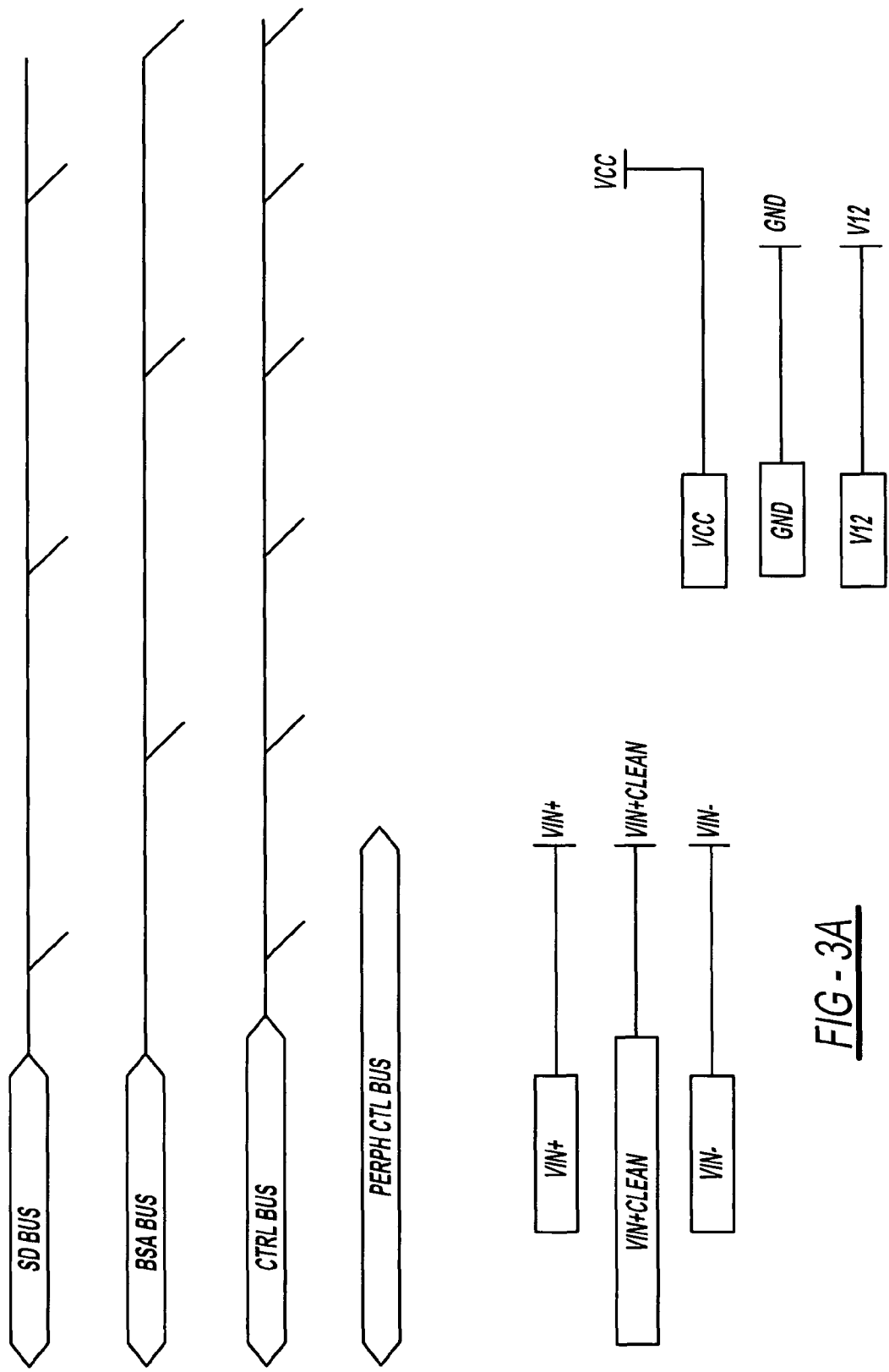
Figures 1, 3B:
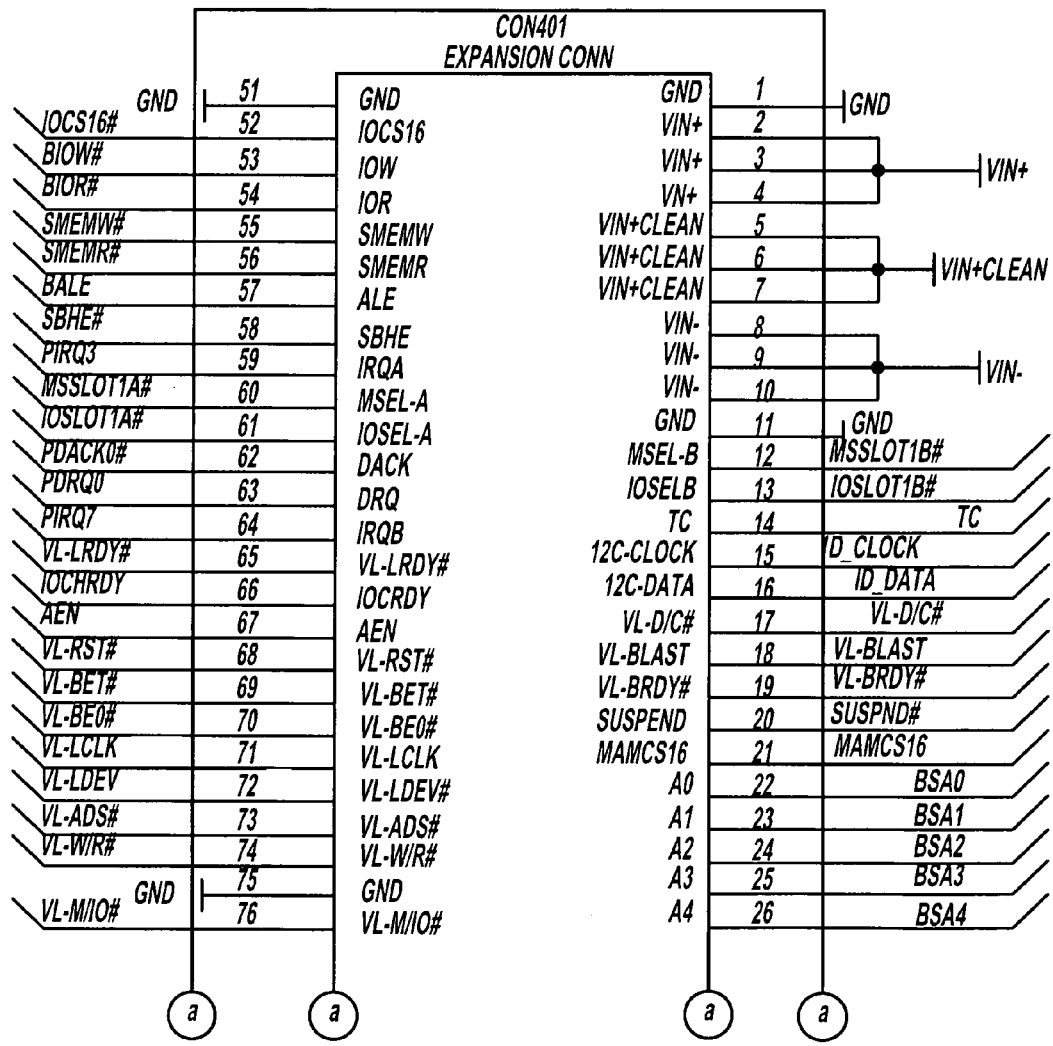
Figures 2, 3B:
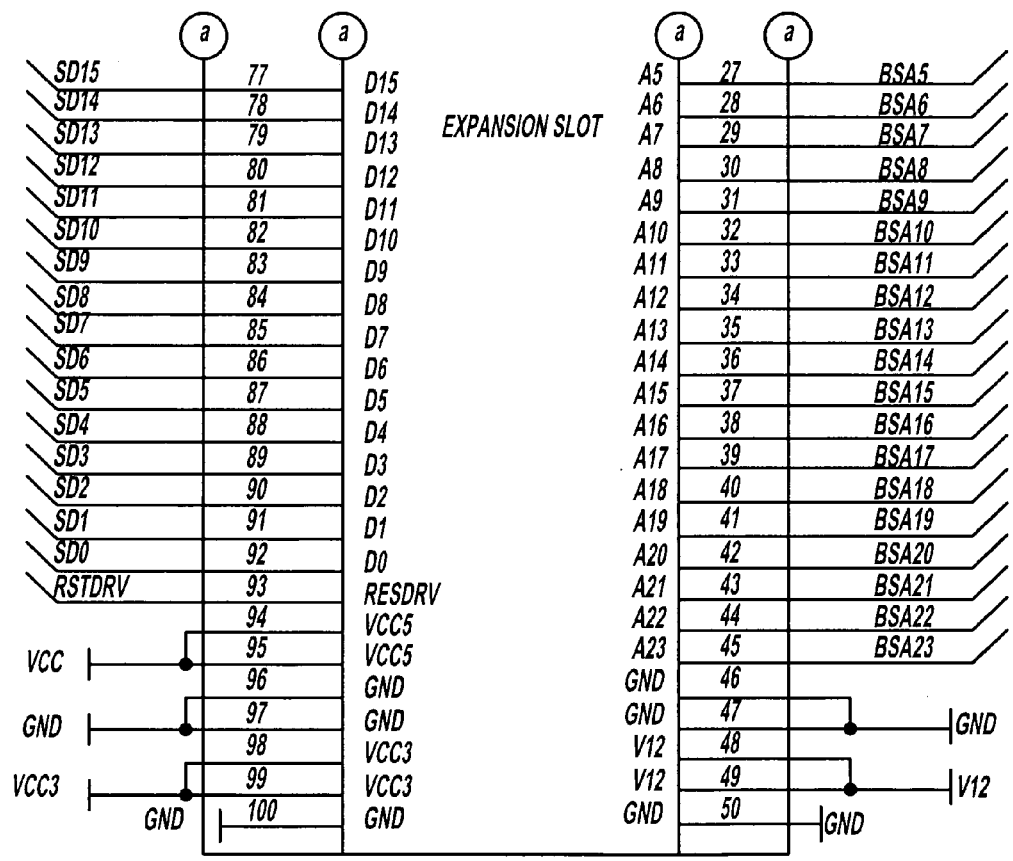
Figures 1, 3C:
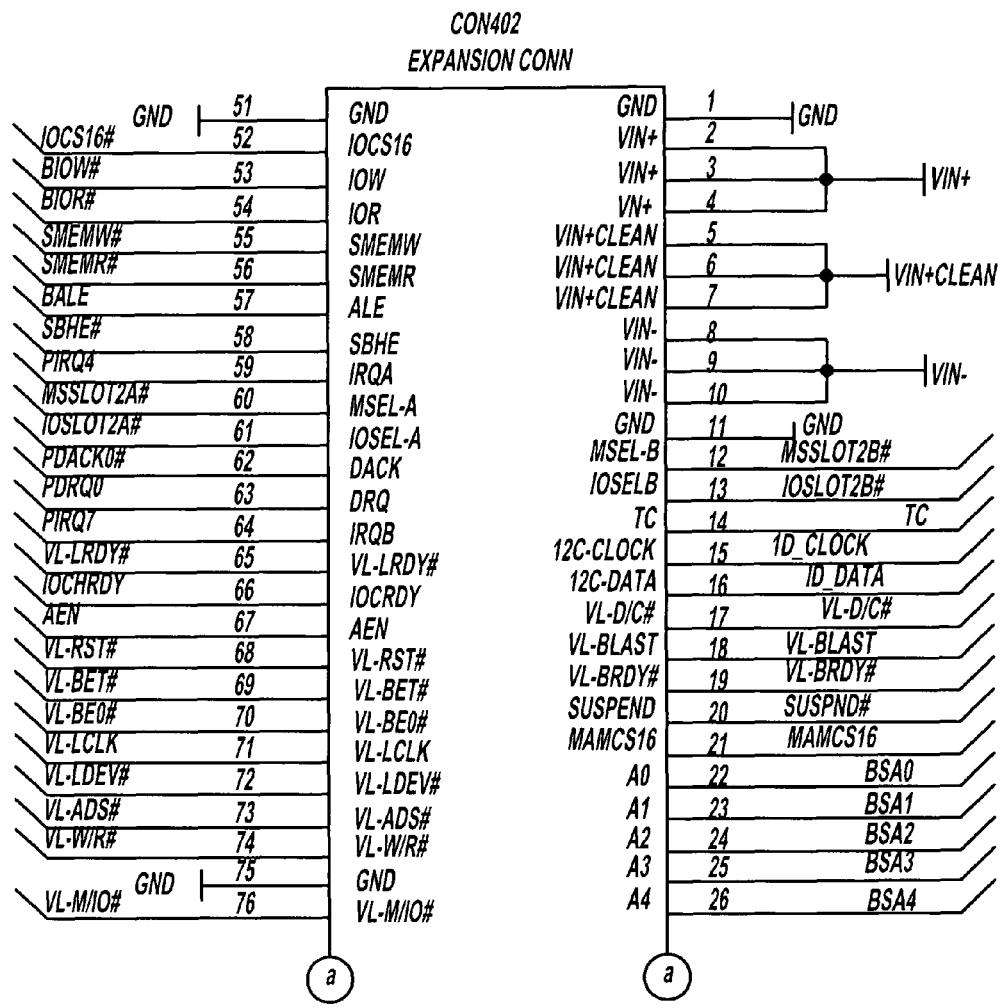
Figures 2, 3C:
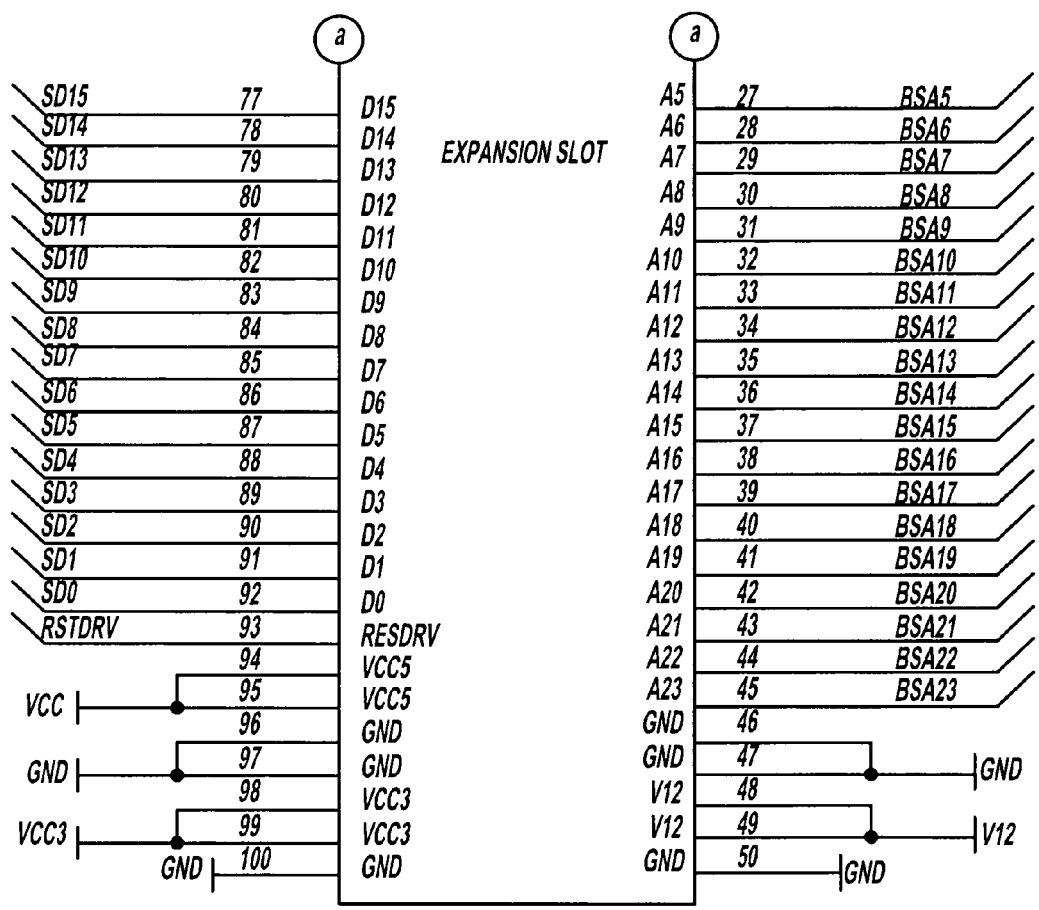
Figures 1, 3D:
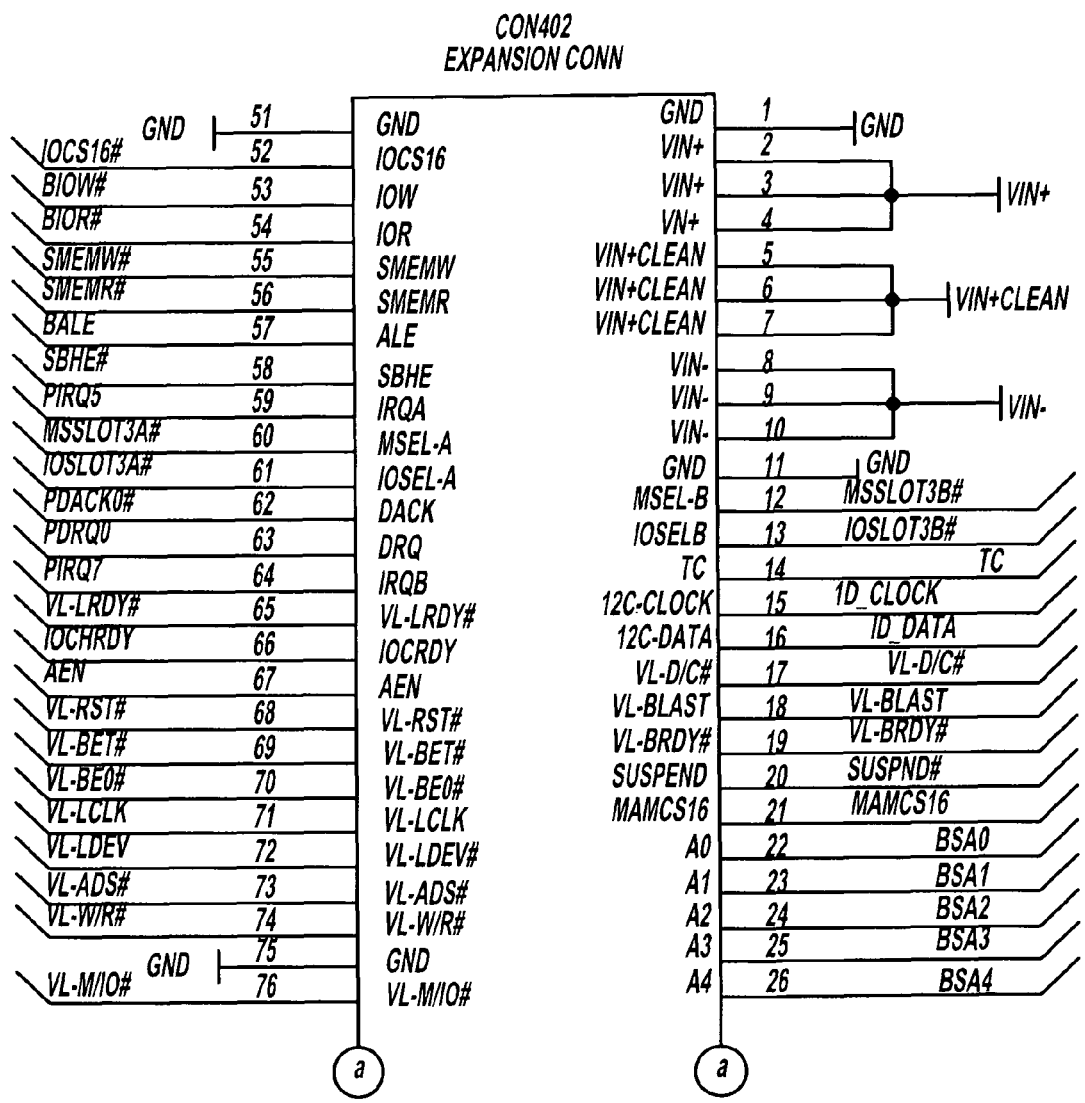
Figures 2, 3D:
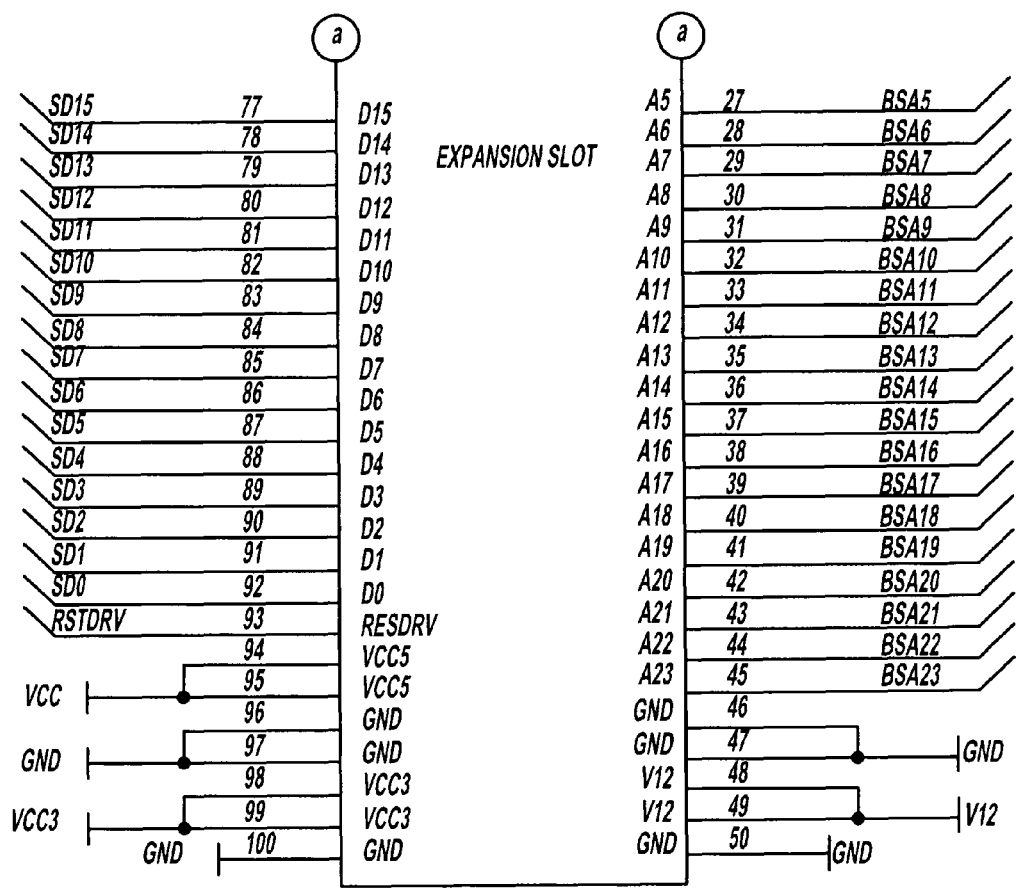
Figure 4A:
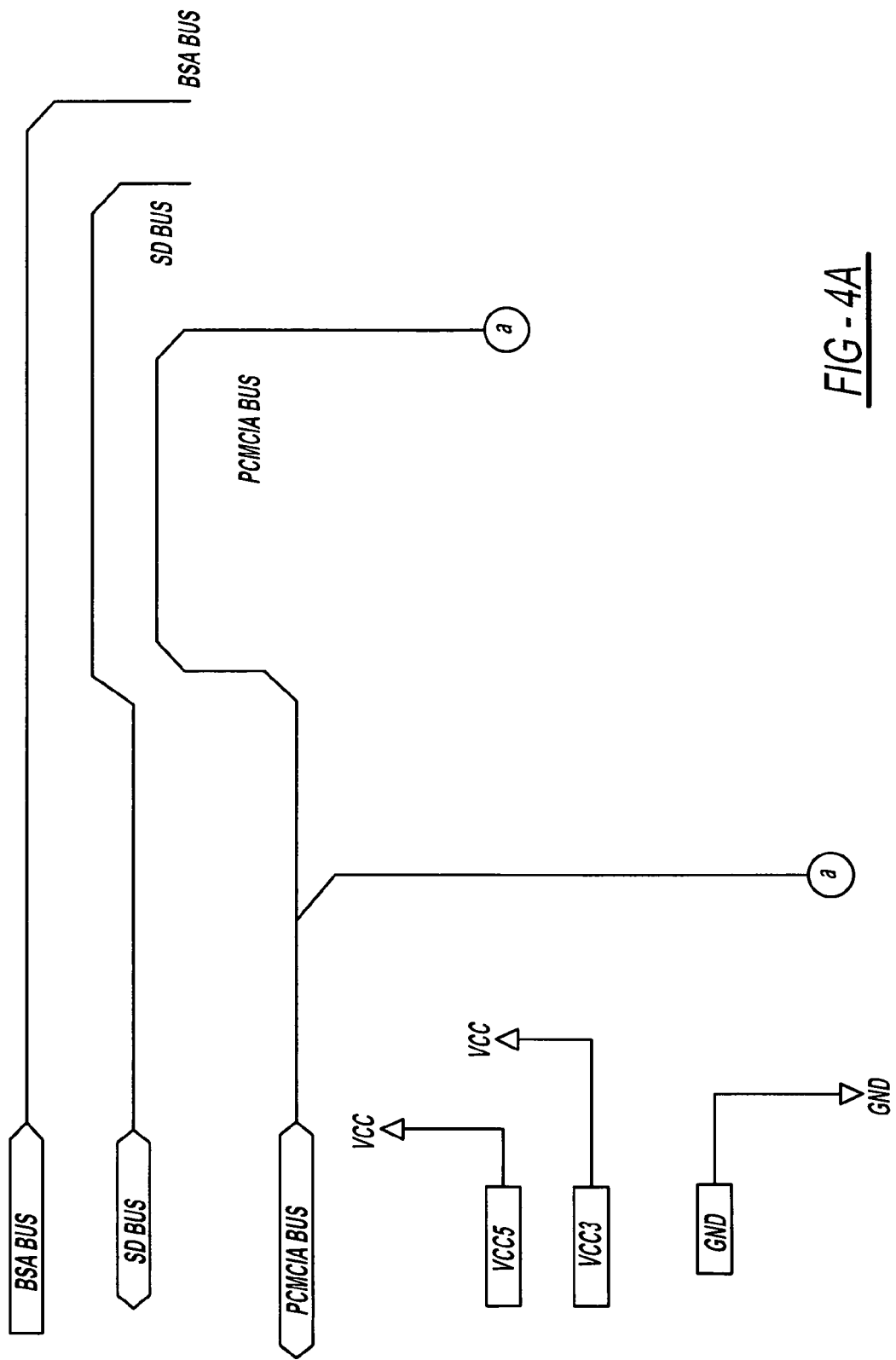
Figure 4B:
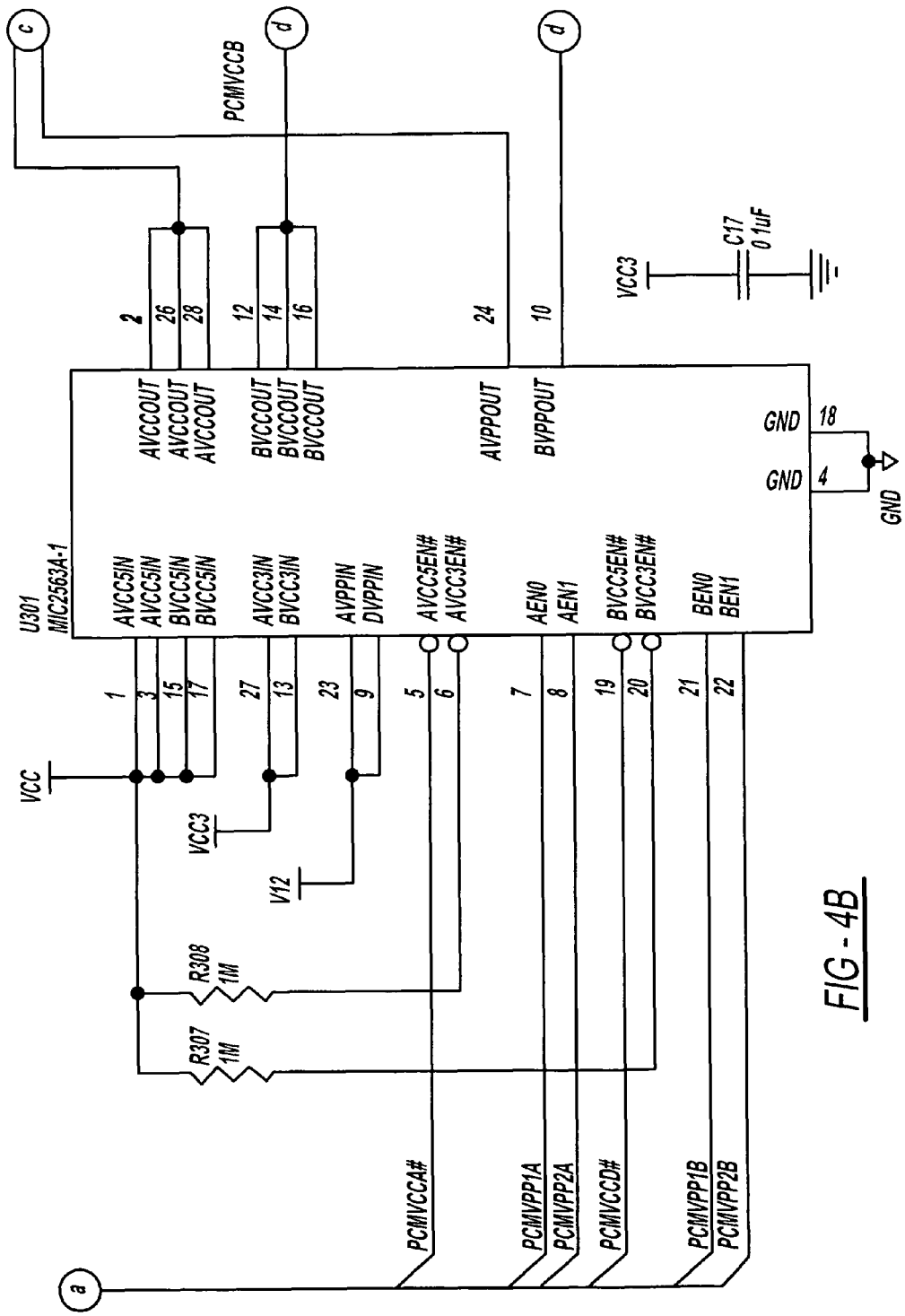
Figure 4C:
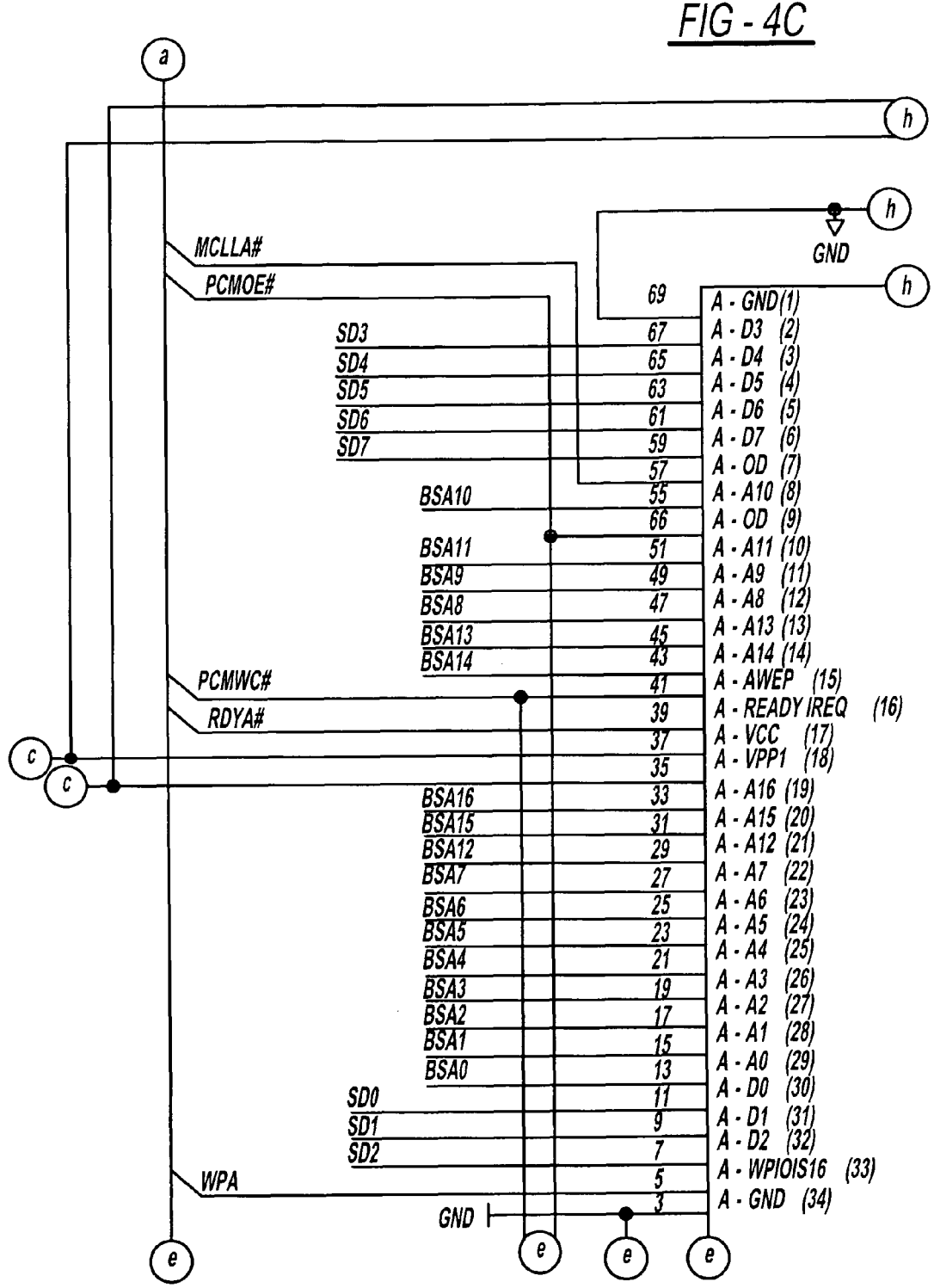
Figure 4E:
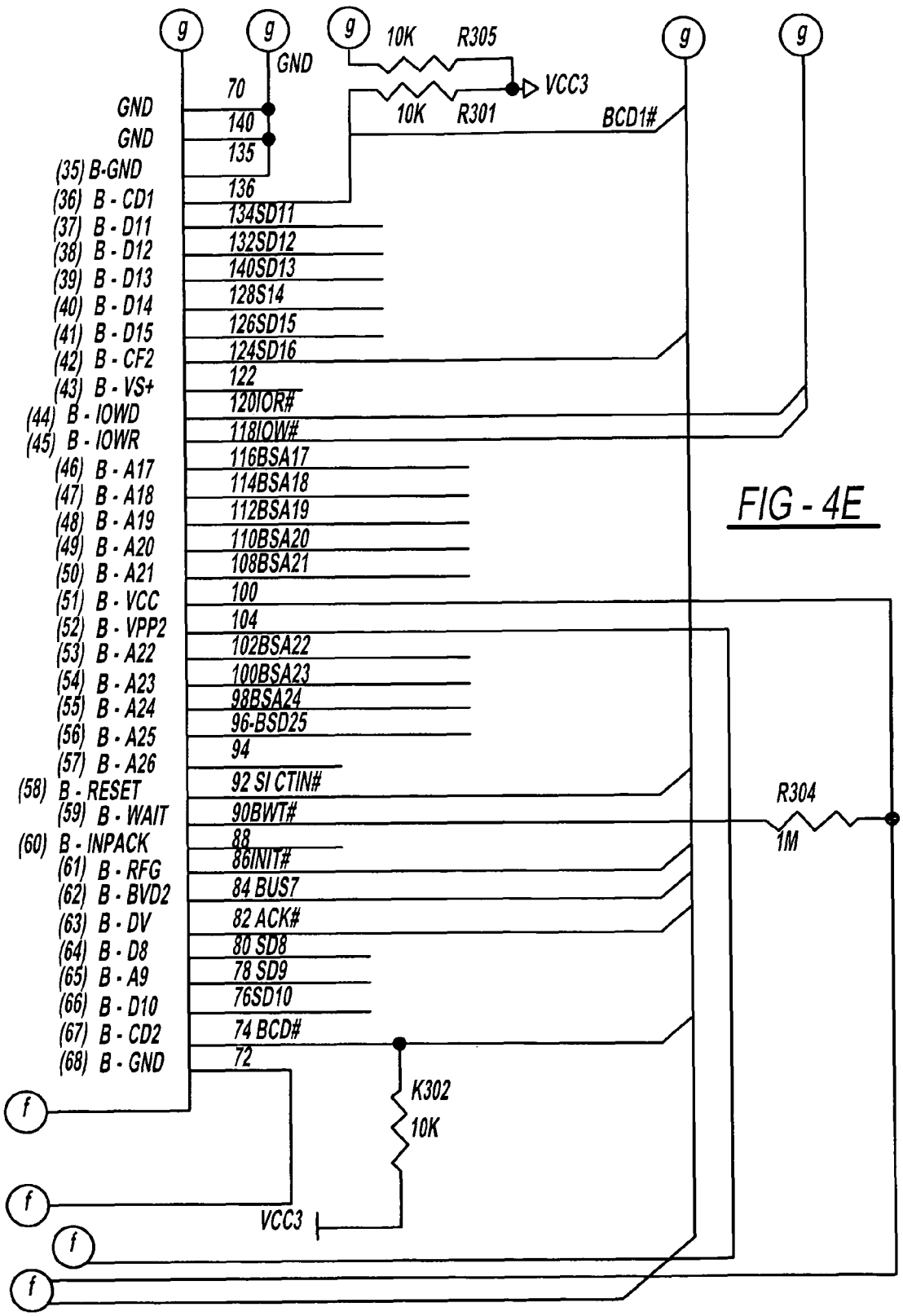
Figure 4F:
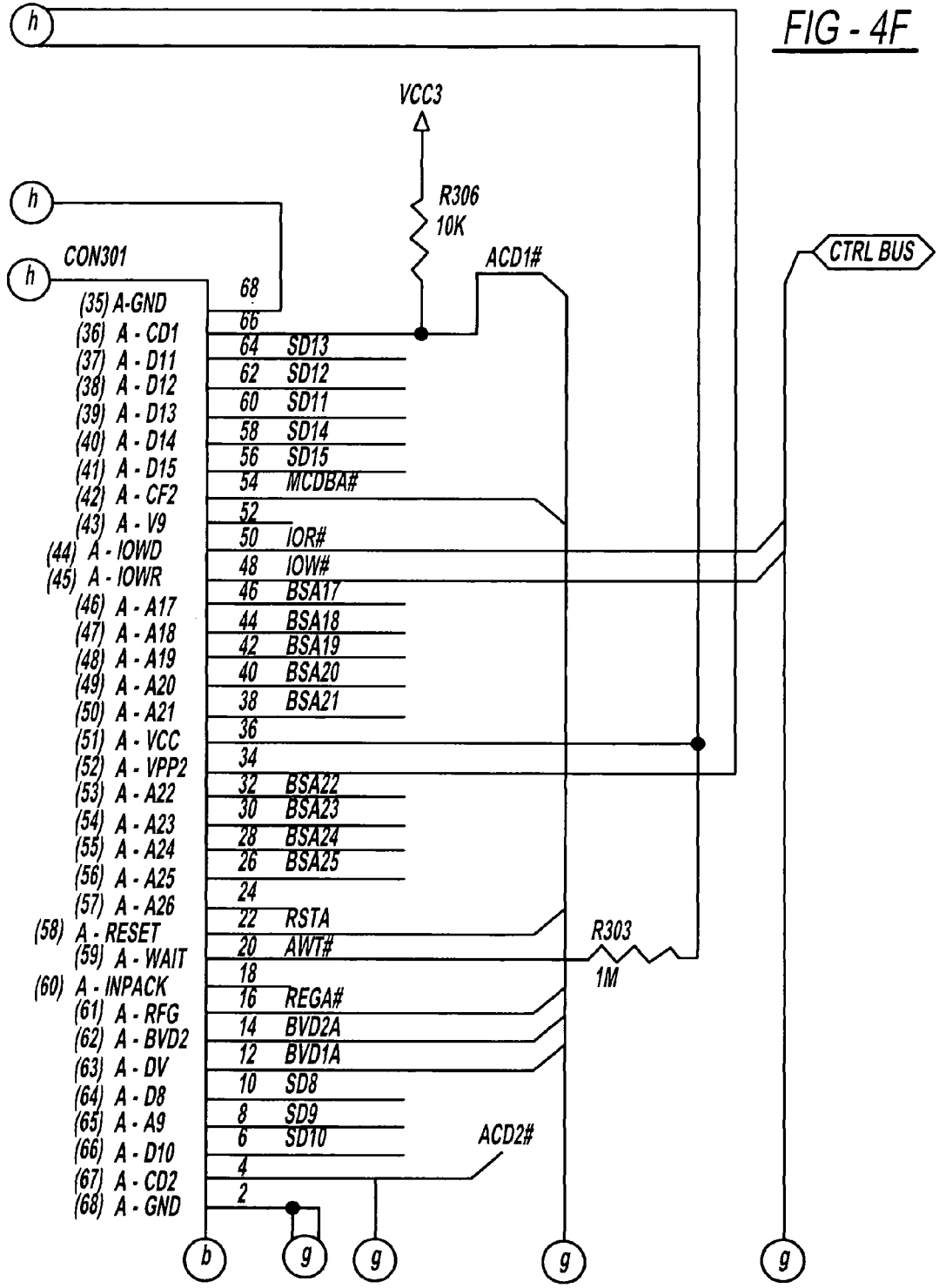
Figure 5A:
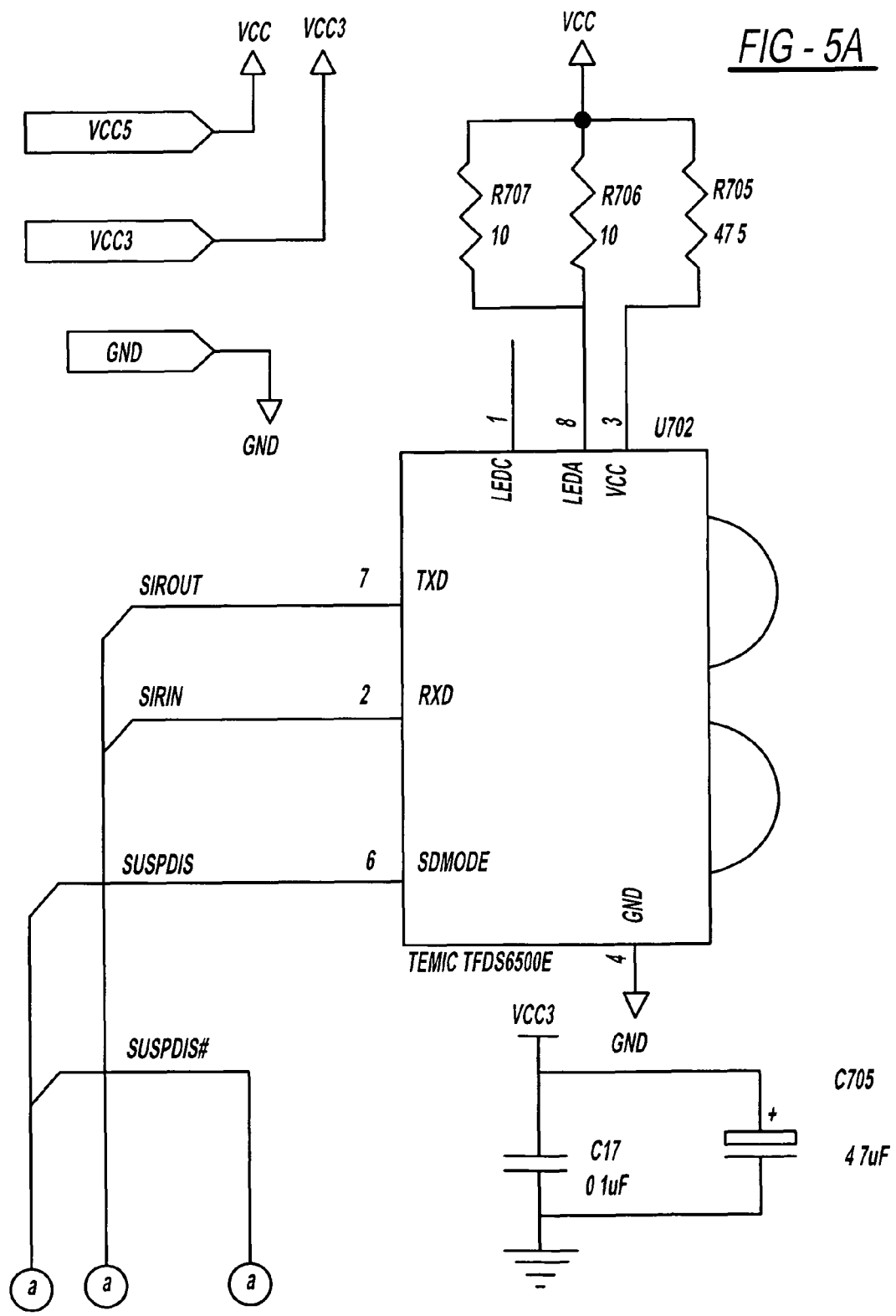
Figure 5B:
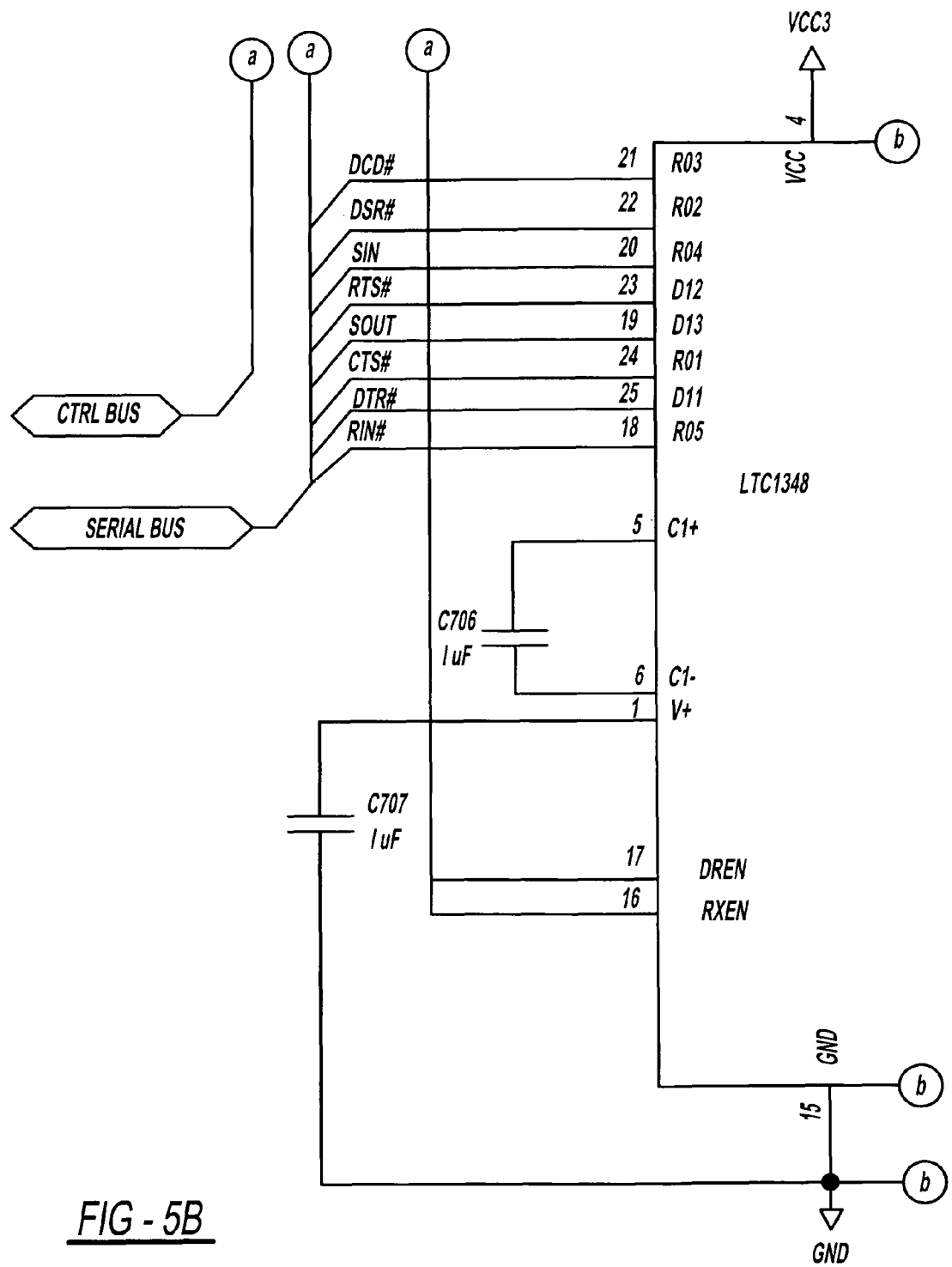
Figure 5C:
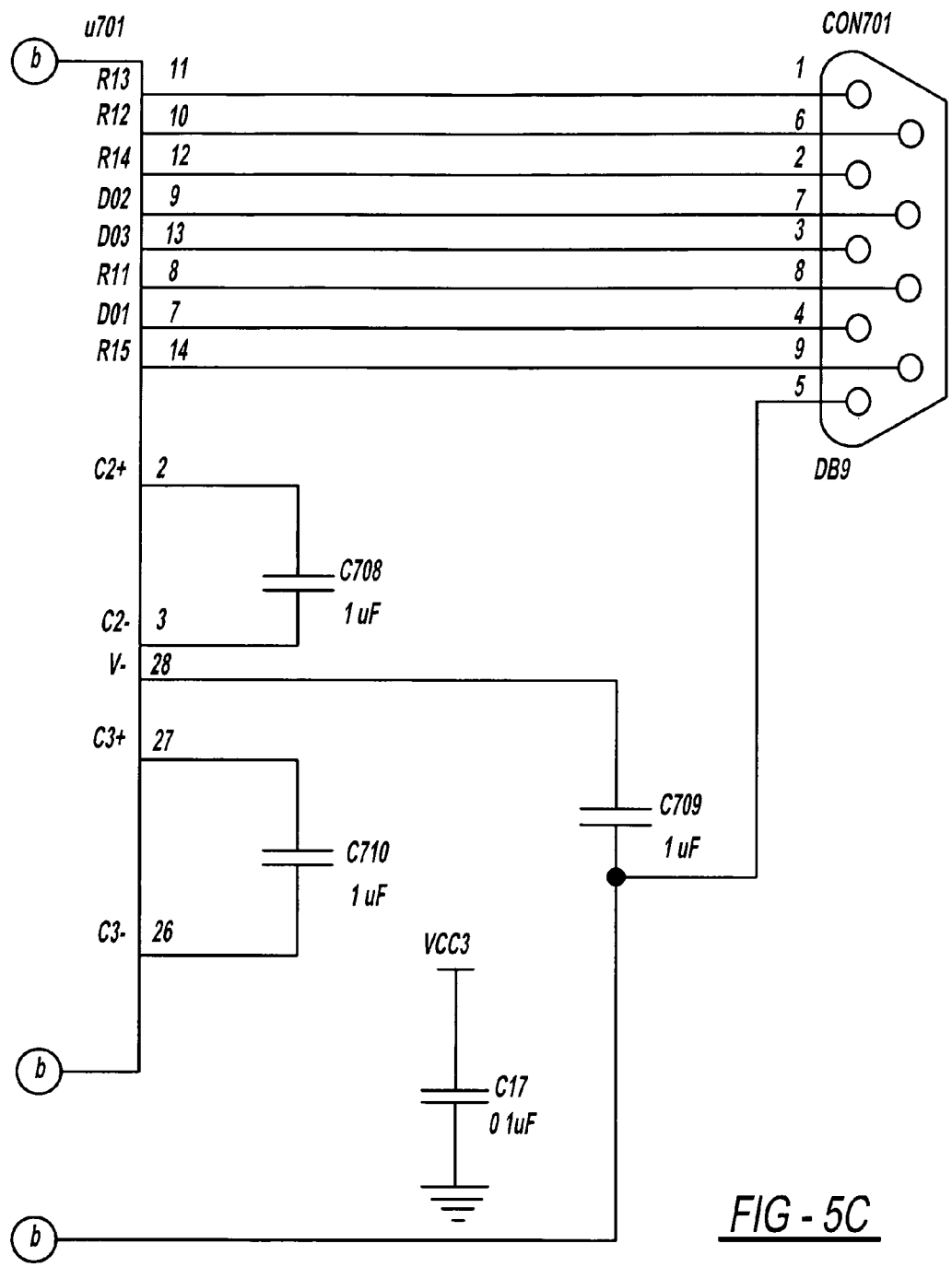
Figure 6A:
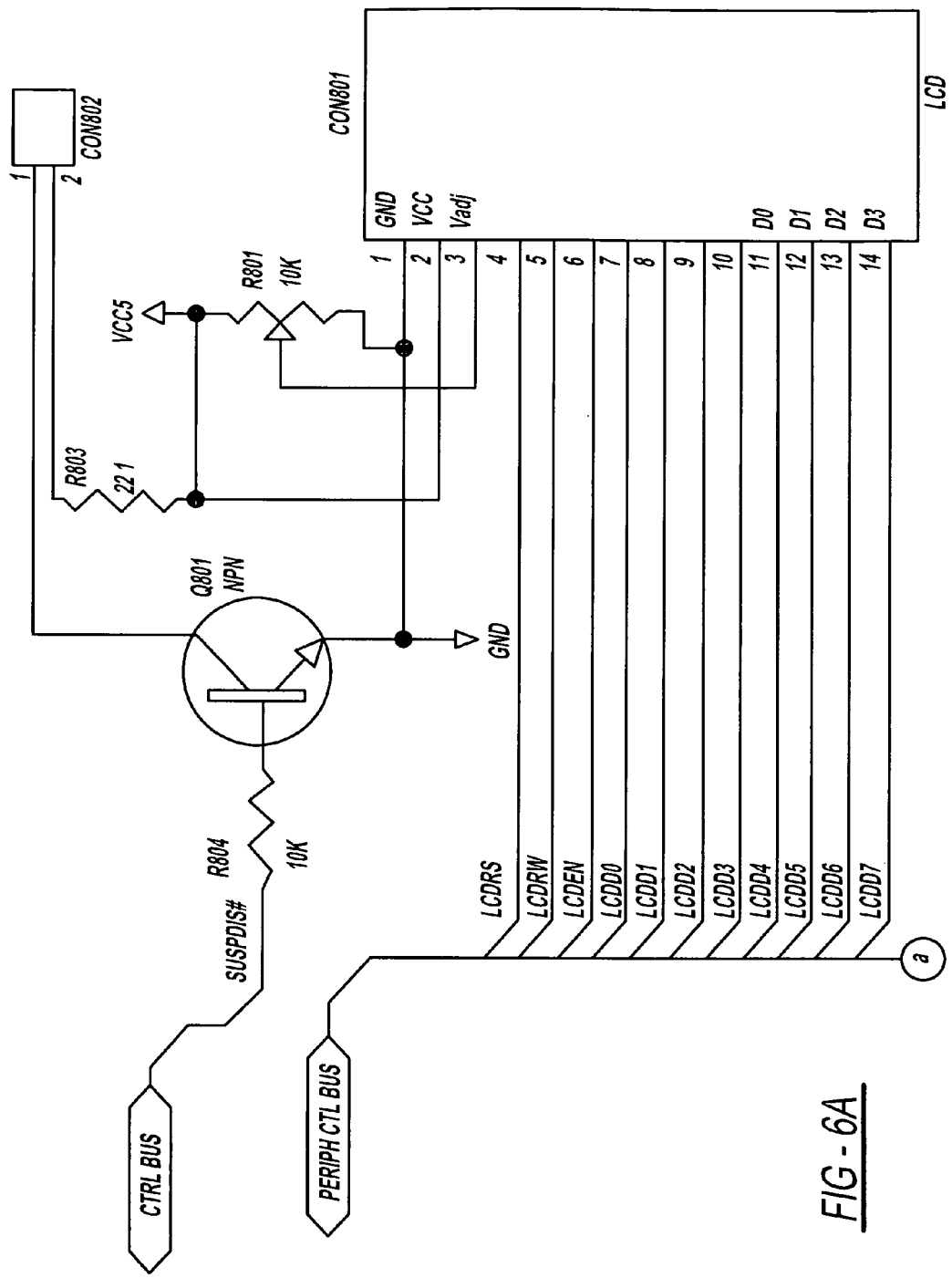
Figure 6B:
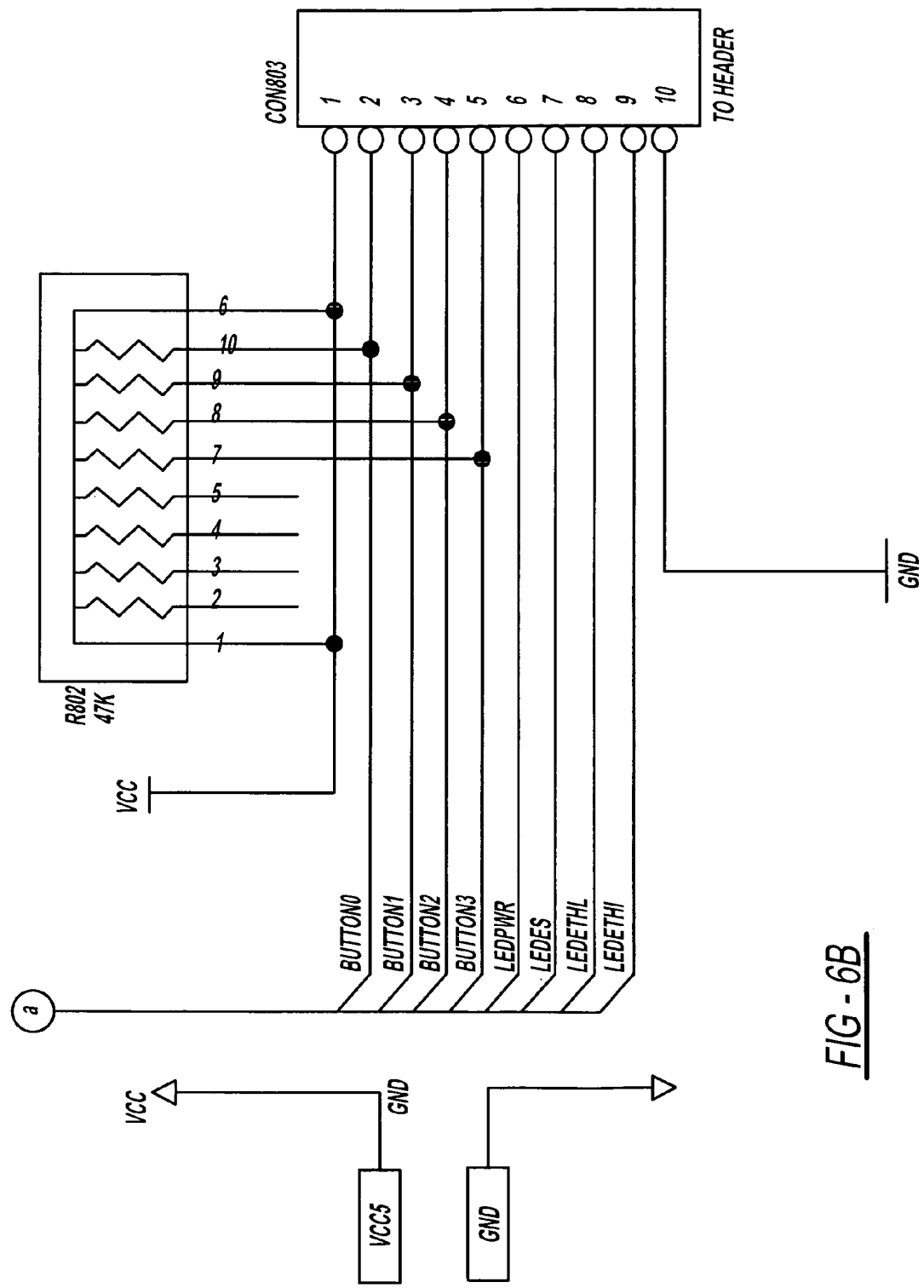
Figure 7A:
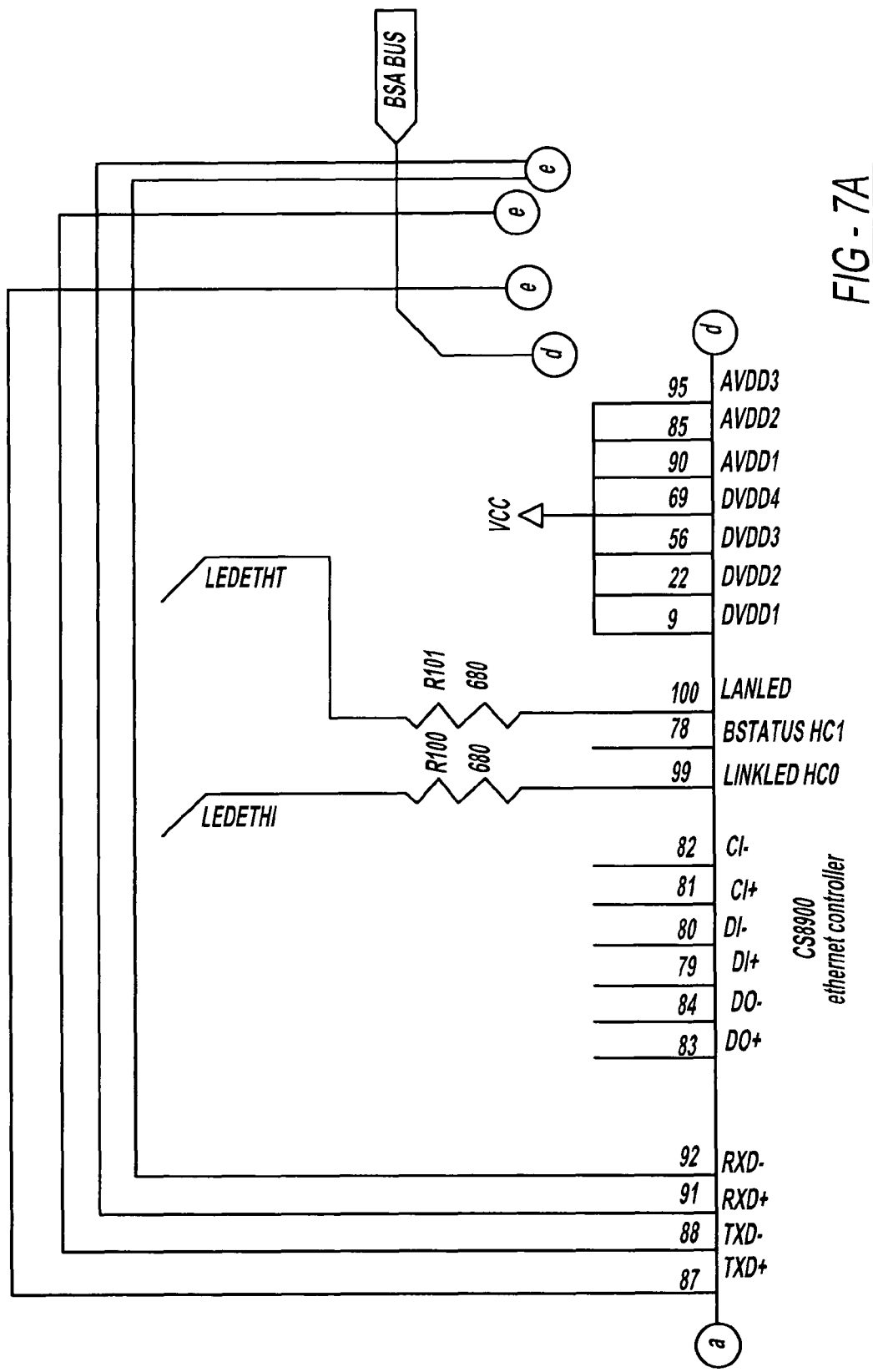
Figure 7B:
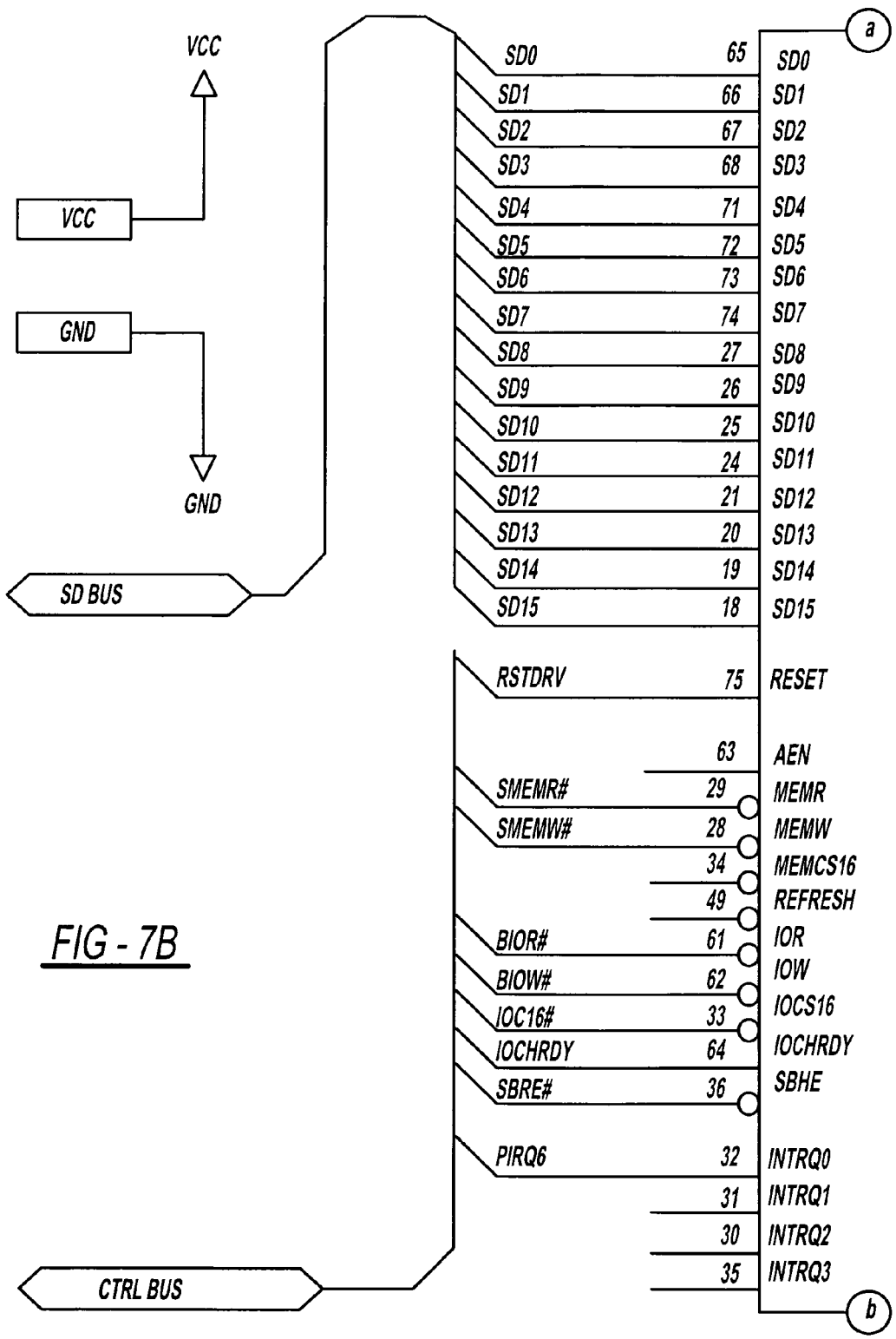
Figure 7C:
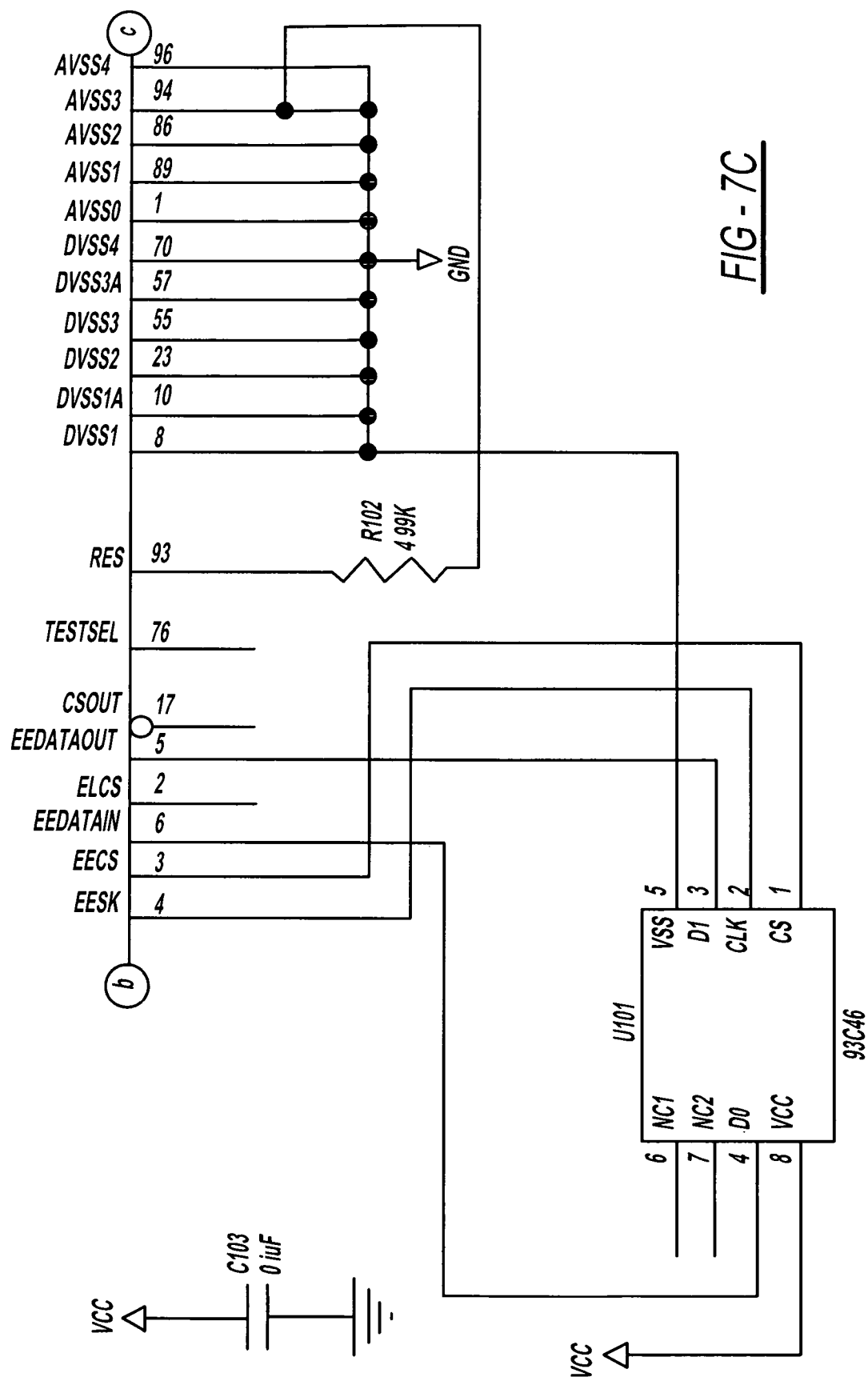
Figure 7D:
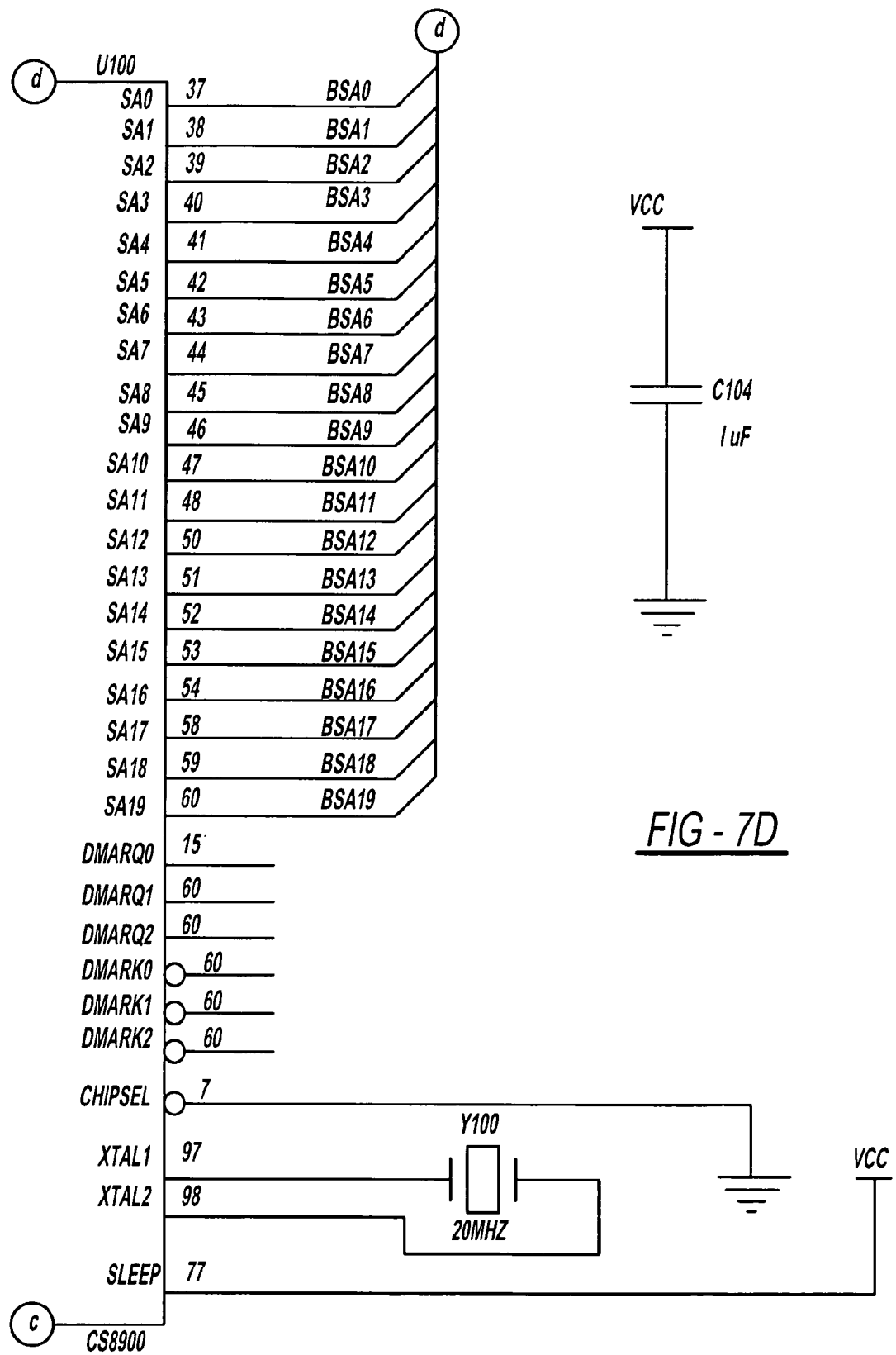
Figure 7E:
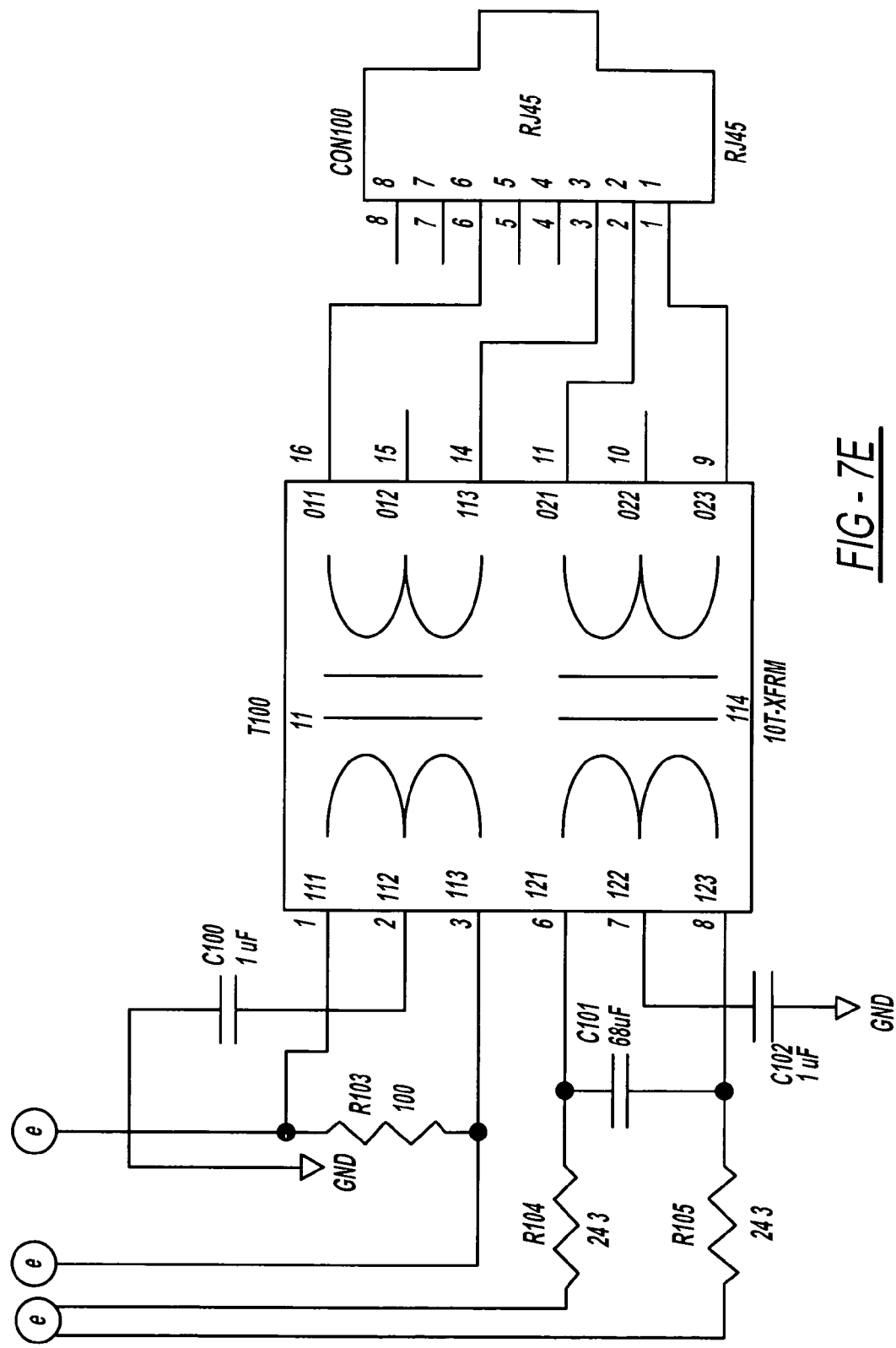
Figure 8A:
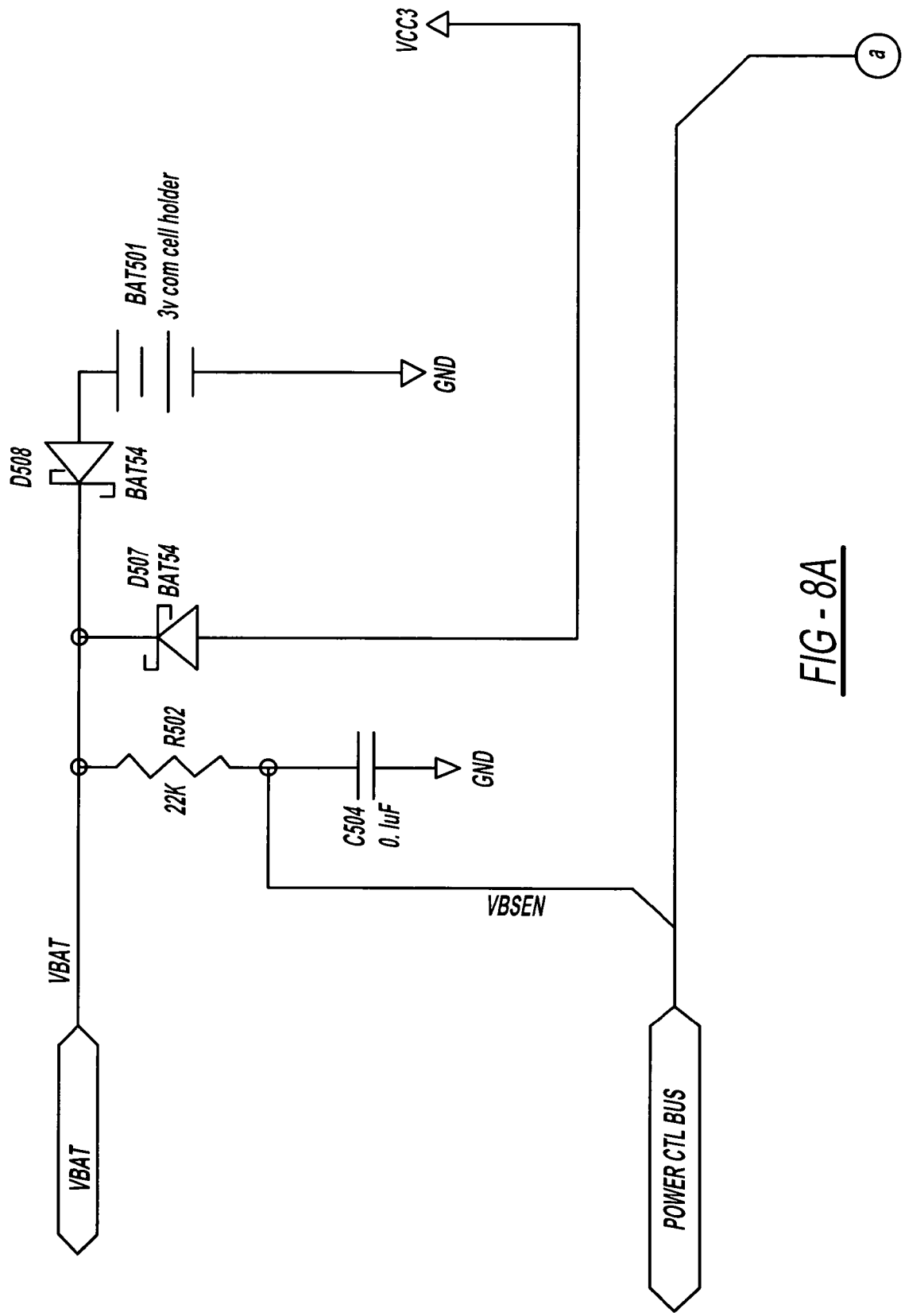
Figure 8C:
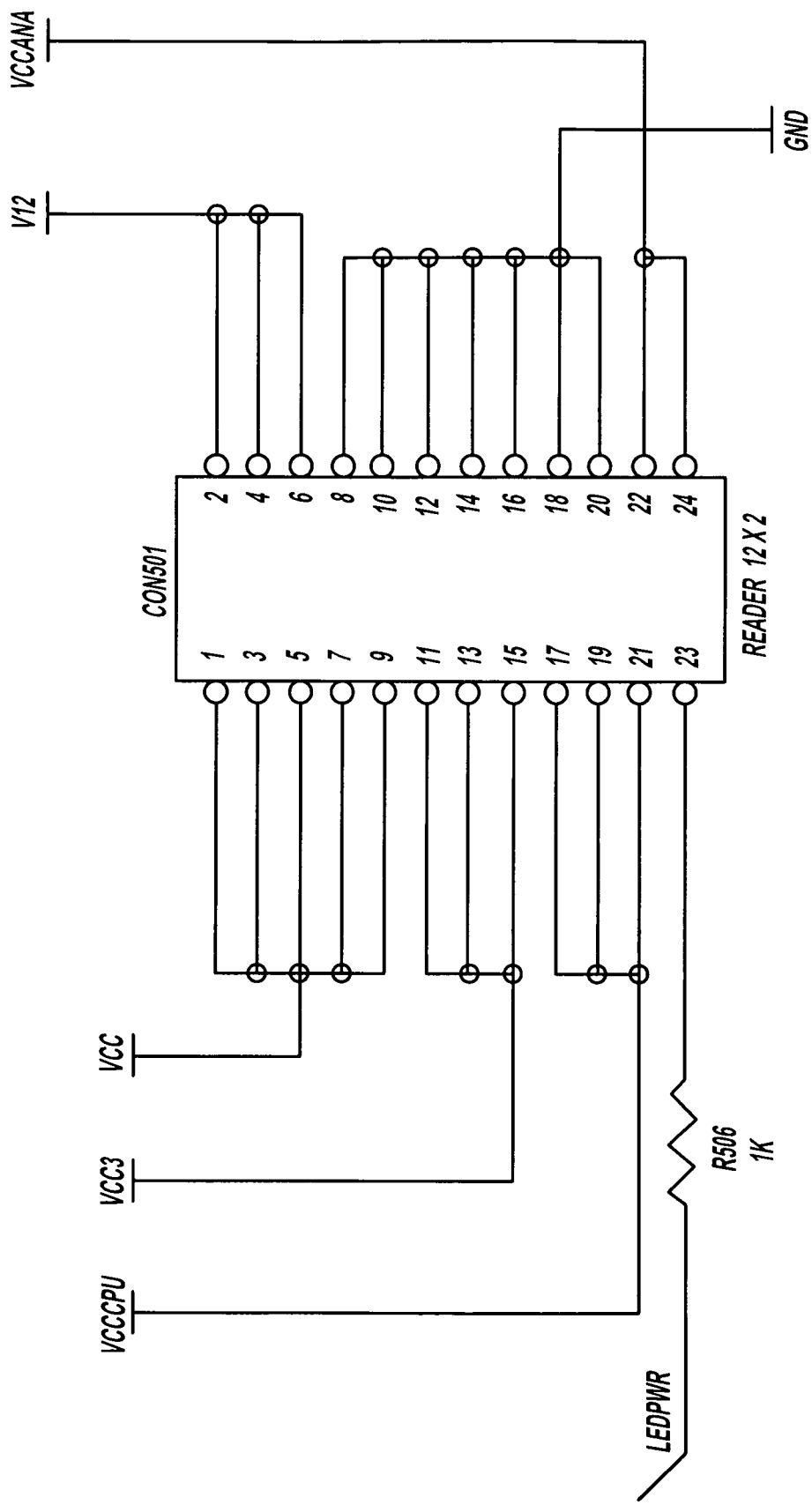
Figure 8E:
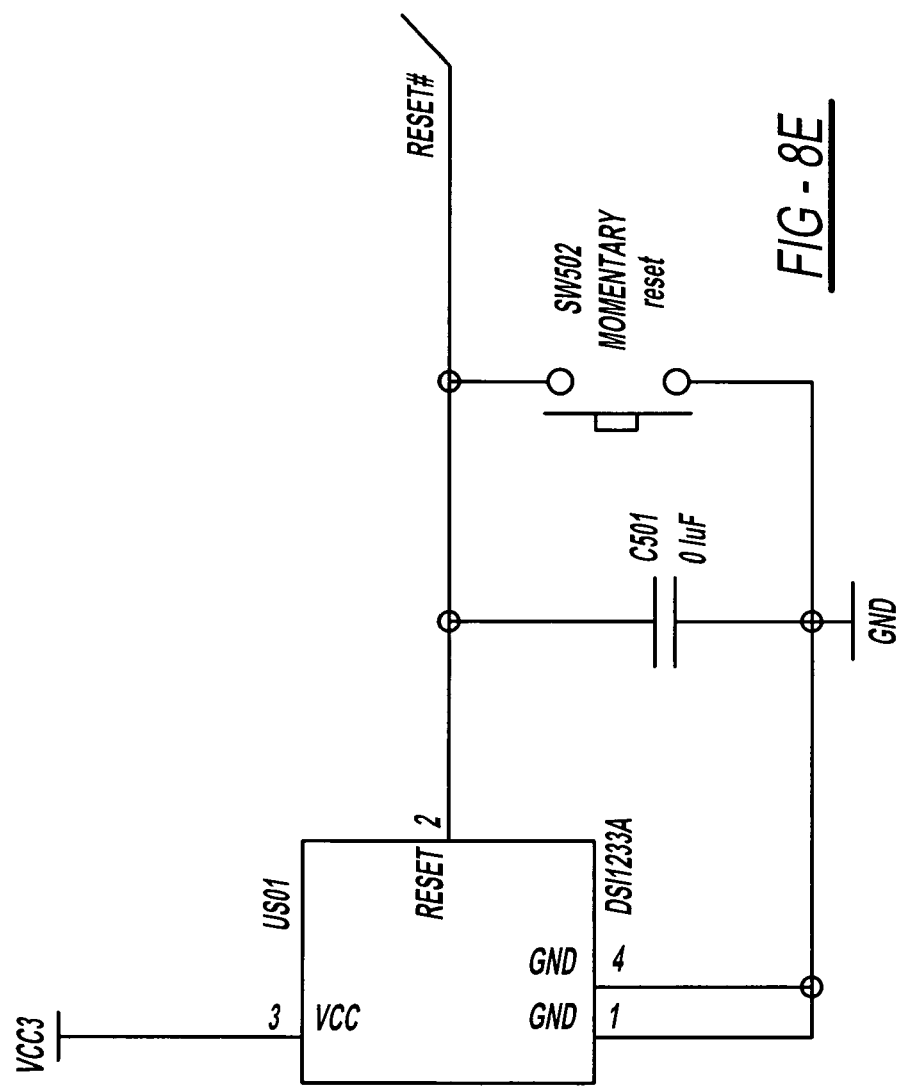
Figure 8D:
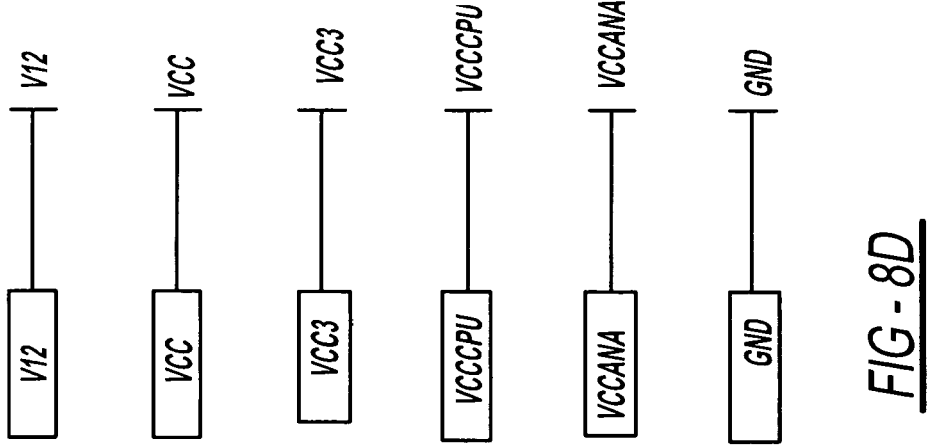
Figure 9A:
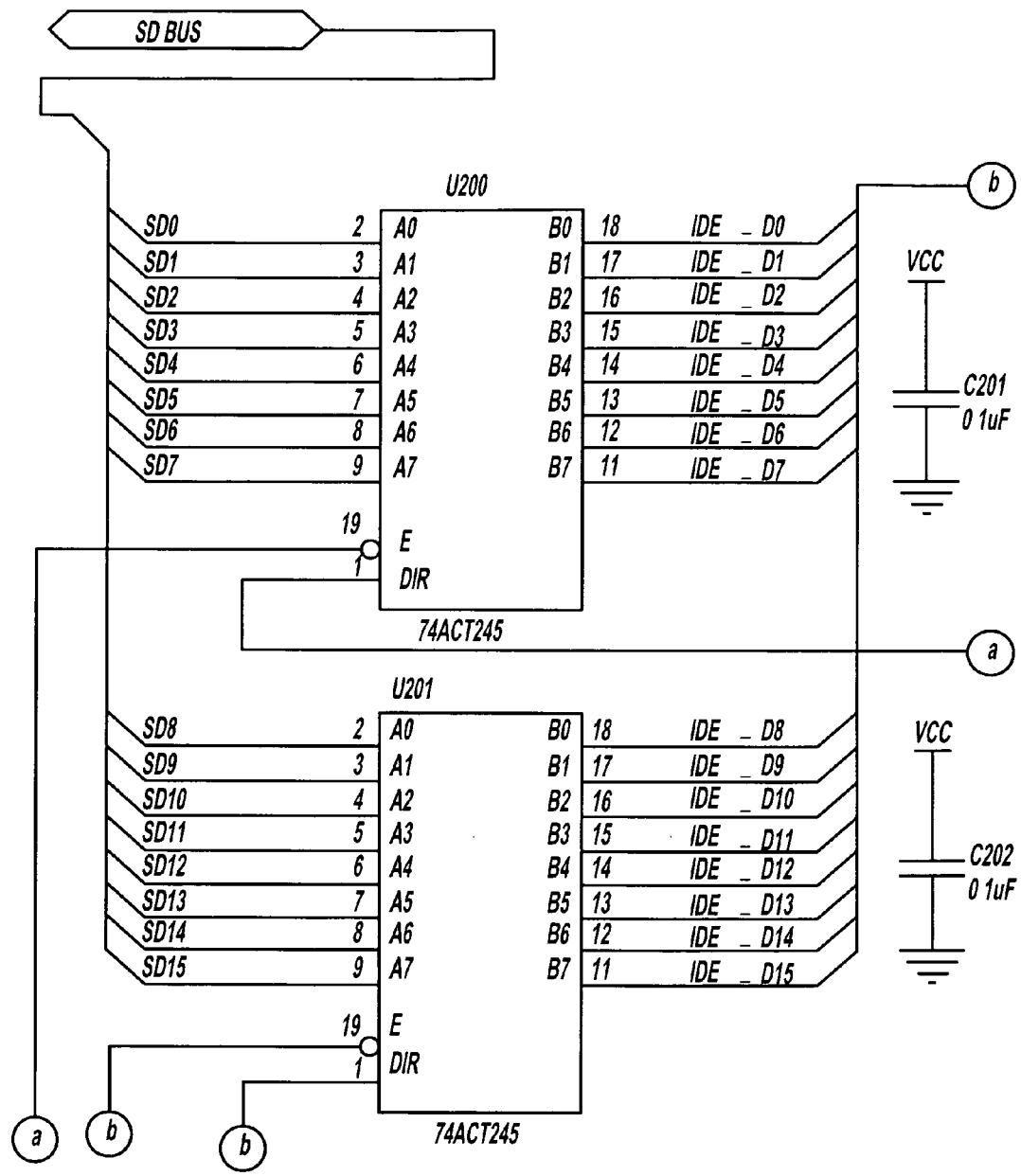
Figure 9C:
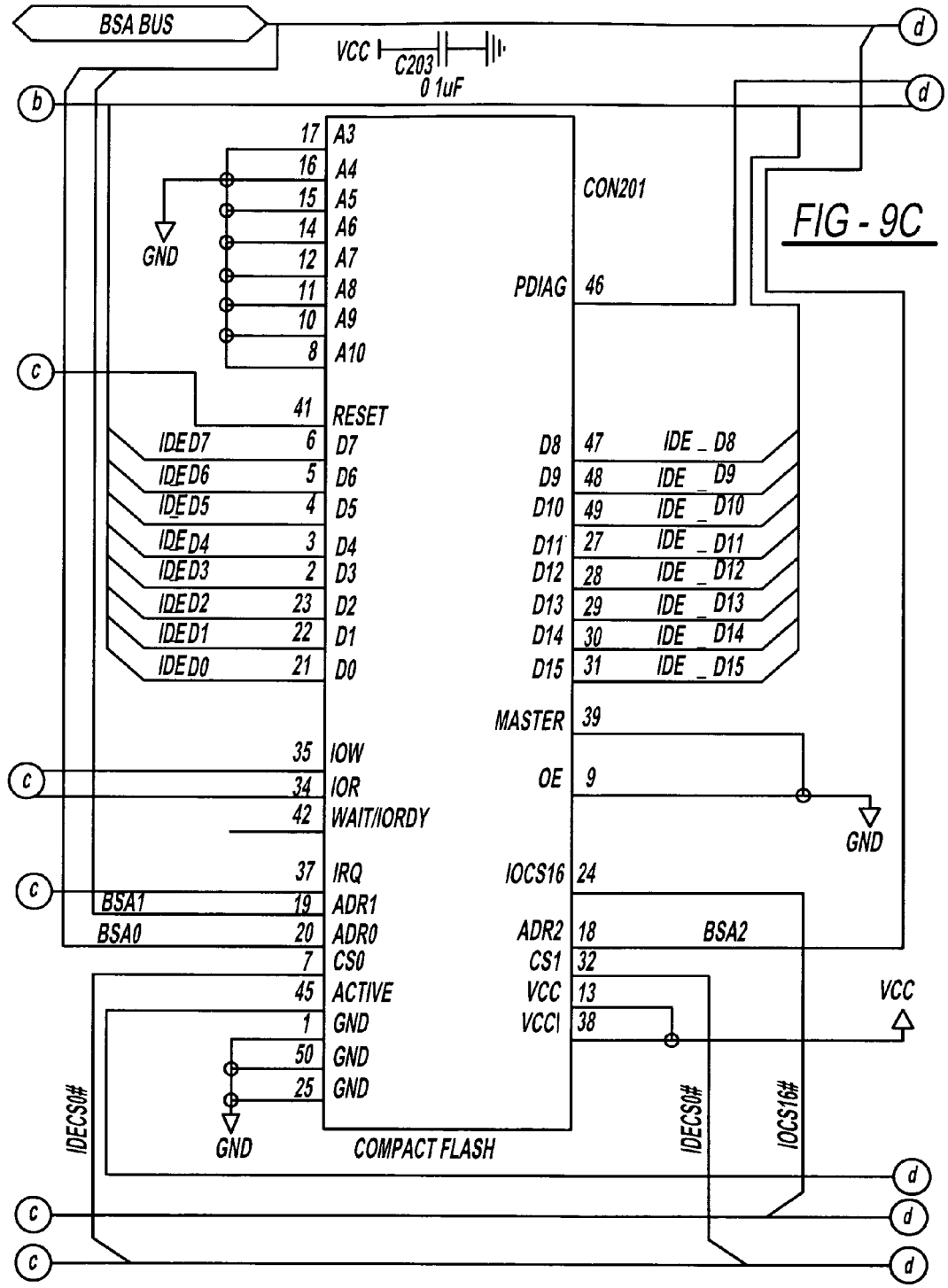
Figure 9D:
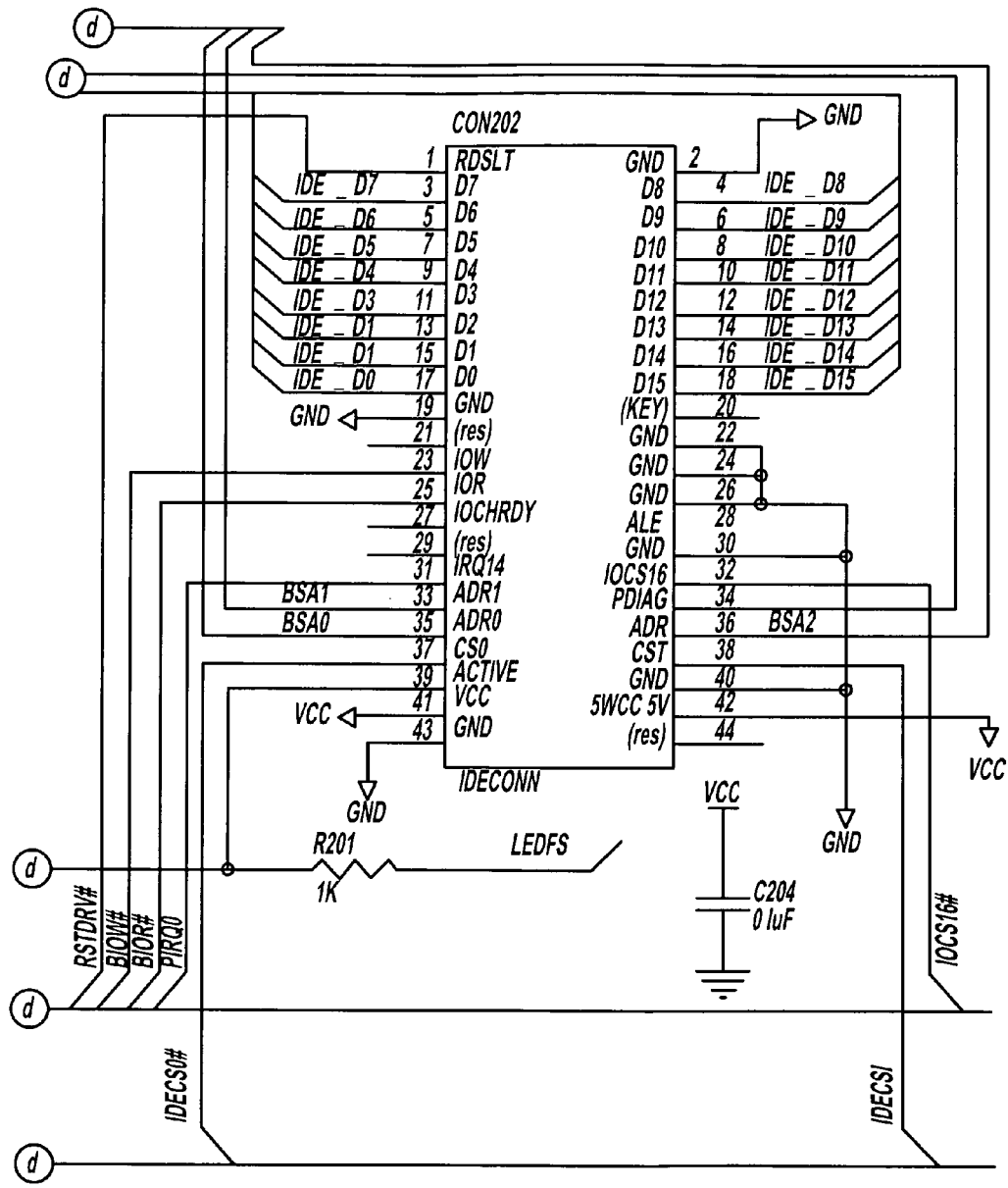
Figure 10B:
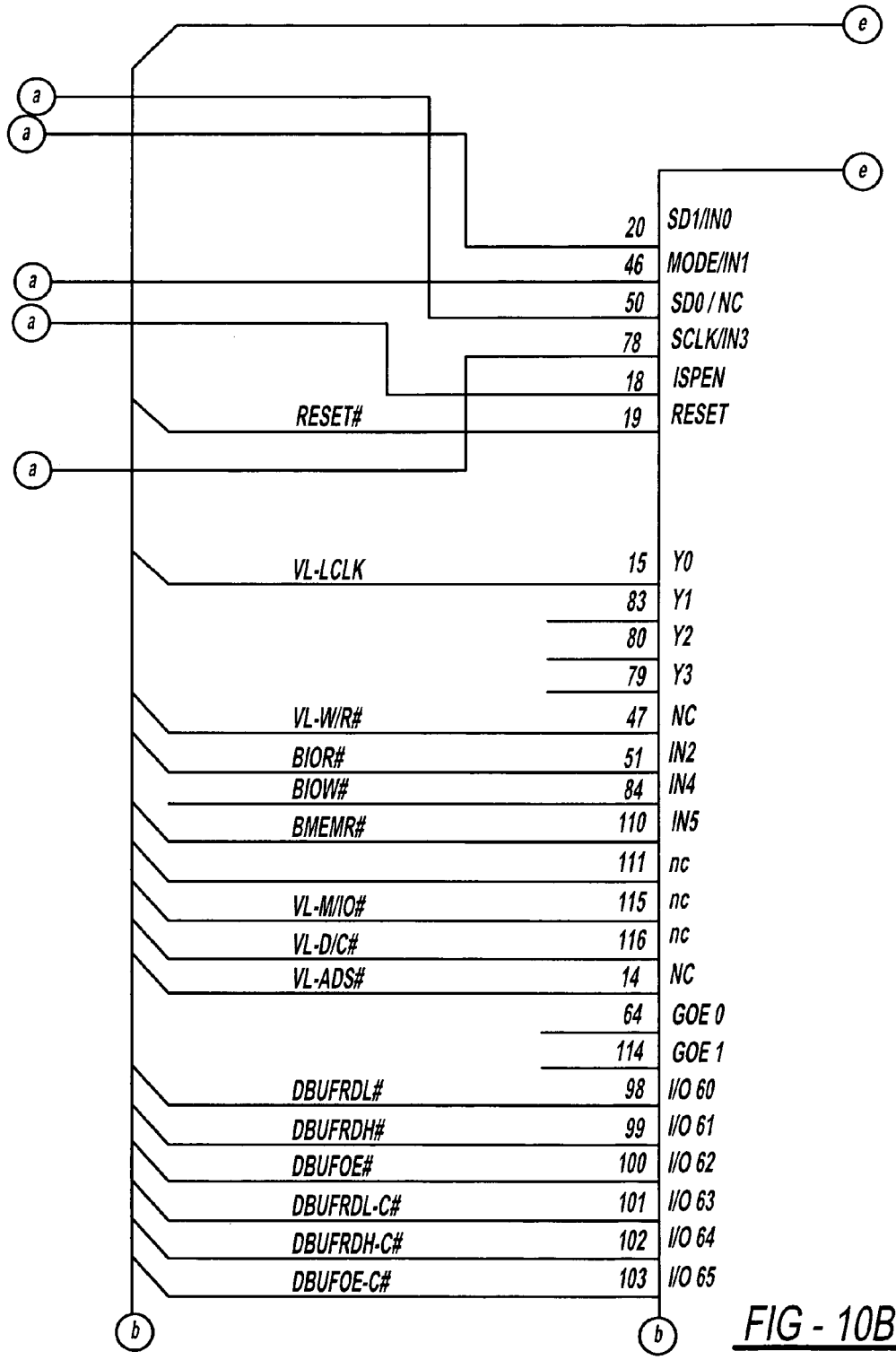
FIG. 10 illustrates device mainboard schematic: CPLD glue logic.
Figure 10C:
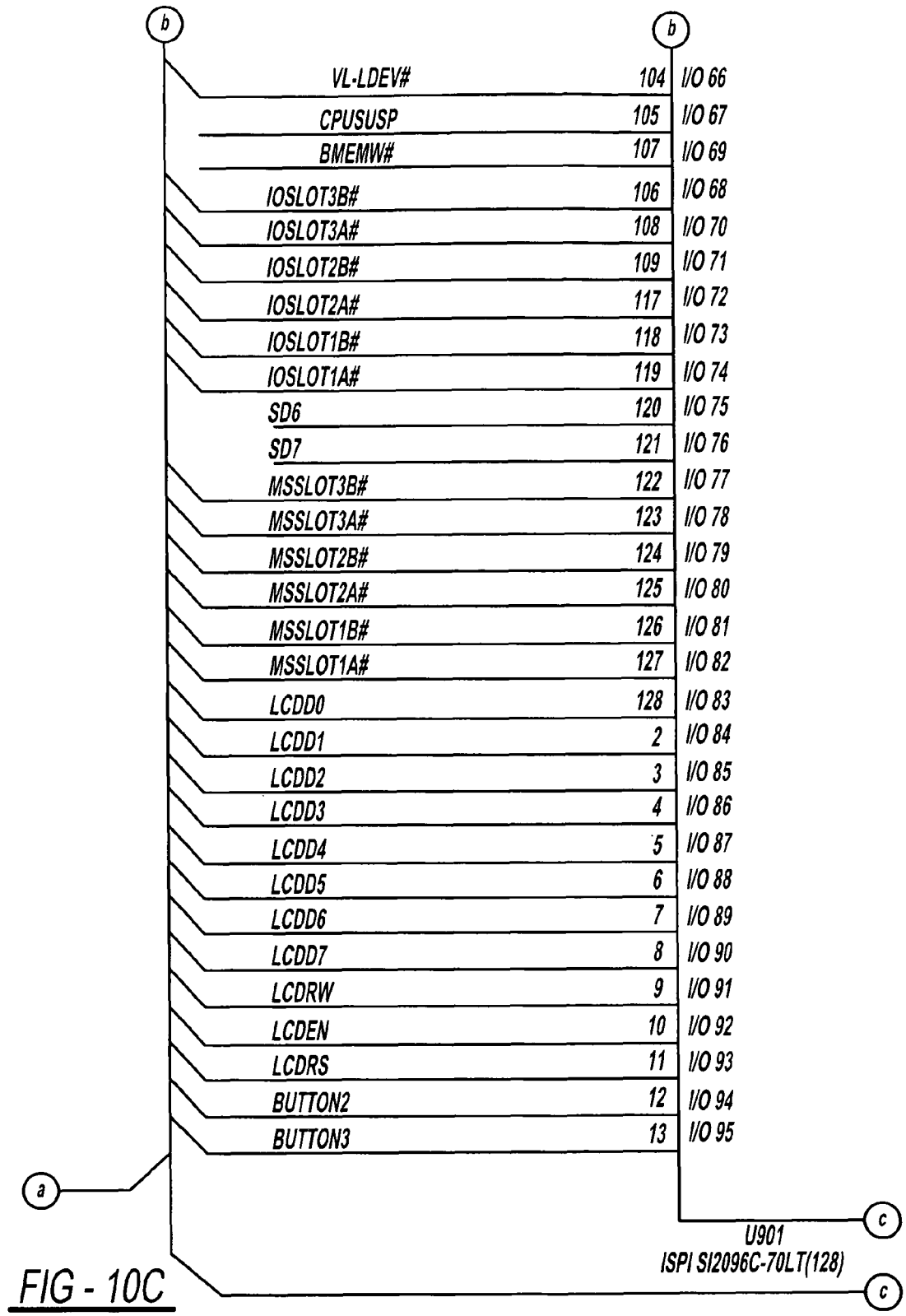
Figure 10D:
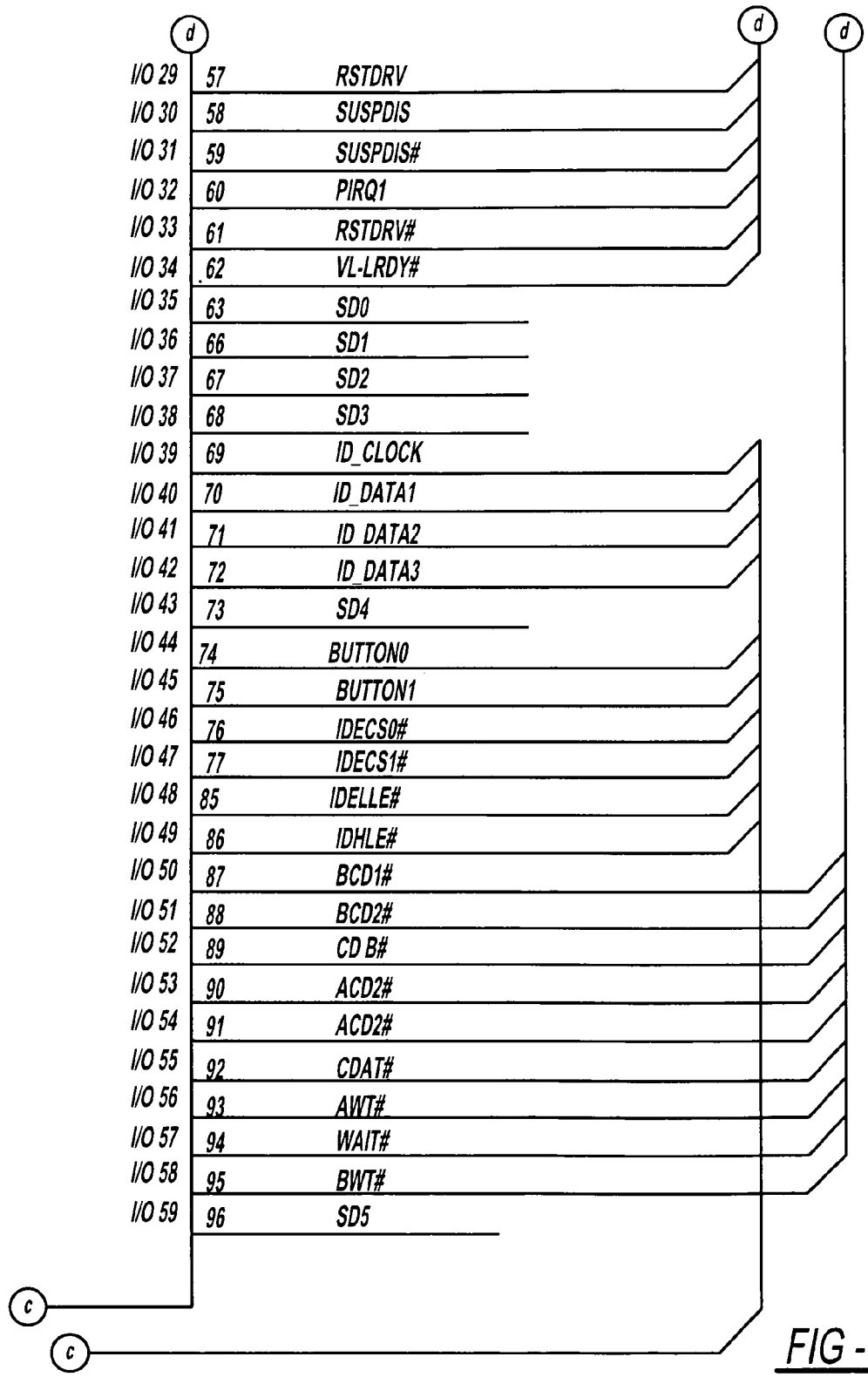
Figure 10E:
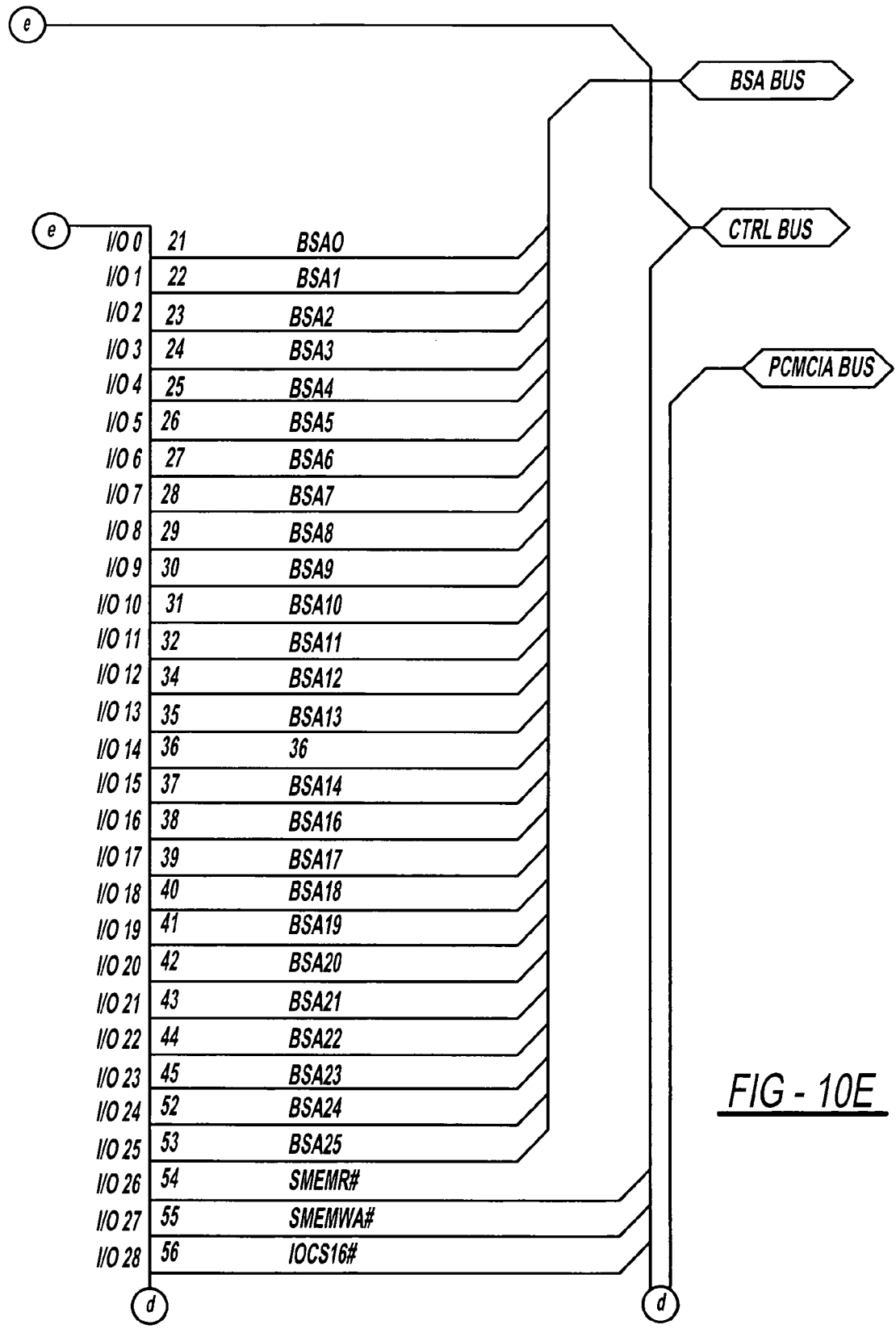
Figure 11A:
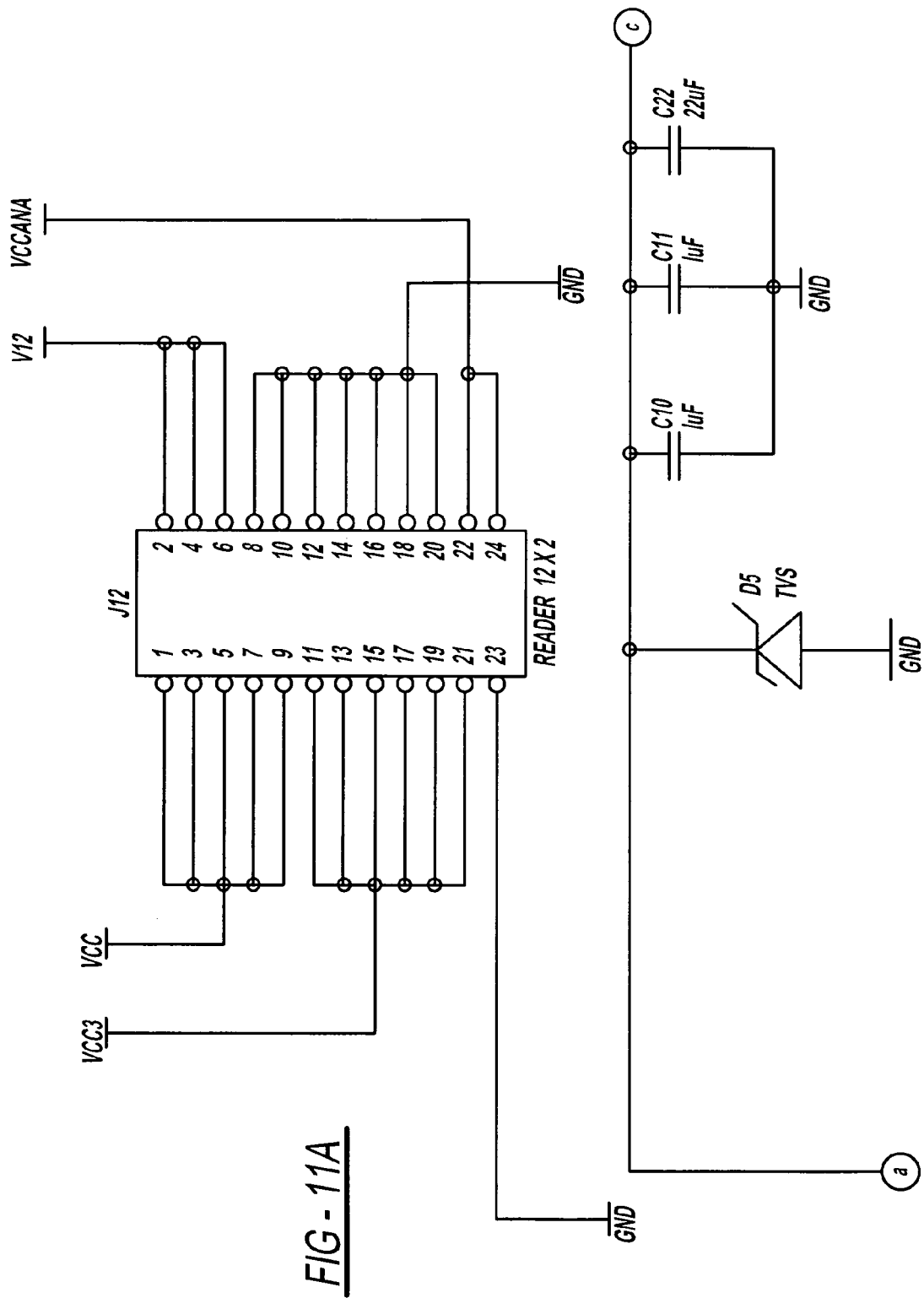
FIG. 11 illustrates device power supply board mainboard schematic.
Figure 11B:
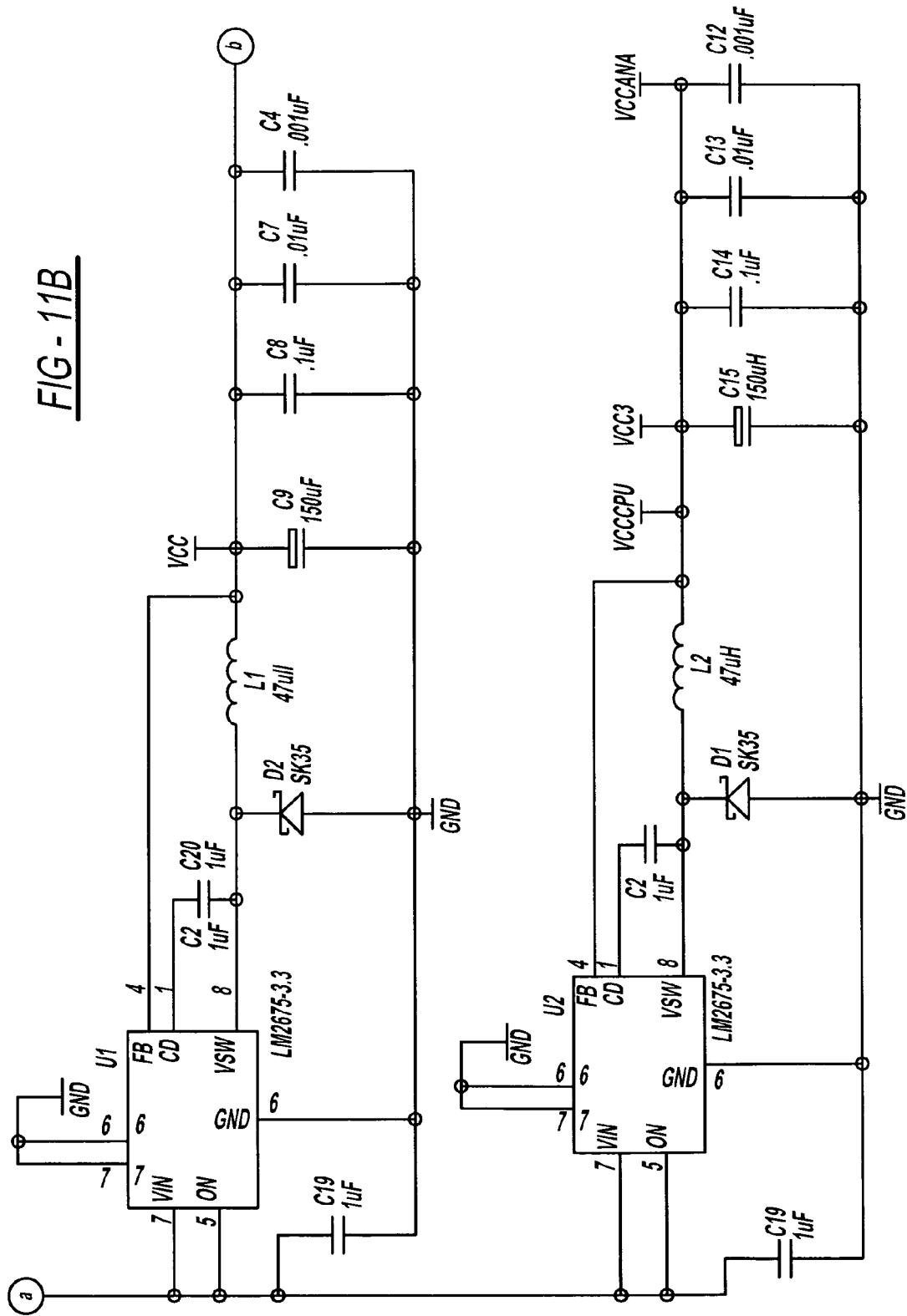
Figure 11C:
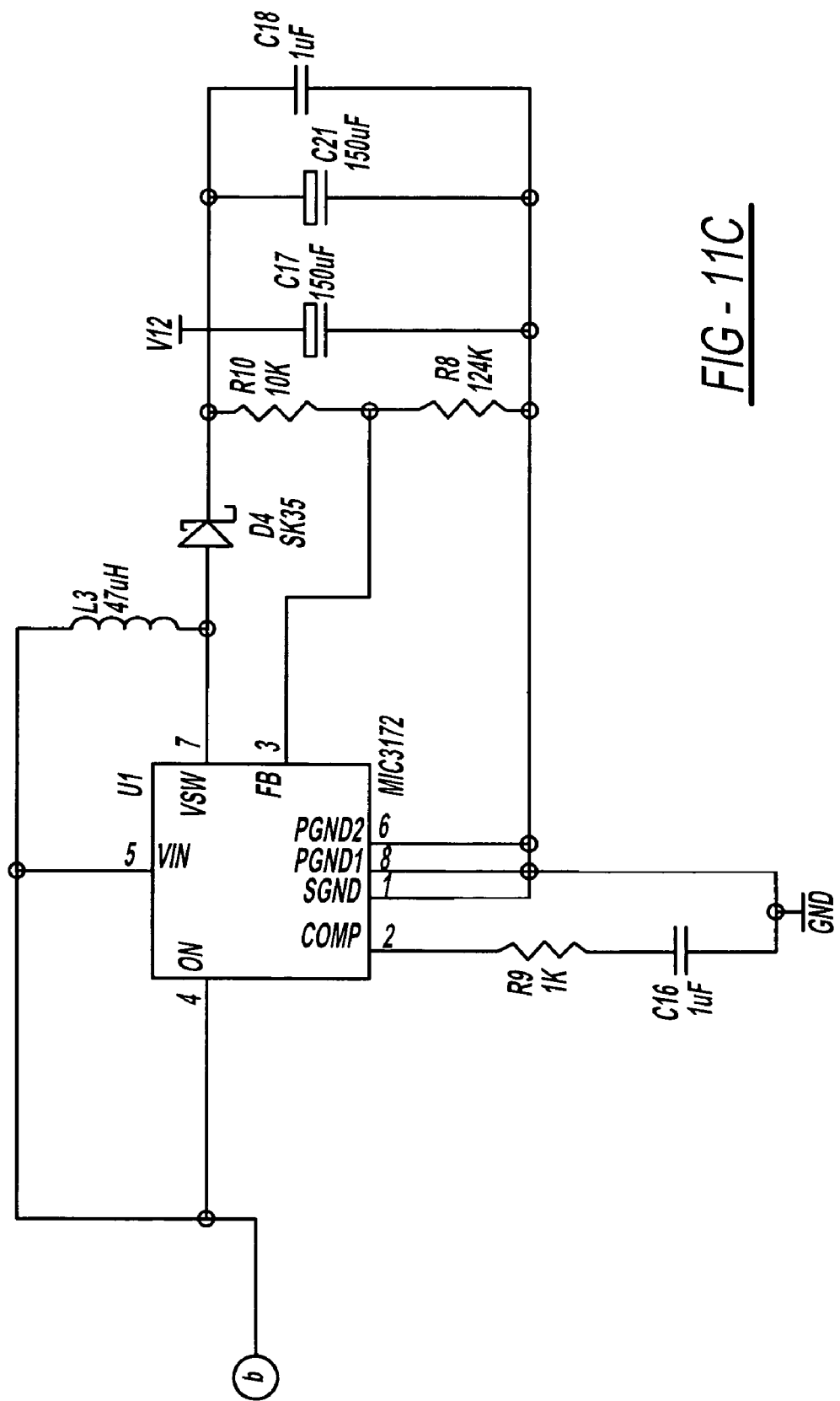
Figure 11D:
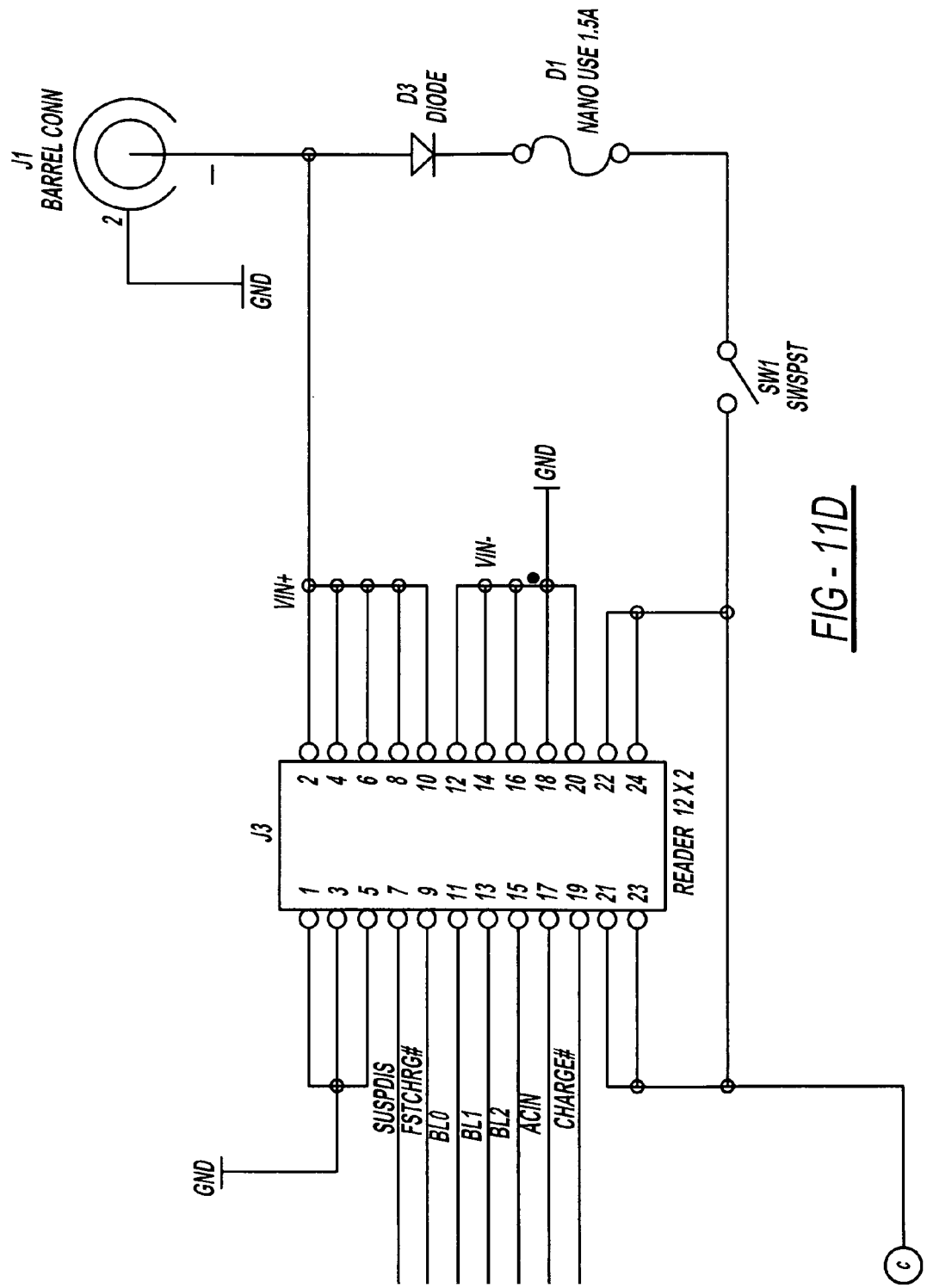

Ethernet interface is shown in FIG. 7. A standard 10-base-T Ethernet interface is implemented by means of a Crystal Semiconductor CS8900 device. This device provides the primary user communication interface. FIG. 8 shows Power supply interconnect that forms an attachment point for a small DC-DC converter that provides system power supplies.

ATA interface provides an attachment point for mass storage devices (FIG. 9). One Compact Flash and one 44-pin IDE interface is provided.

Programmable logic block (CPLD) provides programmable logic space (FIG. 10). This logic provides support for the following: LCD/Keypad interface, daughtercard slot support, buffer control, and address decoding/interrupt routing for other system peripherals.

FIG. 11 depicts a power supply card as providing three DC-DC converters that provide the device hardware platform's required supply voltages (3.3 VDC, 5 VDC and 12 VDC). The supported input voltage range is between 6 VDC and 35 VDC; the circuit provides protection against incorrect or reverse-polarity input Voltages.

It is to be understood that the device herein described could be employed for uses and purposes beyond those described. The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The invention claimed is:

1. A multi-protocol adapter for communicating with one or more remote computers over any one of a plurality of protocols, the adapter comprising:
    an integrated CPU including an embedded operating system, said operating system including software interface modules and device drivers for one or more of interrogating, monitoring, retrieving data, downloading data, recording data, revising data and performing diagnostics over any one of the plurality of protocols, wherein the operating system is capable of simultaneously communicating with the one or more computers running different protocols; wherein said integrated CPU further includes an on-board web server for transmitting and receiving information through the internet.

2. The multi-protocol adapter according to claim 1 wherein the embedded operating system comprises Linux operating system.

3. The multi-protocol adapter according to claim 1, the adapter further comprising:
    means for defining communication routines between the adapter and a client via a host device, and
    means for communicating between the adapter and the client after definition of communication routines between the adapter and the client.

4. The multi-protocol adapter according to claim 1, the adapter further comprising:
    a TCP/IP connection established between two software elements, the connection of serial multiplex network messages between software entities being generalized without knowledge of a specific type of multiplex network.

5. The multi-protocol adapter according to claim 1 further comprising:
    a server program handling communications between a source entity and a destination entity.

6. The multi-protocol adapter according to claim 1 further comprising:
    at least one of message scheduler, a message responder, a message filter or a script loader.

7. The multi-protocol adapter according to claim 1 further comprising:
    communication between users of the adapter and the adapter via a web browser technology.

8. The multi-protocol adapter according to claim 7 further comprising communication between users of the adapter and the adapter via a web browser via HTML.

9. The multi-protocol adapter according to claim 1 wherein the plurality of protocols are selected from the group consisting of controller area network protocols, J1850 protocols, key word protocol 2000, and UART-based protocols.

10. The multi-protocol adapter according to claim 1 wherein the daughter board interface modules are selected from the group consisting of SAJ1850, UBP, CCD, SCI, CAN, SAEJ1587, J1939, J2284, J2411, ISO 11992, 9141-2 and KWP2000 modules.

11. A multi-protocol adapter for communicating with one or more remote computers over any one of a plurality of protocols, the adapter comprising:
    an integrated CPU having an embedded operating system, said operating system including software interface modules and device drivers for one or more of interrogating, monitoring, retrieving data, downloading data, recording data, revising data and performing diagnostics over any one of the plurality of protocols, wherein the operating is capable of simultaneously communicating with the one or more computers running different protocols, wherein said integrated CPU further includes an on-board web server for transmitting and receiving information through the internet;
    the CPU having simultaneous interaction between at least one multiple device using multiple protocols;
    at least one daughter board having interconnect slots;
    an interface for interconnection of the at least one daughterboard;
    a serial port for diagnostics and system maintenance;
    a flash socket for storage of system software;
    a slot for connection of a peripheral;
    a socket for connection of RAM;
    an interface for connection of system RAM;
    an interface for connection of mass-storage devices;
    a battery for clock and configuration memory backup
    an infrared serial interface; and
    a piezoelectric speaker.

* * * * *